United States Patent [19]

Davidson

[11] Patent Number: 5,394,473
[45] Date of Patent: Feb. 28, 1995

[54] ADAPTIVE-BLOCK-LENGTH, ADAPTIVE-TRANSFORN, AND ADAPTIVE-WINDOW TRANSFORM CODER, DECODER, AND ENCODER/DECODER FOR HIGH-QUALITY AUDIO

[75] Inventor: Grant A. Davidson, Oakland, Calif.

[73] Assignee: Dolby Laboratories Licensing Corporation, San Francisco, Calif.

[21] Appl. No.: 781,262

[22] PCT Filed: Apr. 12, 1991

[86] PCT No.: PCT/US91/02512
 § 371 Date: Dec. 11, 1991
 § 102(e) Date: Dec. 11, 1991

[87] PCT Pub. No.: WO91/16769
 PCT Pub. Date: Oct. 31, 1991

Related U.S. Application Data

[63] Continuation-in-part of Ser. No. 508,809, Apr. 12, 1990, abandoned.

[51] Int. Cl.⁶ .............................................. G10L 5/00
[52] U.S. Cl. ........................................ 381/36; 381/30; 395/2.67; 375/240
[58] Field of Search ................... 381/29–40, 381/41, 51; 341/51, 67; 375/122; 395/2.38, 2.67, 2.13

[56] References Cited

U.S. PATENT DOCUMENTS

| | | | |
|---|---|---|---|
| 5,109,417 | 4/1992 | Fielder et al. | 381/36 |
| 5,115,240 | 5/1992 | Fujiwara et al. | 341/51 |
| 5,142,656 | 8/1992 | Fielder et al. | 381/37 |

FOREIGN PATENT DOCUMENTS

| | | |
|---|---|---|
| 0193143 | 9/1986 | European Pat. Off. |
| 0251028 | 1/1988 | European Pat. Off. |
| 0289080 | 11/1988 | European Pat. Off. |
| 0405591 | 1/1991 | European Pat. Off. |
| 0409248 | 1/1991 | European Pat. Off. |
| 0420745 | 4/1991 | European Pat. Off. |
| 0428156 | 5/1991 | European Pat. Off. |
| 0446031 | 9/1991 | European Pat. Off. |
| 9009064 | 8/1990 | WIPO |

OTHER PUBLICATIONS

Speech Communication, 1988, pp. 125–149, "Review on Medium–Rate Coding" by Ulrich Heute.
Brigham, *The Fast Fourier Transform*, Prentice–Hall, Inc., 1974, pp. 166–169.
Oppenheim and Schafer, *Digital Signal Processing*, Prentice–Hall, Inc., 1975, pp. 307–314.
Zelinski, Noll, "Adaptive Transform Coding of Speech Signals," *IEEE Trans. Acoust., Speech, and Signal Proc.*, vo. ASSP-25, Aug. 1977, pp. 299–309.
Harris, "On the Use of Windows for Harmonic Analysis with the Discrete Fourier Transform," *Proc. IEEE*, vol. 66, Jan., 1978, pp. 51–83.
Jayant and Noll, *Digital Coding of Waveforms*, Prentice–Hall, Inc., 1984, pp. 56–58, 554–556, 563–576.
Abdel–Fattah and Assal, "A study of the Different Orthogonal Transforms to Obtain an Optimum Speech Compression," Eurocon, Apr. 1986, pp. 647–652.

(List continued on next page.)

*Primary Examiner*—Robert L. Richardson
*Assistant Examiner*—Kee M. Tung
*Attorney, Agent, or Firm*—Thomas A. Gallagher; David N. Lathrop

[57] ABSTRACT

The invention relates in general to high-quality low bit-rate digital transform coding and decoding of information corresponding to audio signals such as music signals. More particularly, the invention relates to signal analysis/synthesis in coding and decoding. The invention can optimize the trade off in transform coders between time resolution and frequency resolution by adaptively selecting the transform block length for each sampled audio segment, and/or can optimize coding gain by adaptively selecting the transform and/or by adaptively selecting the analysis window or the analysis/synthesis window pair.

65 Claims, 40 Drawing Sheets

OTHER PUBLICATIONS

Krahé, "Bit-Rate Reduction Method for Digital Audio Signals Based on Psychoacoustic Masking Phenomena," *Radio Engineering News*, 1986, pp. 117–123.

Krahé, "New Source Coding Method for High Quality Digital Audio Signals," Lecture, NTG Meeting on Sound Broadcasting, Nov. 1985.

Princen and Bradley, "Analysis/Synthesis Filter Bank Design Based on Time Domain Aliasing Cancellation," *IEEE*, vol. ASSP-34, Oct. 1986, pp. 1153–1161.

Vaisey and Gersho, "Variable Block-Size Coding," *ICASSP*, Apr. 1987, pp. 1051–1054.

Princen, Johnson, Bradley, "Subband/Transform Coding Using Filter Bank Designs Based on Time Domain Aliasing Cancellation," *ICASSP*, Apr. 1987, pp. 2161–2164.

Johnson and Bradley, "Adaptive Transform Coding Incorporating Time Domain Aliasing Cancellation," *Speech Communications.*, vol. 6, 1987, pp. 299–308.

Schroeder, Platte, Krahé, "'MSC': Stereo Audio Coding with CD-Quality and 256 kBit/Sec," *IEEE*, vol. CE-33, Nov. 1987, pp. 512–519.

*Audio Engineering Handbook*, Benson ed., McGraw-Hill, 1988, pp. 1.40–1.42, 4.8–4.10.

Brandenburg, "High Quality Sound Coding at 2.5 Bit/Sample," *AES Convention Preprint No. 2582*, 84th Convention, Apr. 1988.

Lookabaugh, "Variable Rate and Adaptive Frequency Domain Vector Quantization of Speech," PhD Dissertation, Stanford University, Jun. 1988, pp. 166–182.

Brandenburg, Kapust, et. al., "Low Bit Rate Codecs for Audio Signals Implementation in Real Time," *AES*, 85th Convention, Nov. 1988.

Feiten, "Spectral Properties of Audio Signals and Masking with Aspect to Bit Data Reduction," *AES*, 86th Convention, Mar. 1989.

Edler, "Coding of Audio Signals with Overlapping Block Transform and Adaptive Window Functions," *Frequenz*, vol. 43, No. 9, 1989, pp. 252–256.

Sugiyama, Hazu, Iwadare, Nishitani, "Adaptive Transform Coding with an Adaptive Block Size (ATC-ABS)," *ICASSP*, Apr. 1990, pp. 1093–1096.

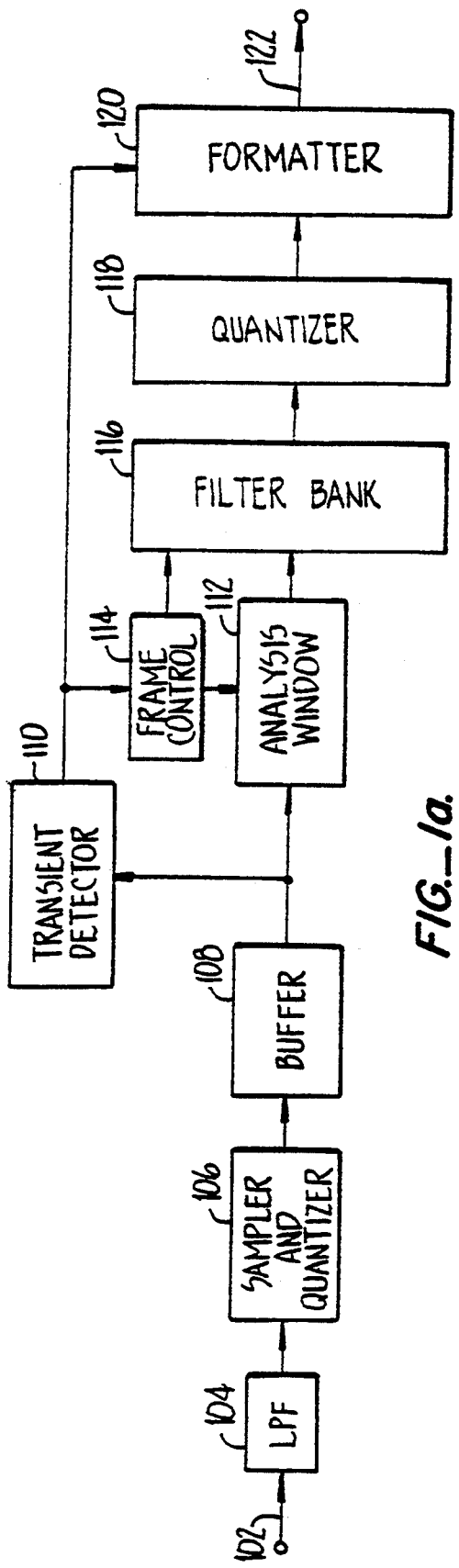
FIG._1a.
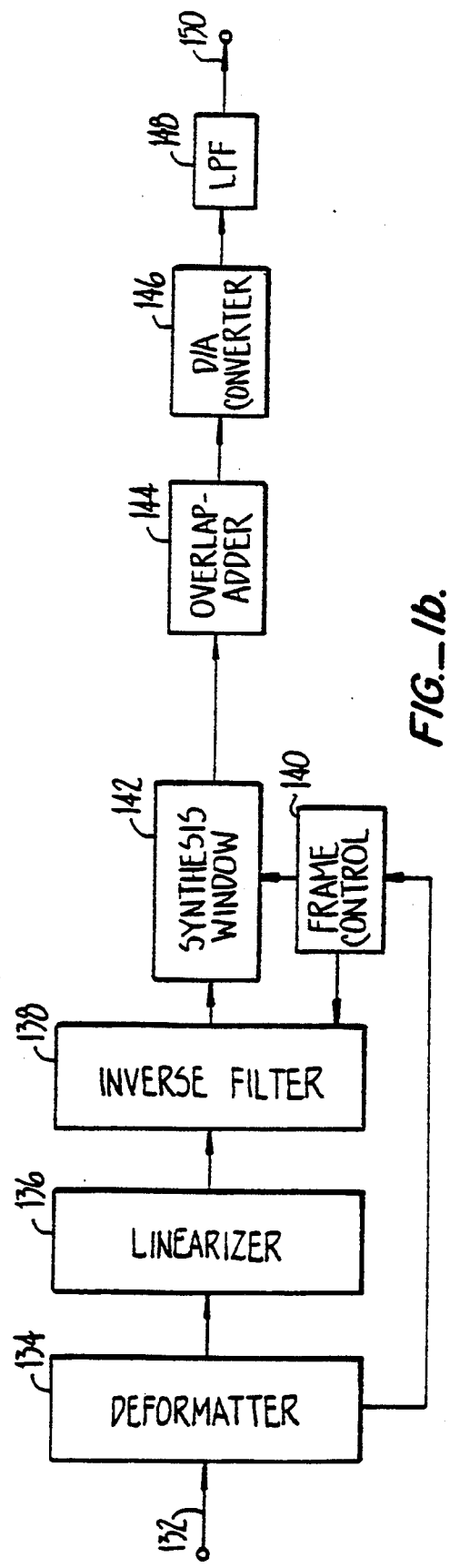
FIG._1b.

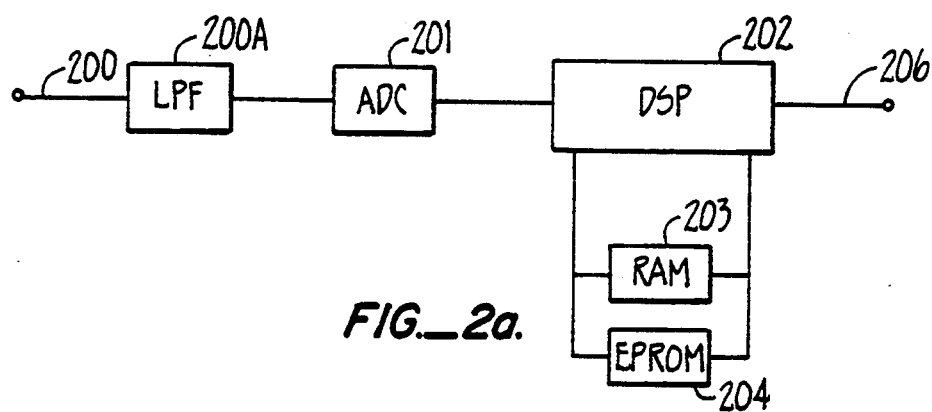
FIG._2a.
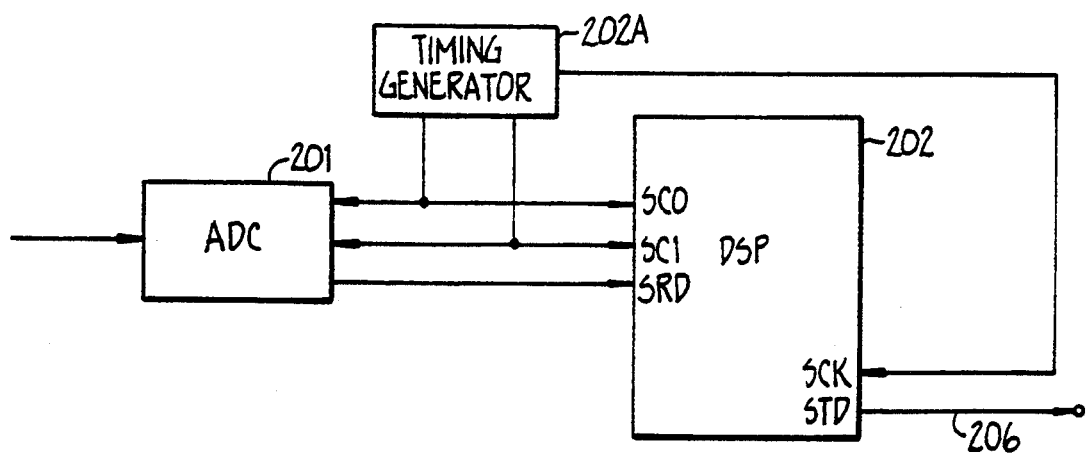
FIG._2b.

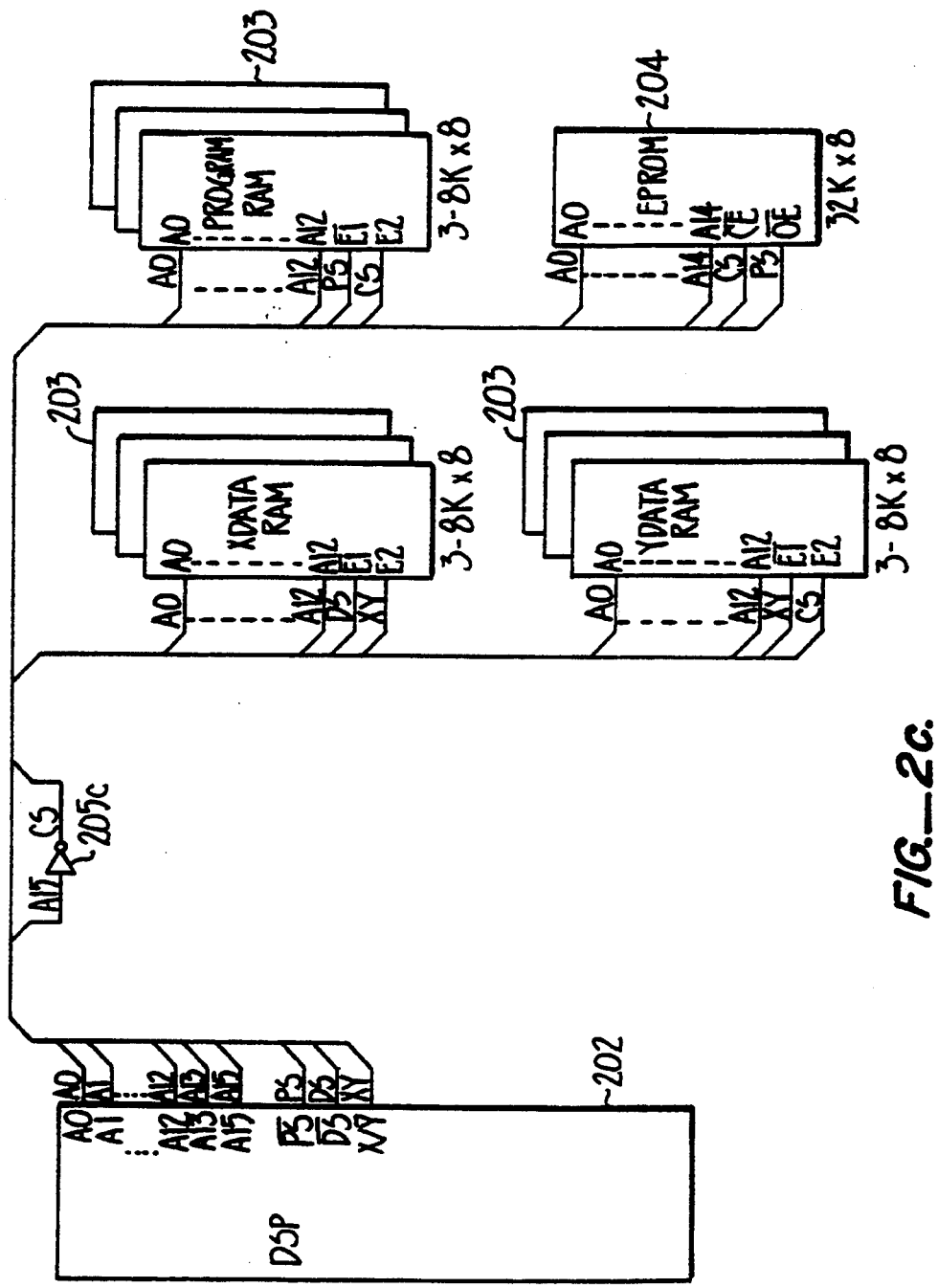
FIG._2c.

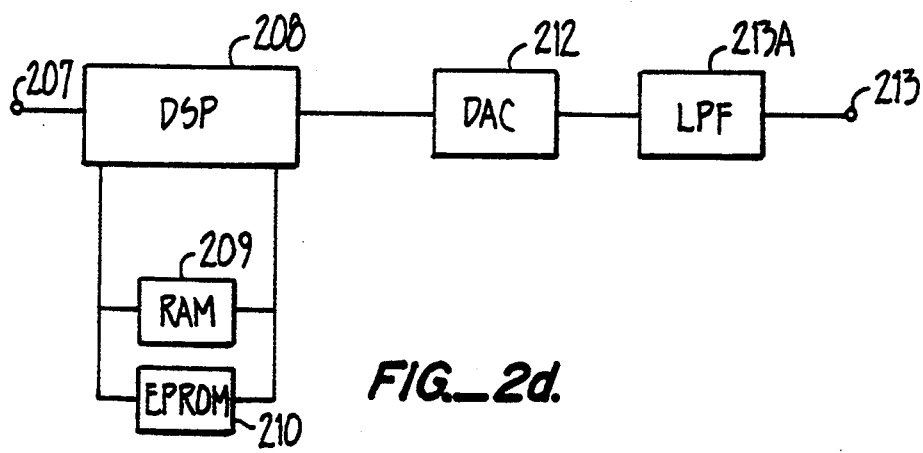
FIG._2d.
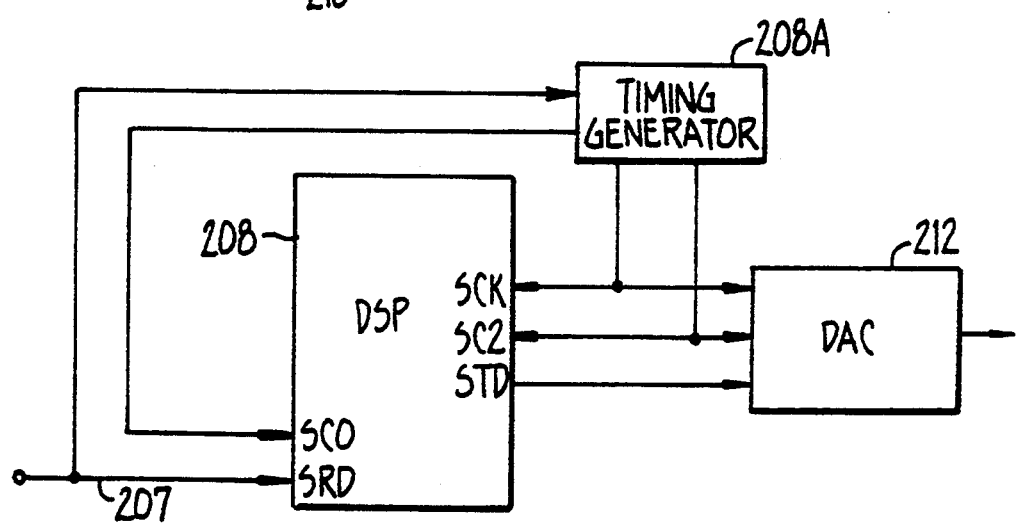
FIG._2e.

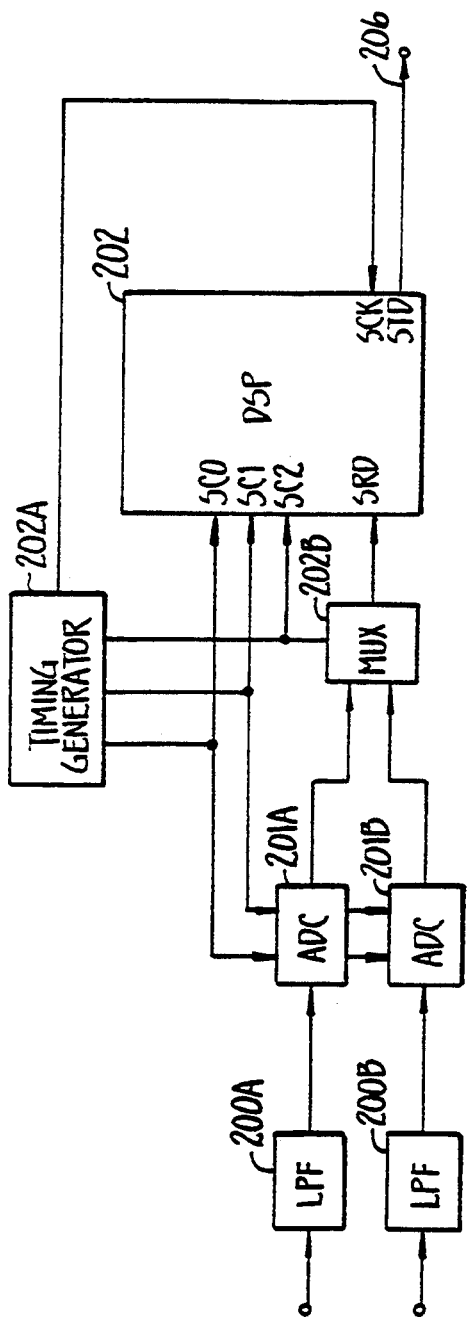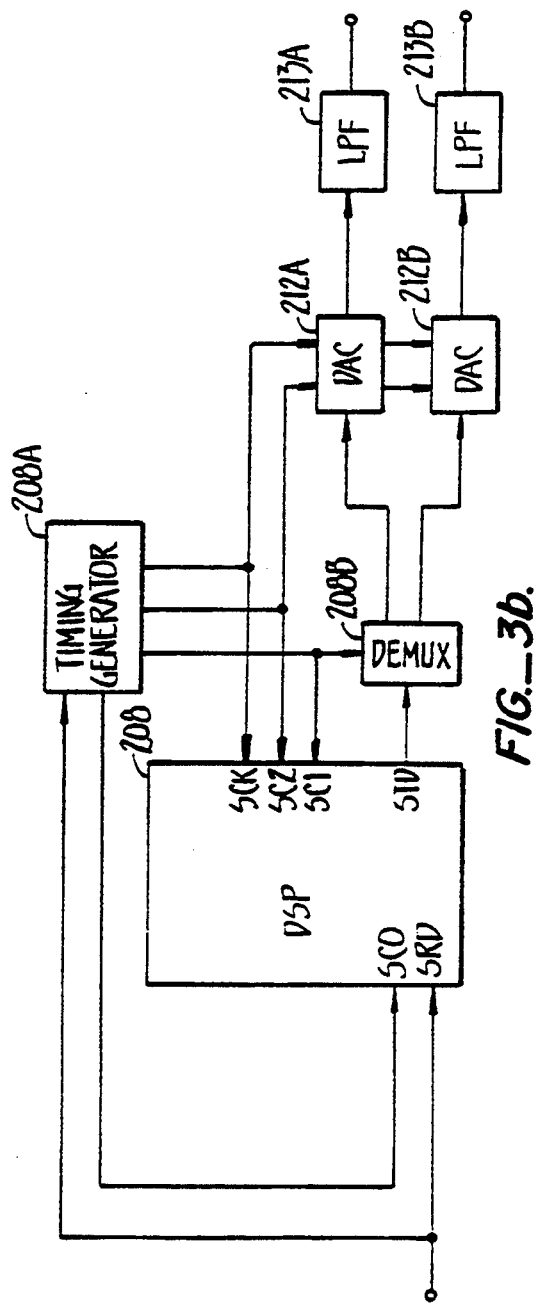

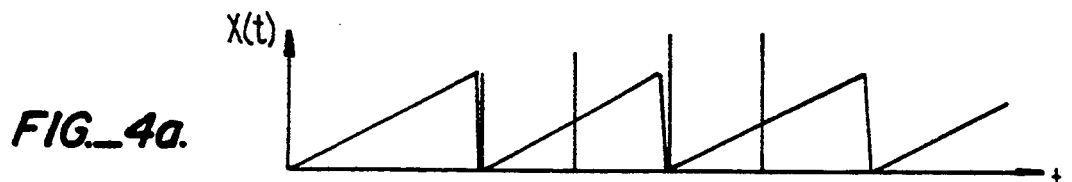
FIG._4a.
FIG._4b.
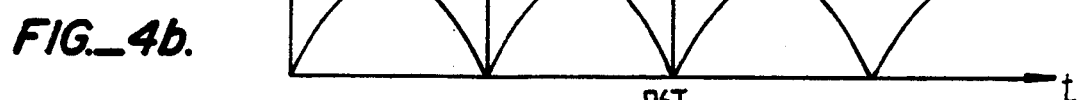
FIG._4c.
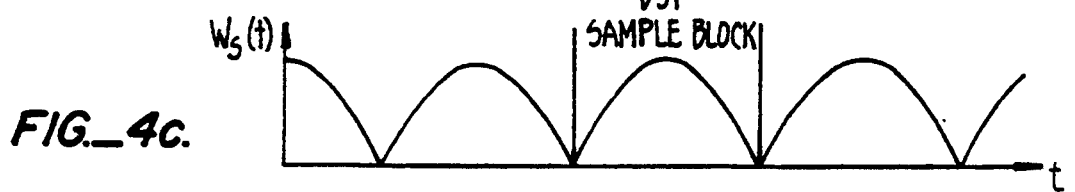
FIG._4d.
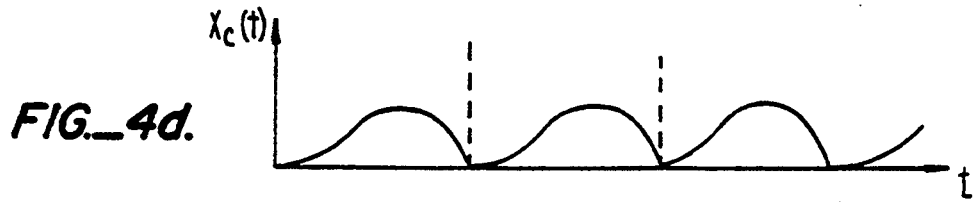
FIG._4e.
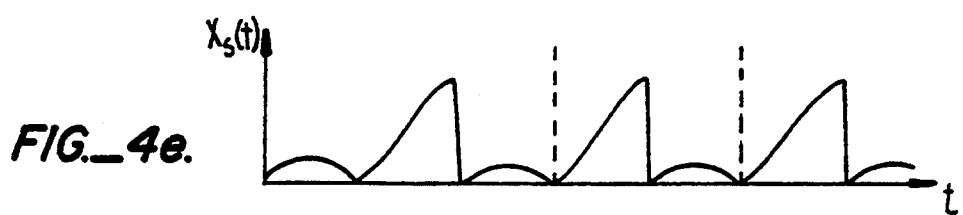

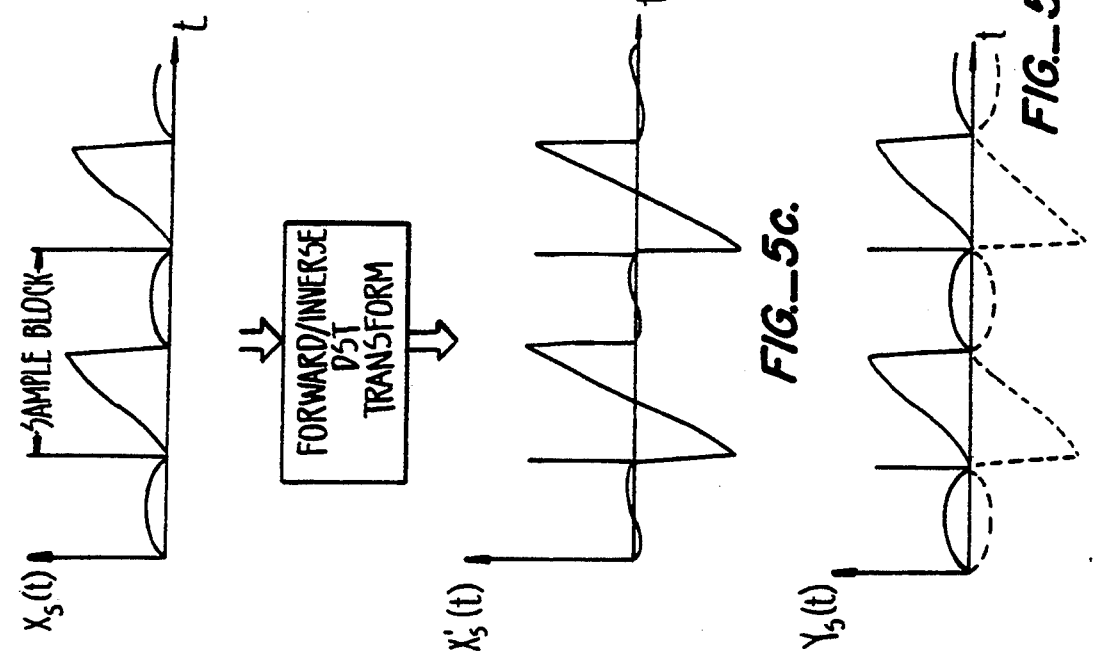
FIG._5c.
FIG._5d.
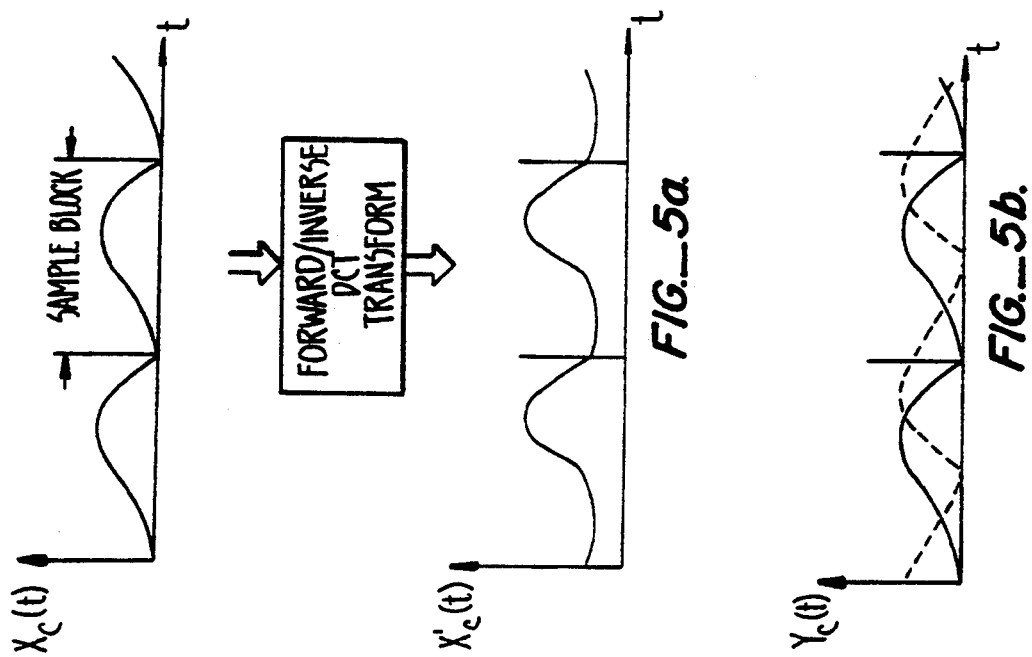
FIG._5a.
FIG._5b.

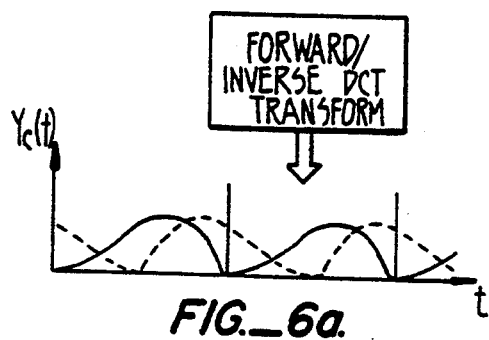
FIG._6a.
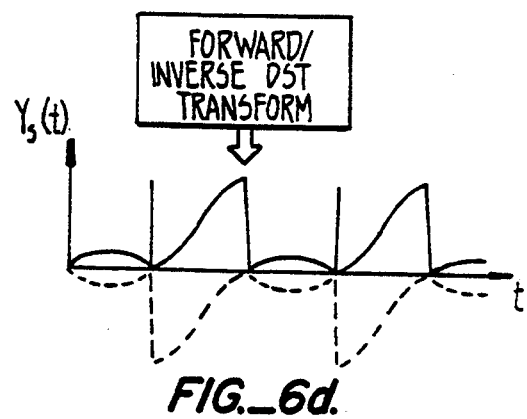
FIG._6d.
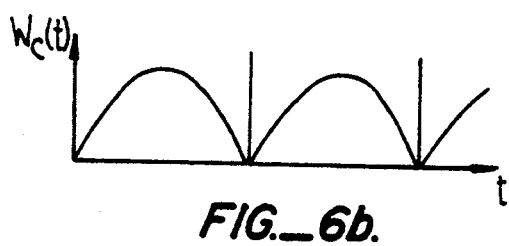
FIG._6b.
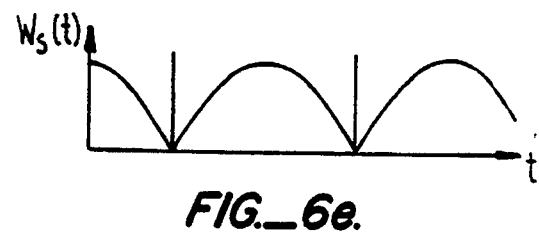
FIG._6e.
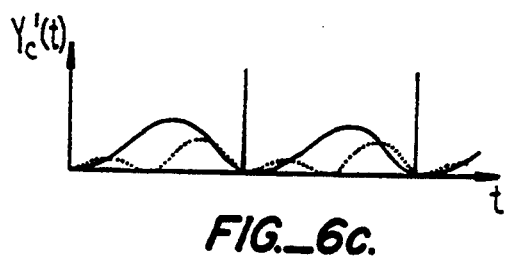
FIG._6c.
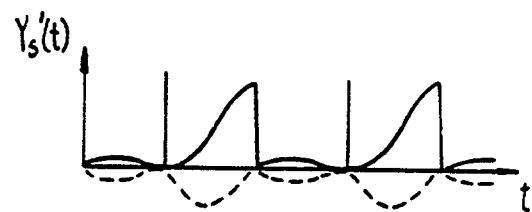
FIG._6f.
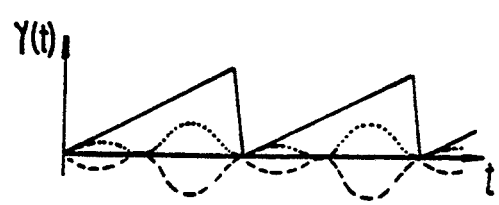
FIG._6g.

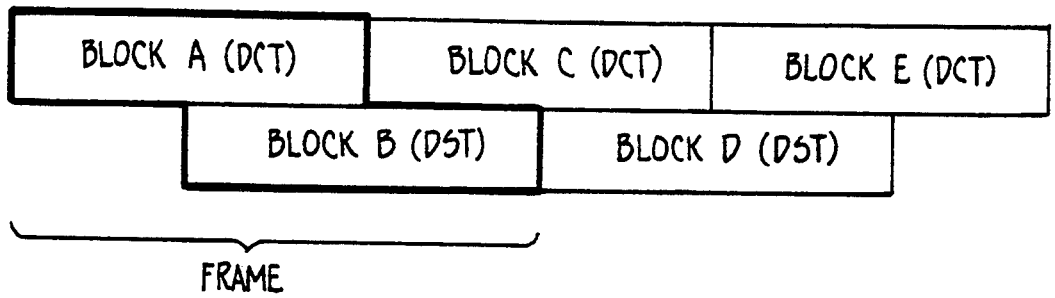
FIG._7a.
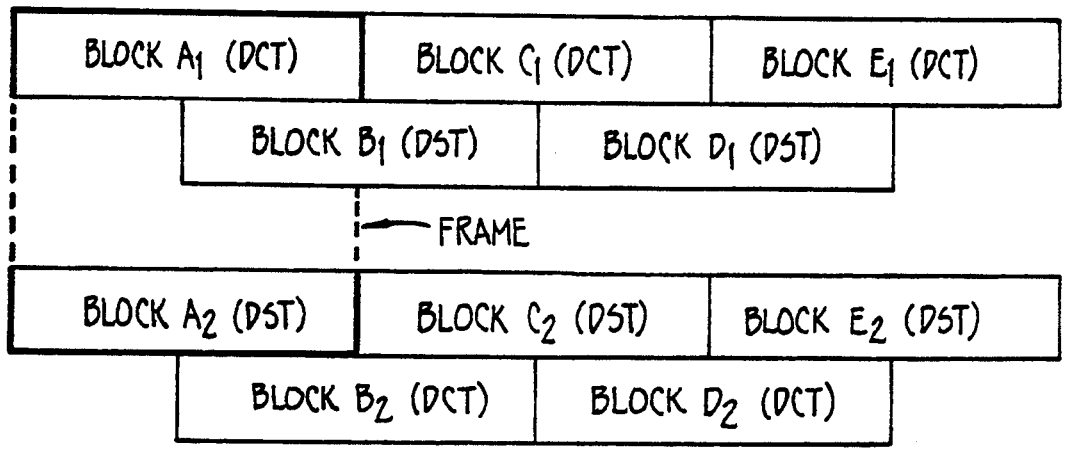
FIG._7b.

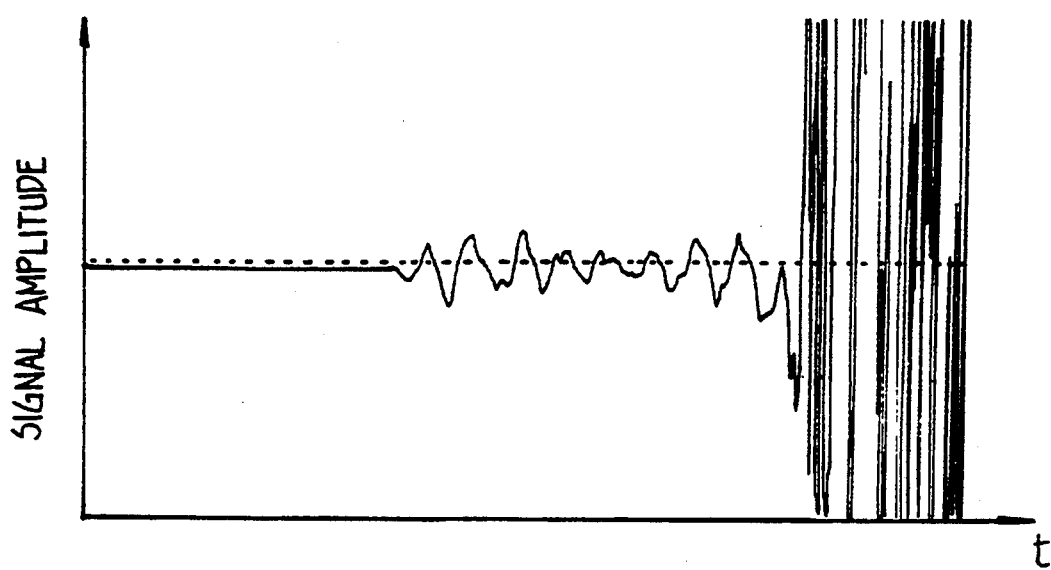
FIG._8a.

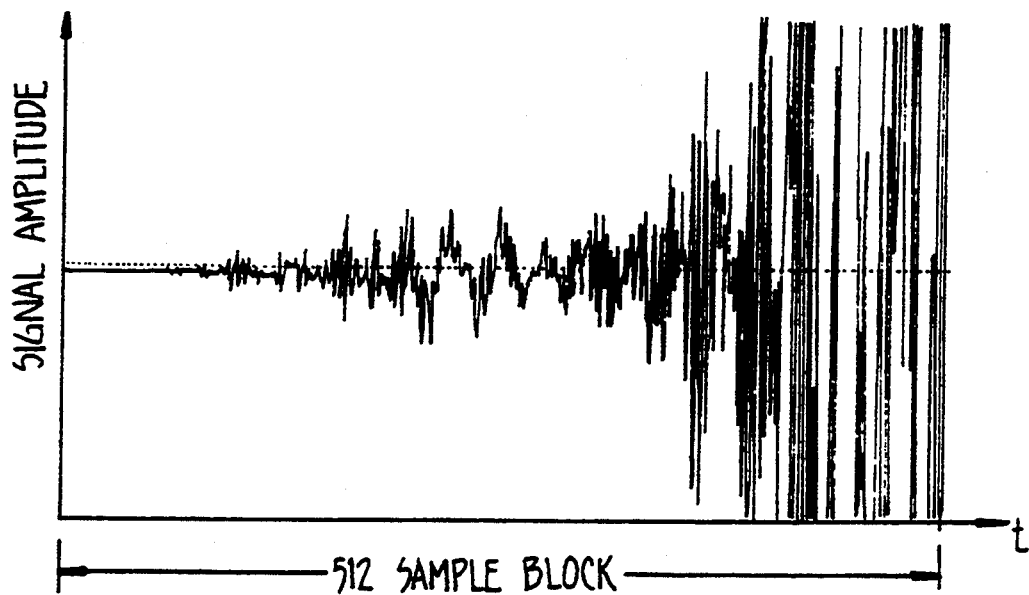
FIG._8b.
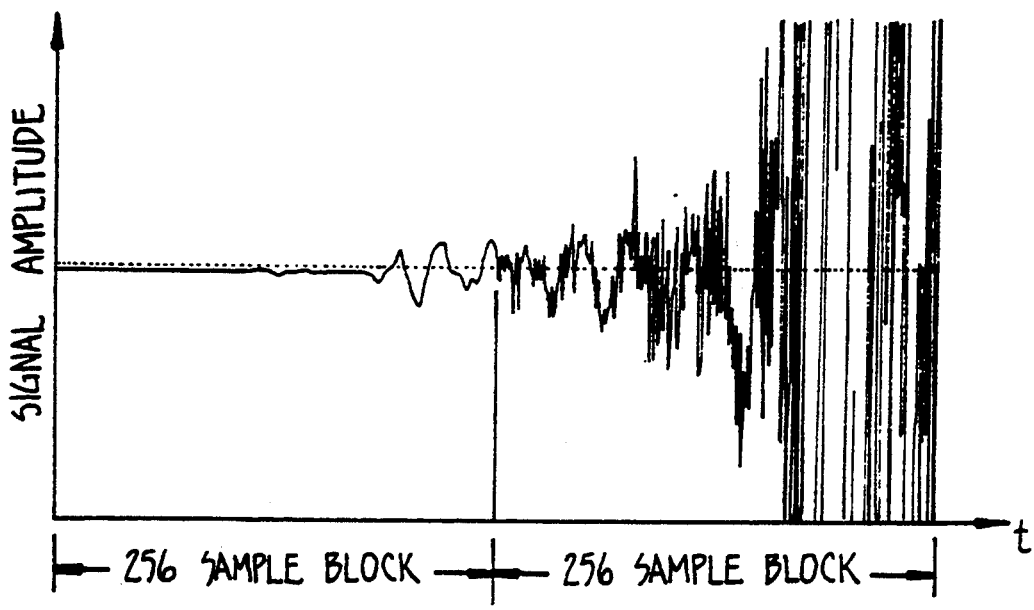
FIG._8c.

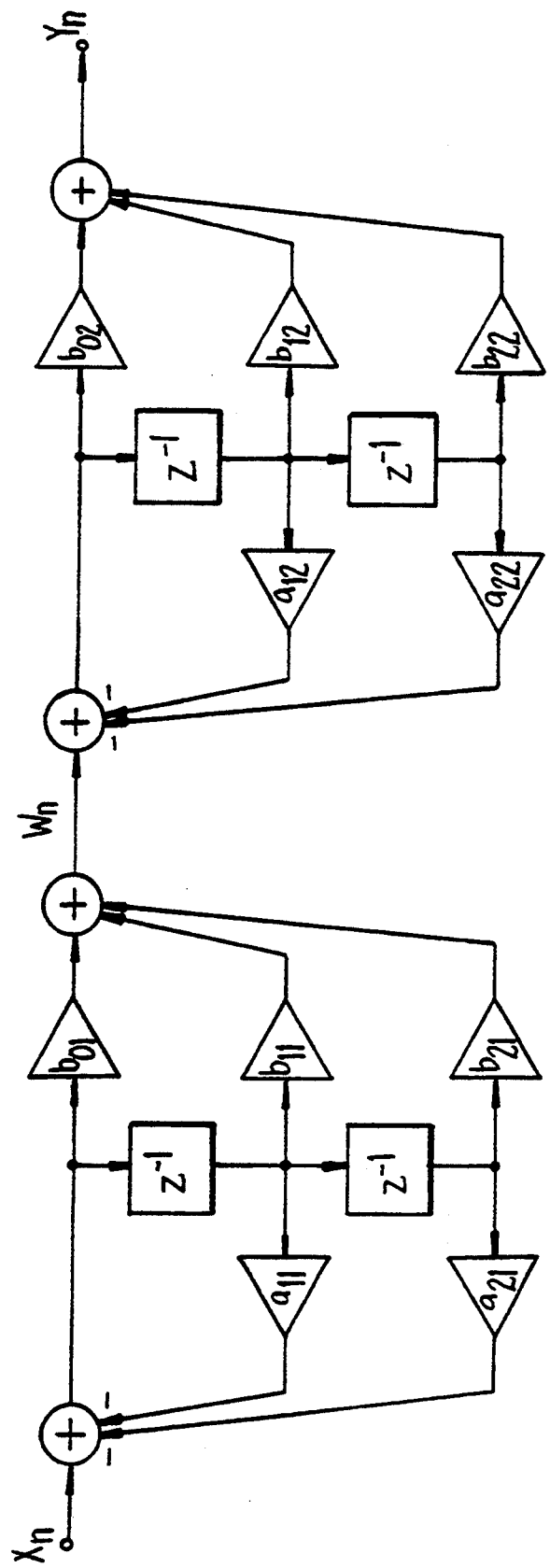
FIG._9.

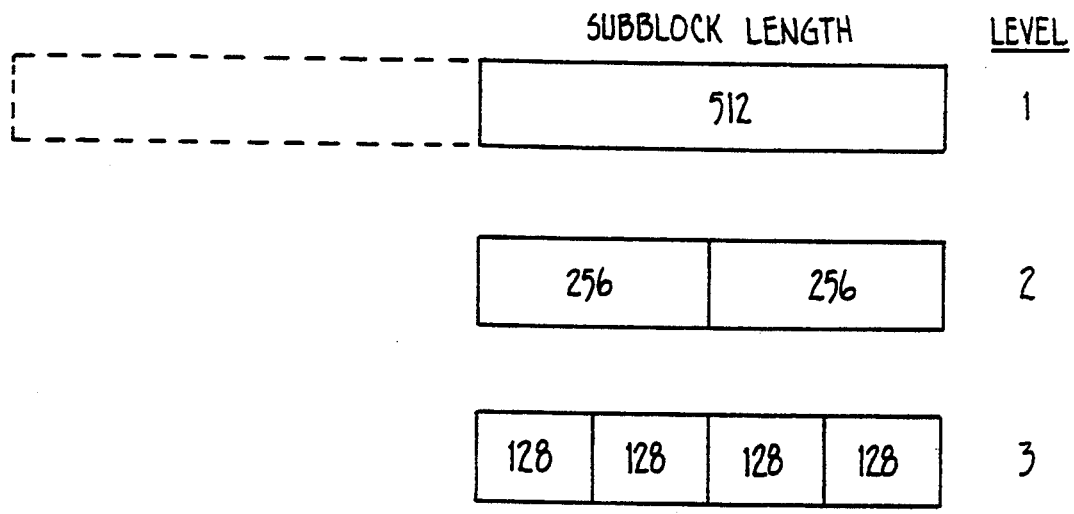
FIG._10.
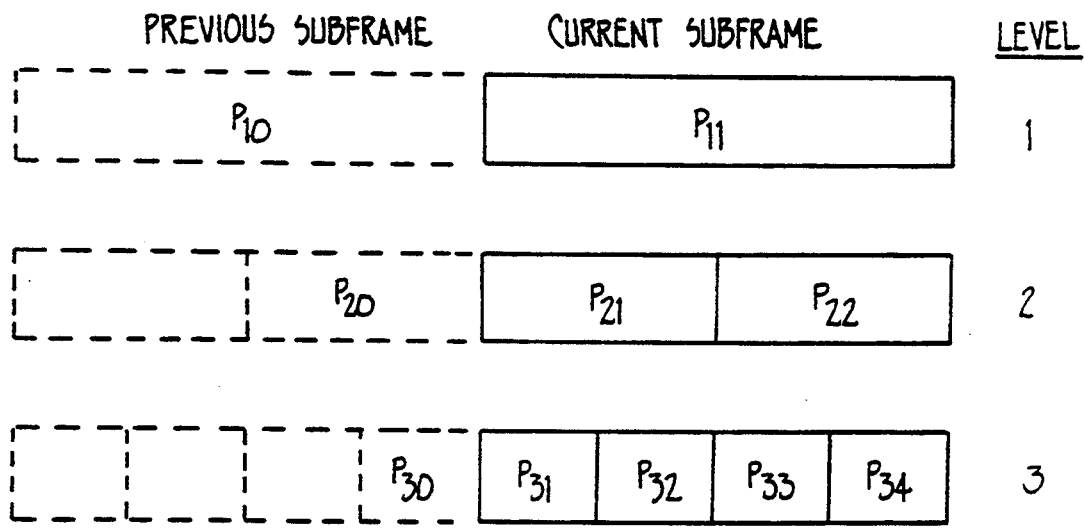
FIG._11.

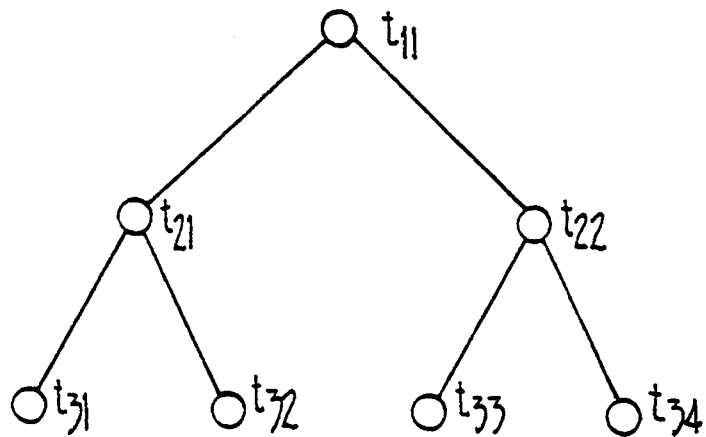
FIG._12.
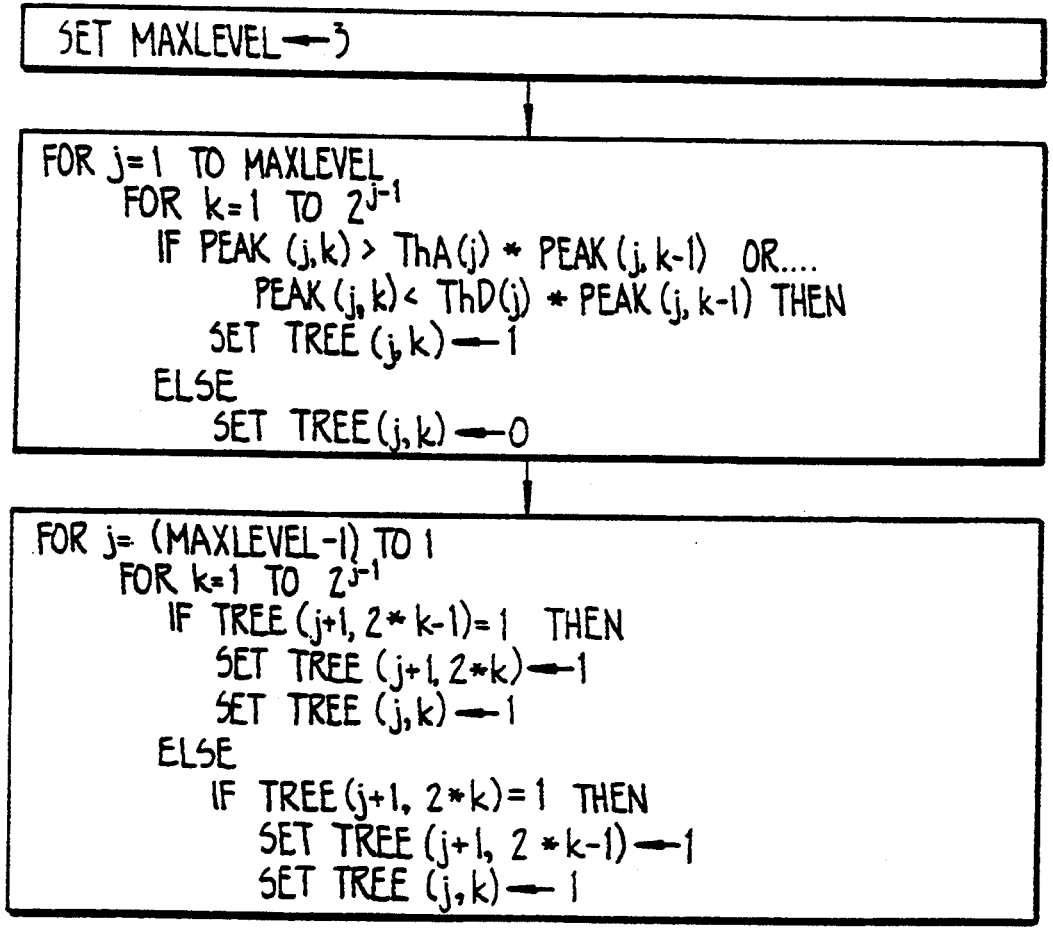
FIG._13.

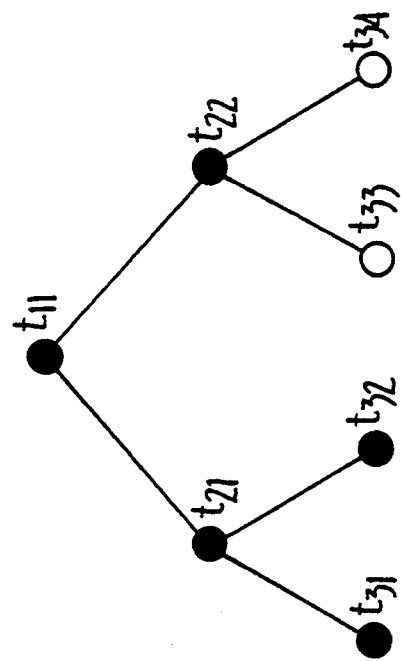
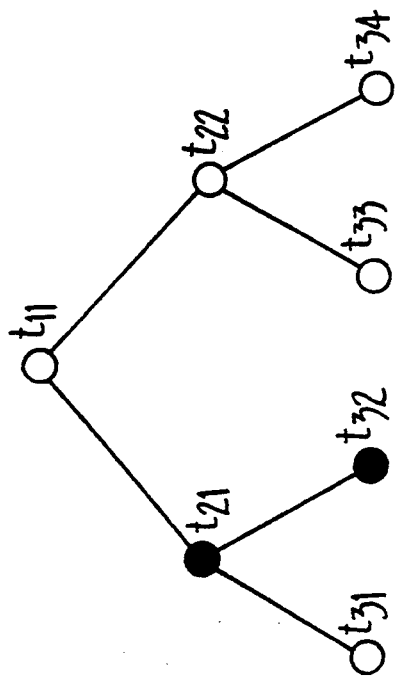
○ = "ZERO" NODE
● = "ONE" NODE
FIG._14.

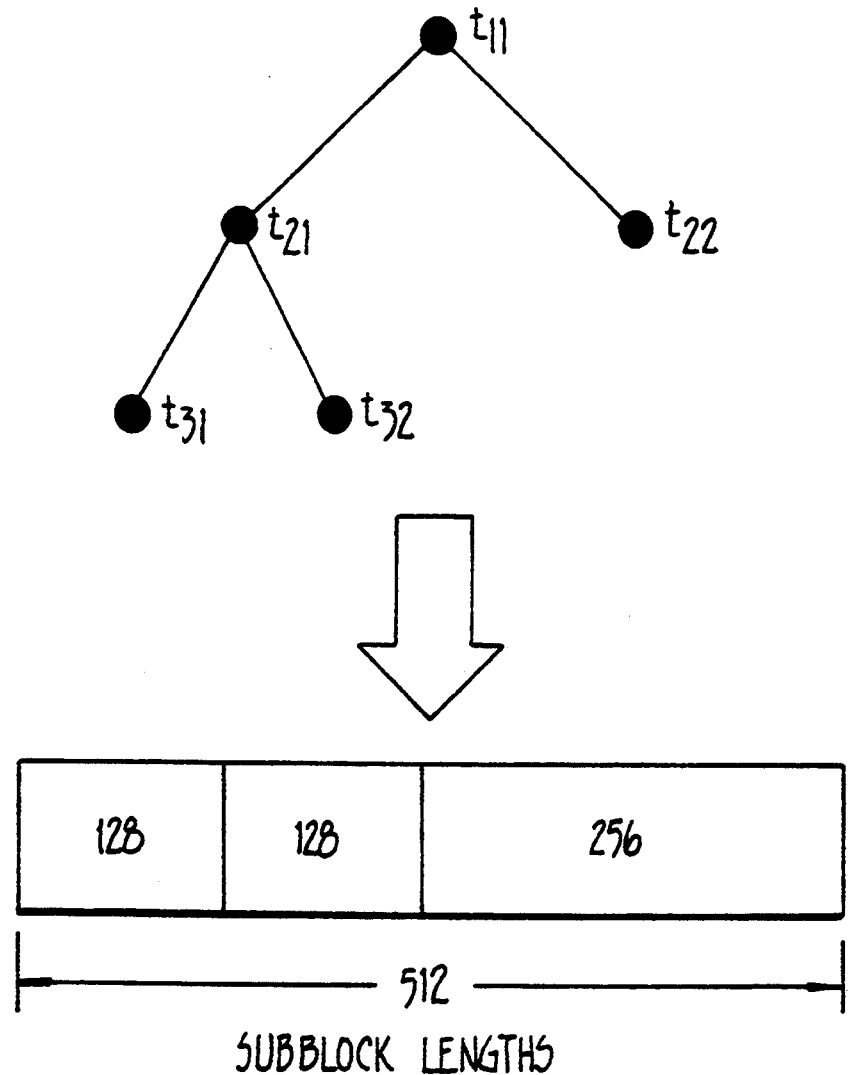
FIG._15.

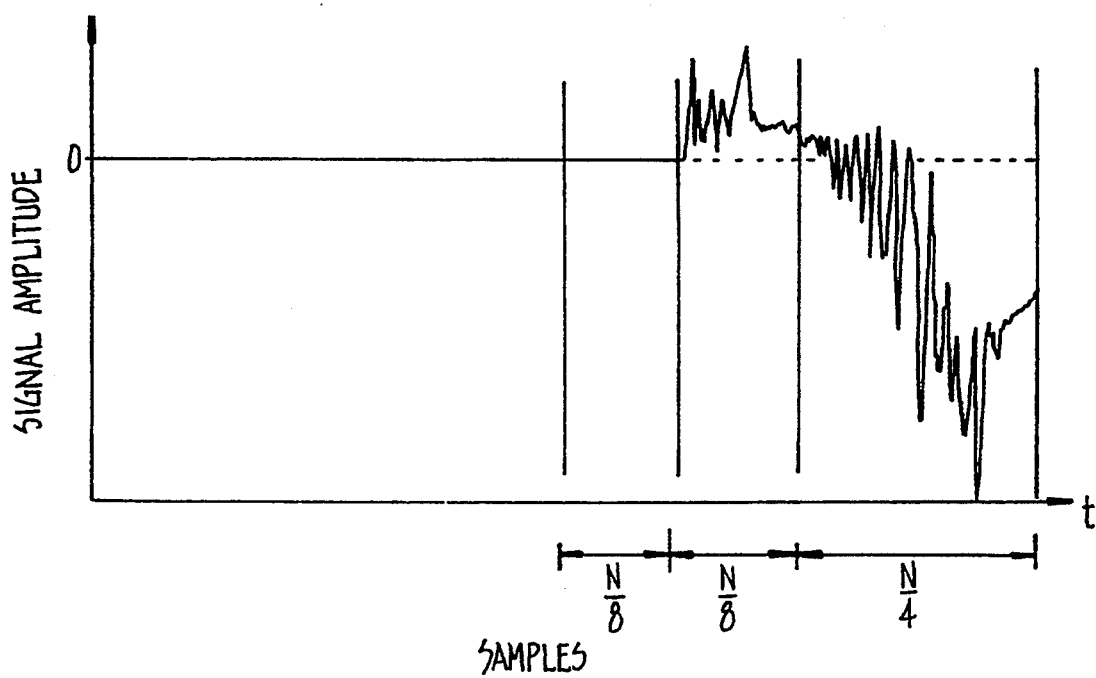
FIG._16.

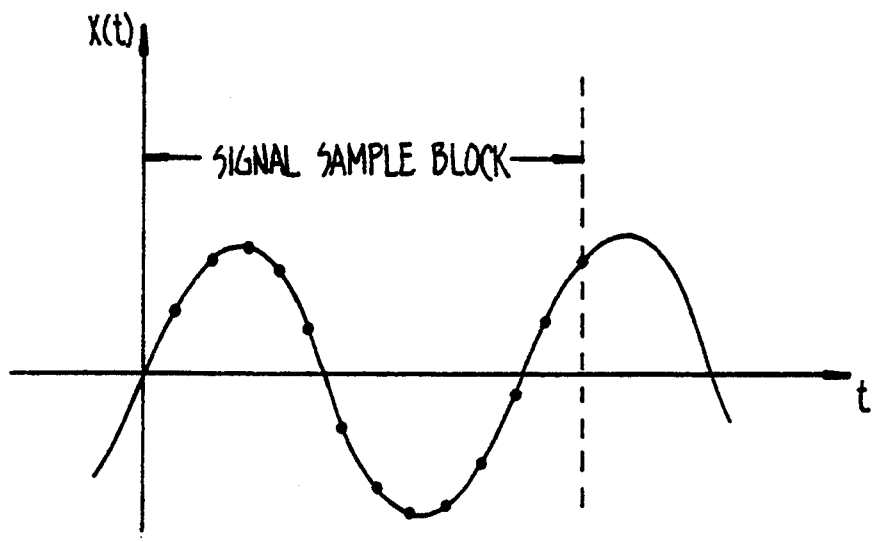
FIG._17.
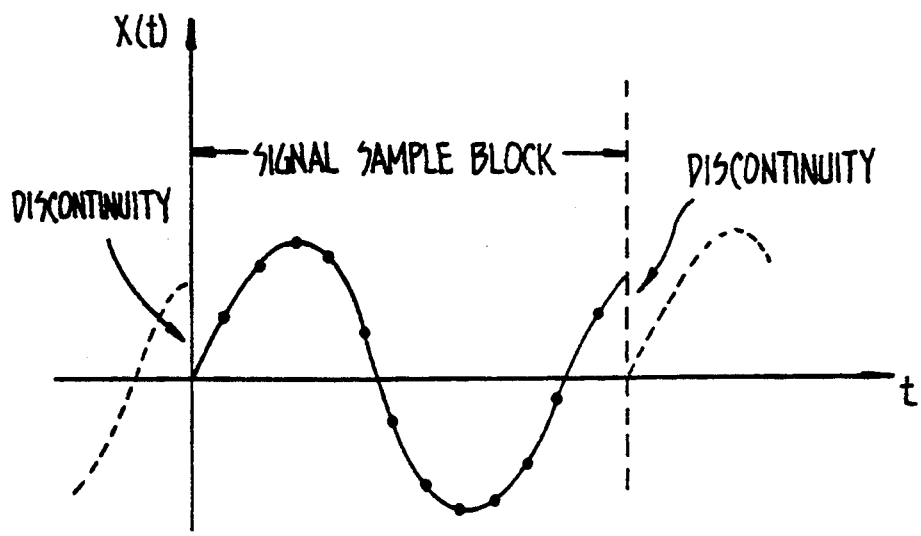
FIG._18.

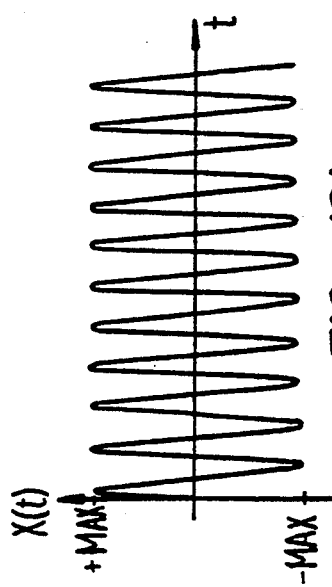
FIG._19b.
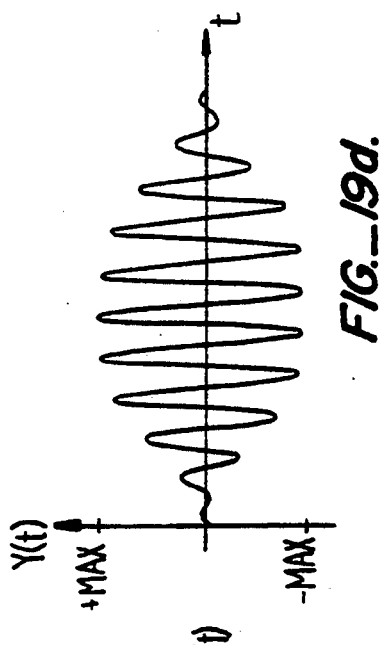
FIG._19a.
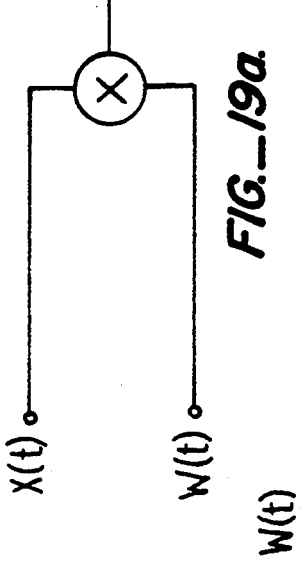
FIG._19d.
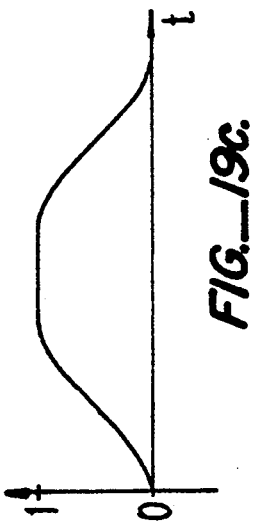
FIG._19c.

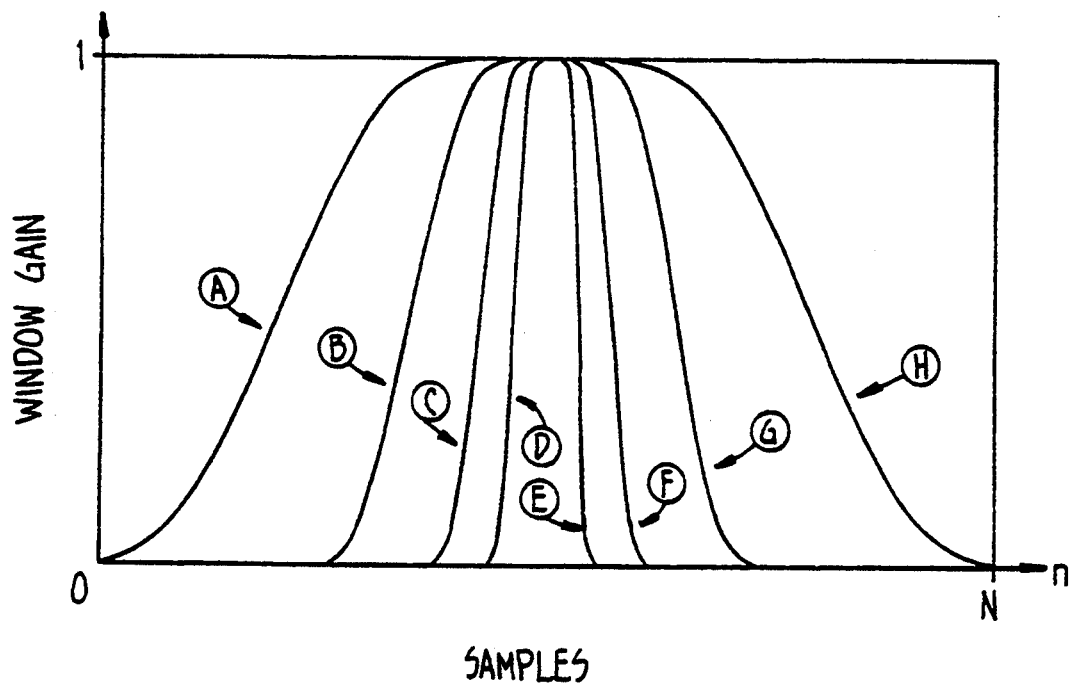
FIG._20.

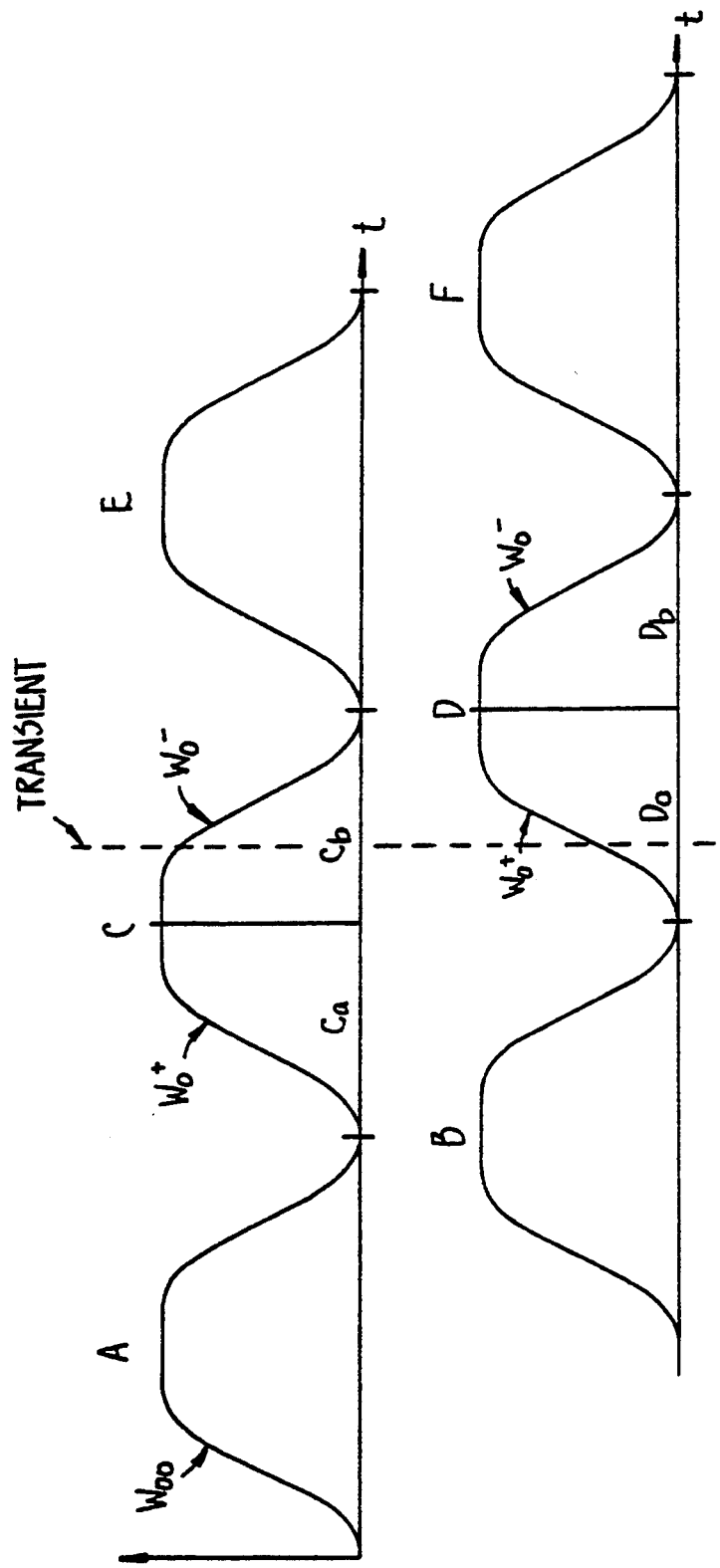
FIG._21a.

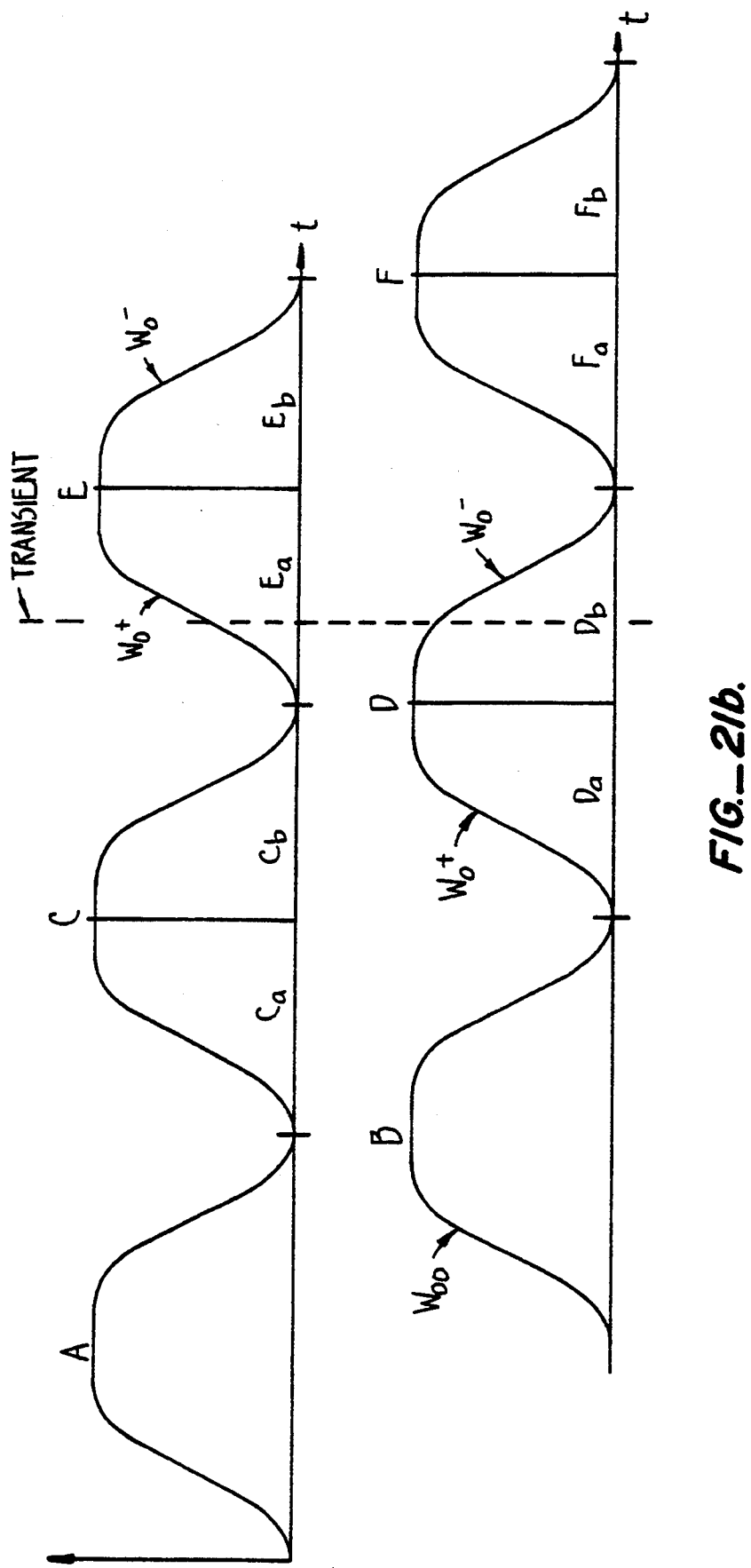
FIG.—2/b.

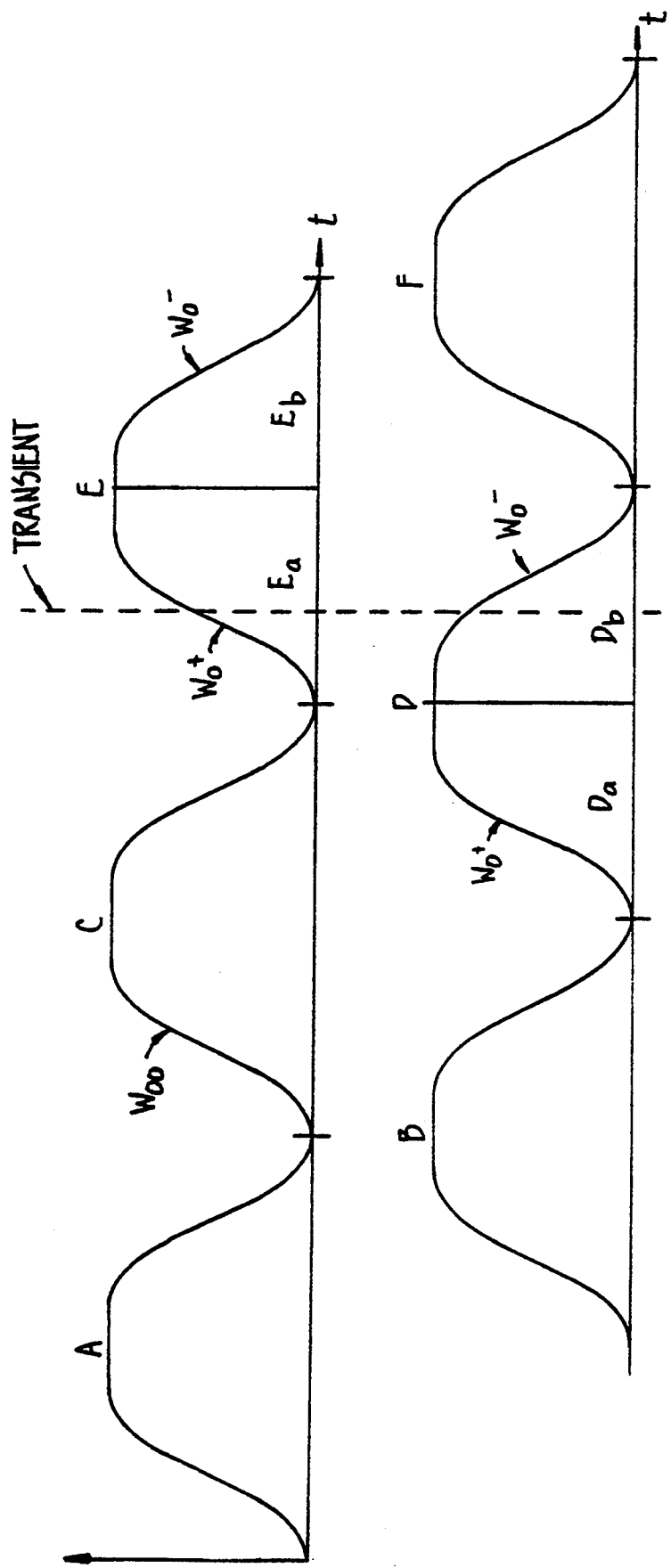

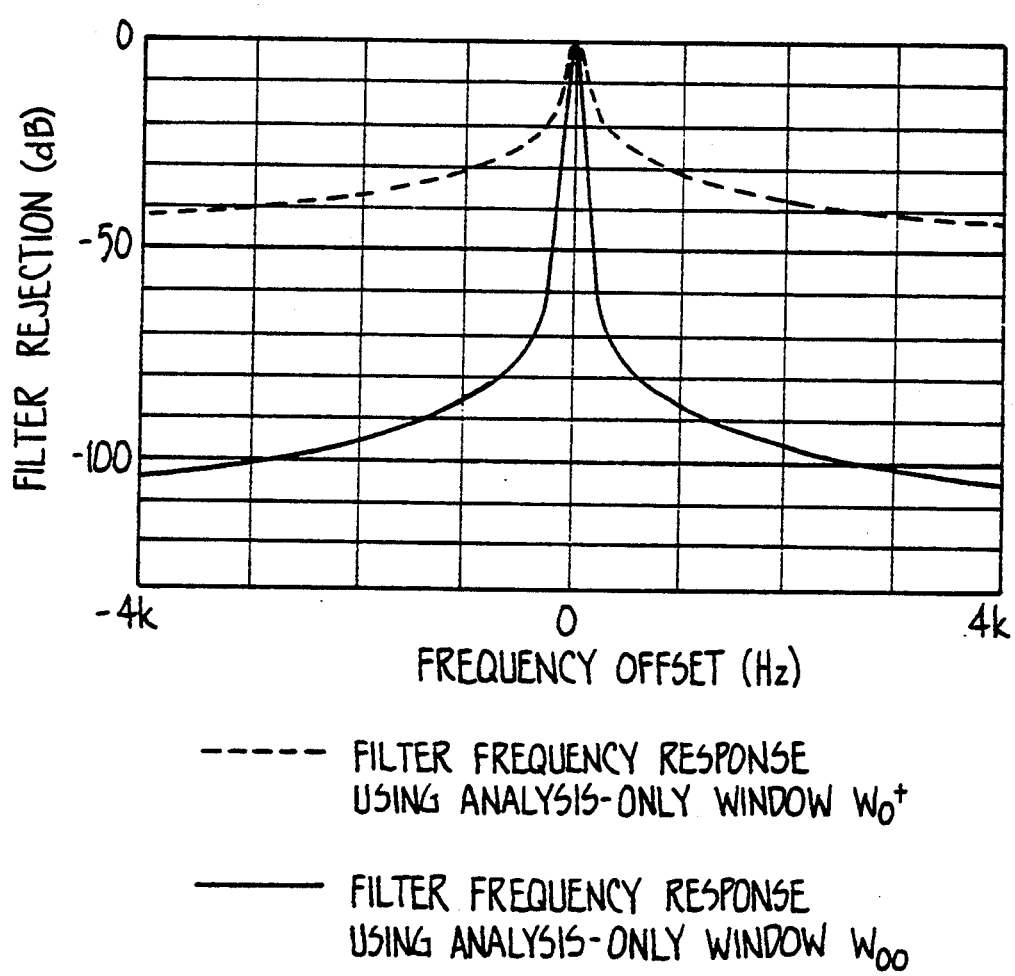
FIG._22a.

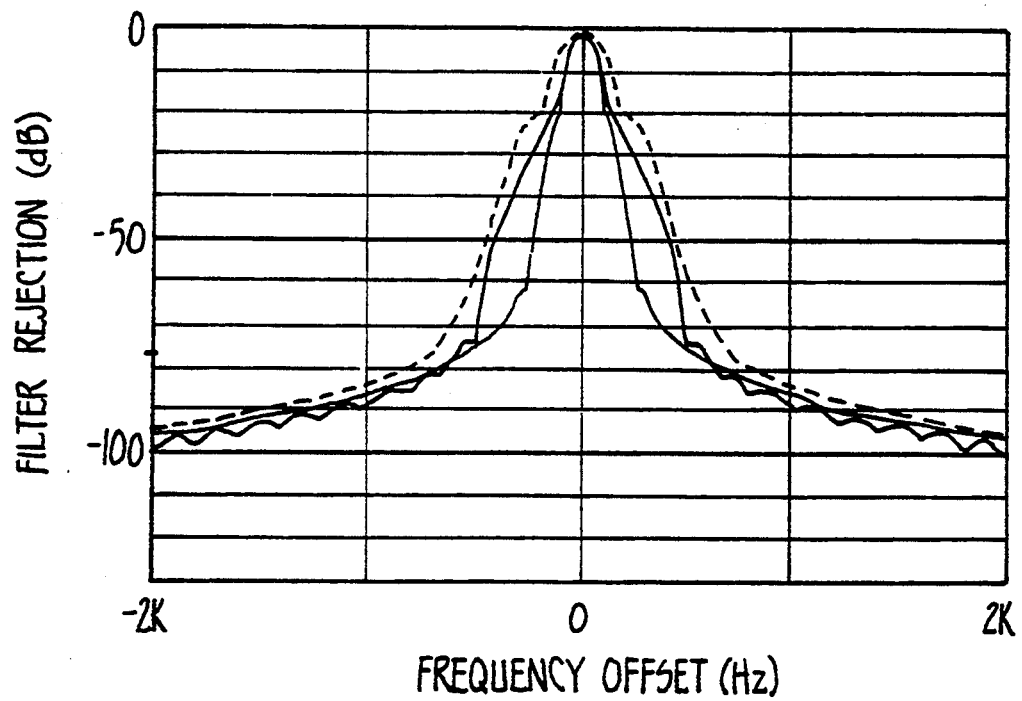
----- FILTER FREQUENCY RESPONSE USING ANALYSIS-ONLY WINDOW $W_{11}$
——— FILTER FREQUENCY RESPONSE USING ANALYSIS-ONLY WINDOW $W_{01}$
——— FILTER FREQUENCY RESPONSE USING ANALYSIS-ONLY WINDOW $W_{00}$
FIG._22b.

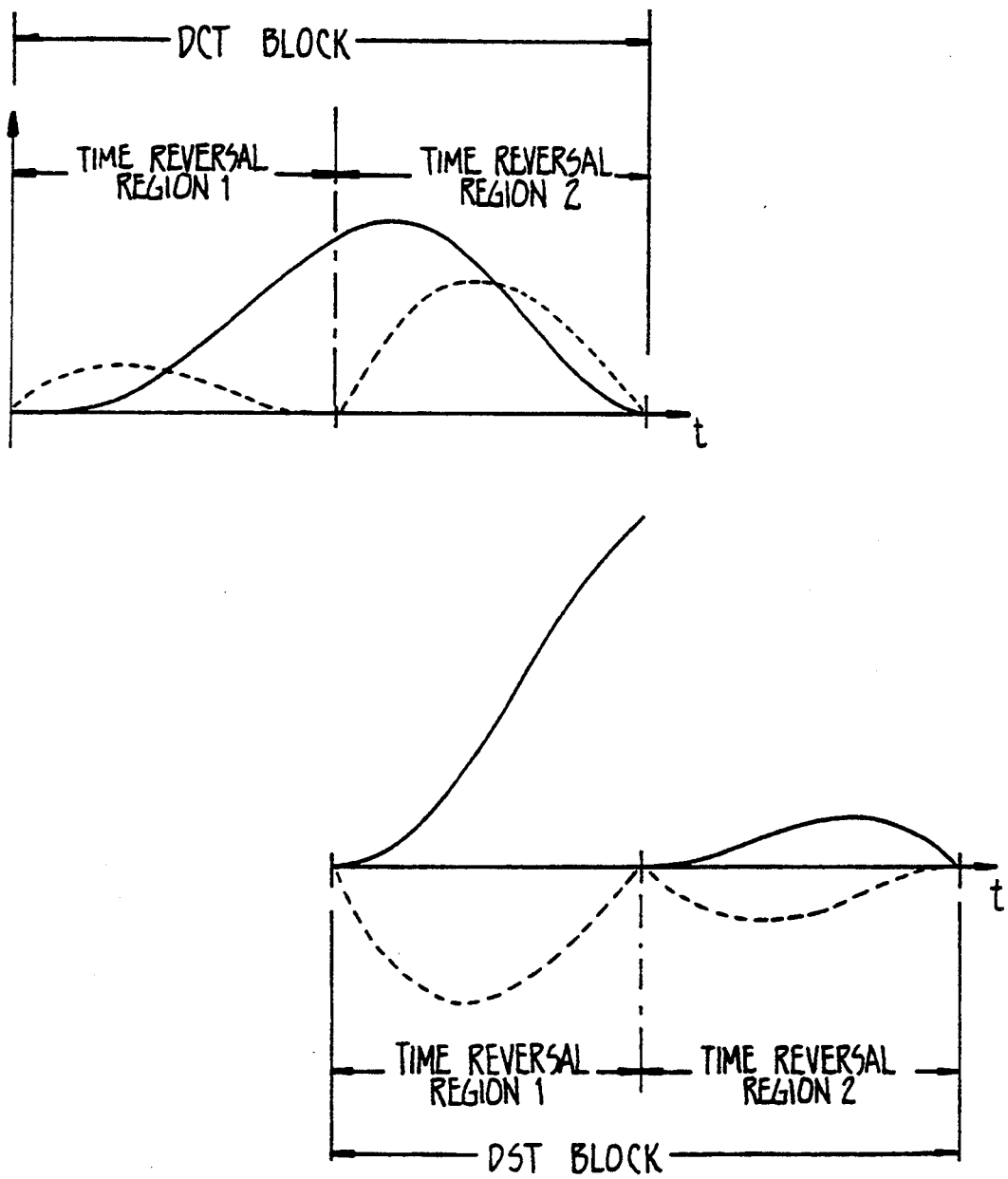
FIG._23a.

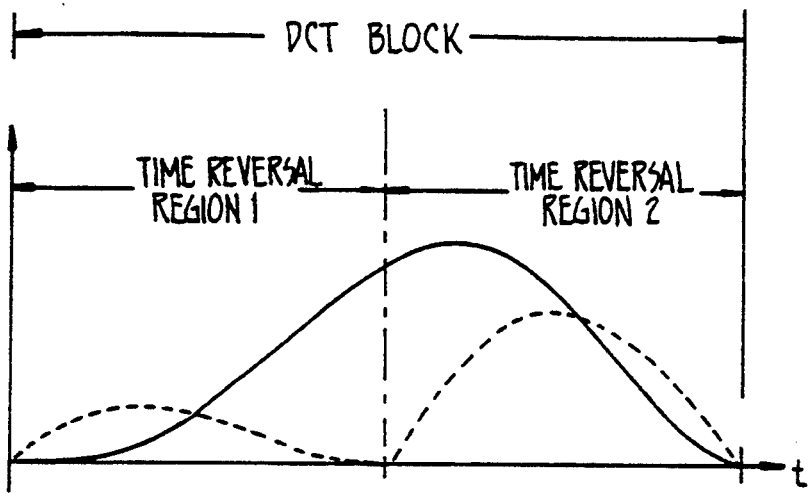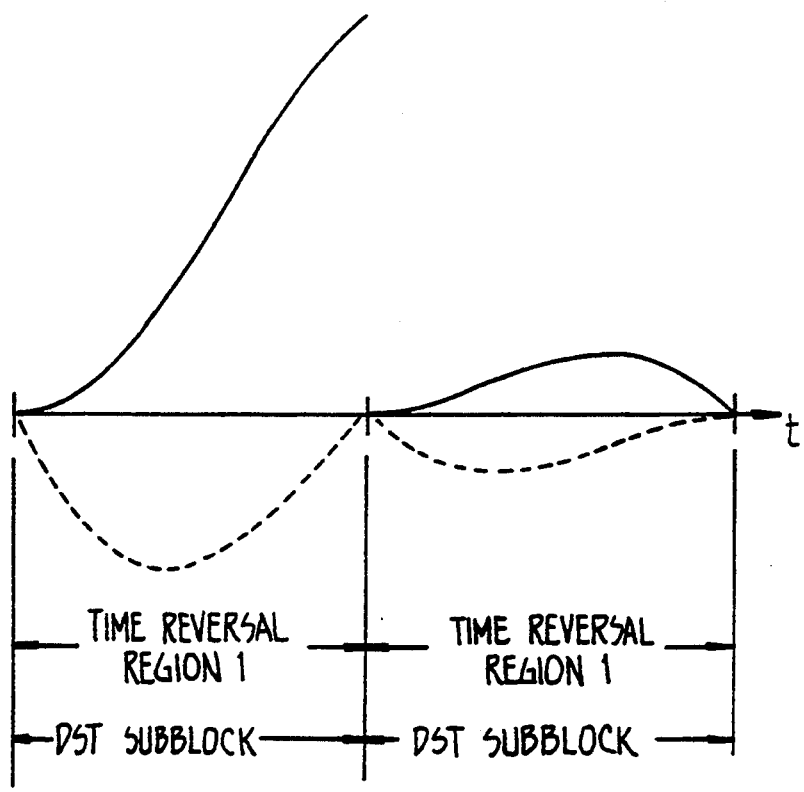
FIG._23b.

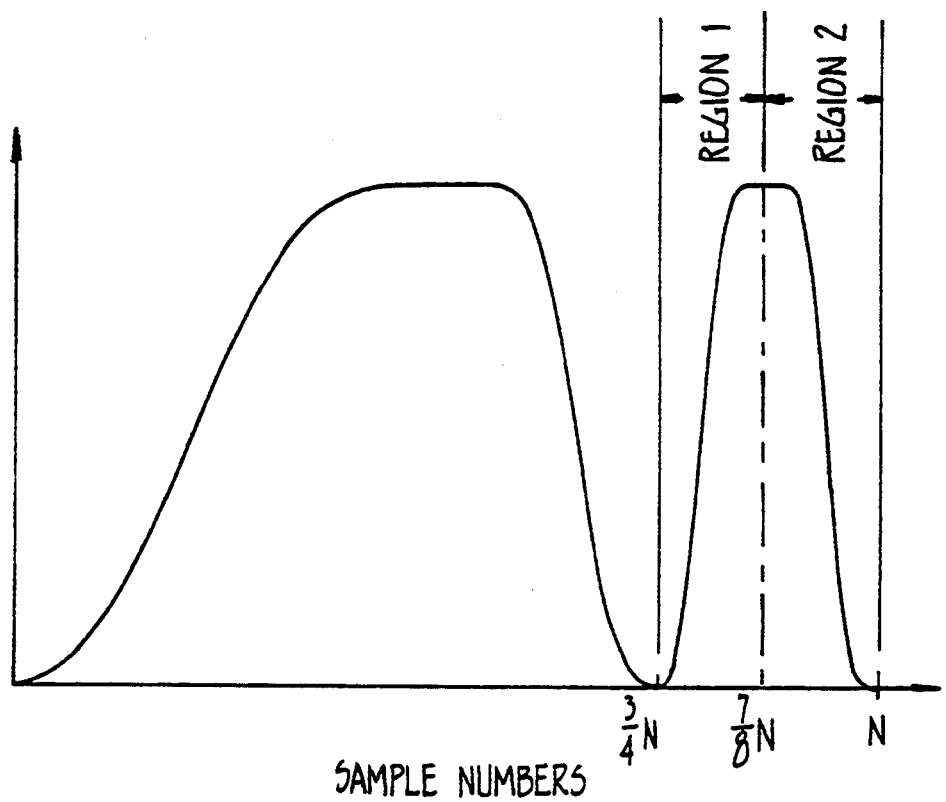
FIG._23c.
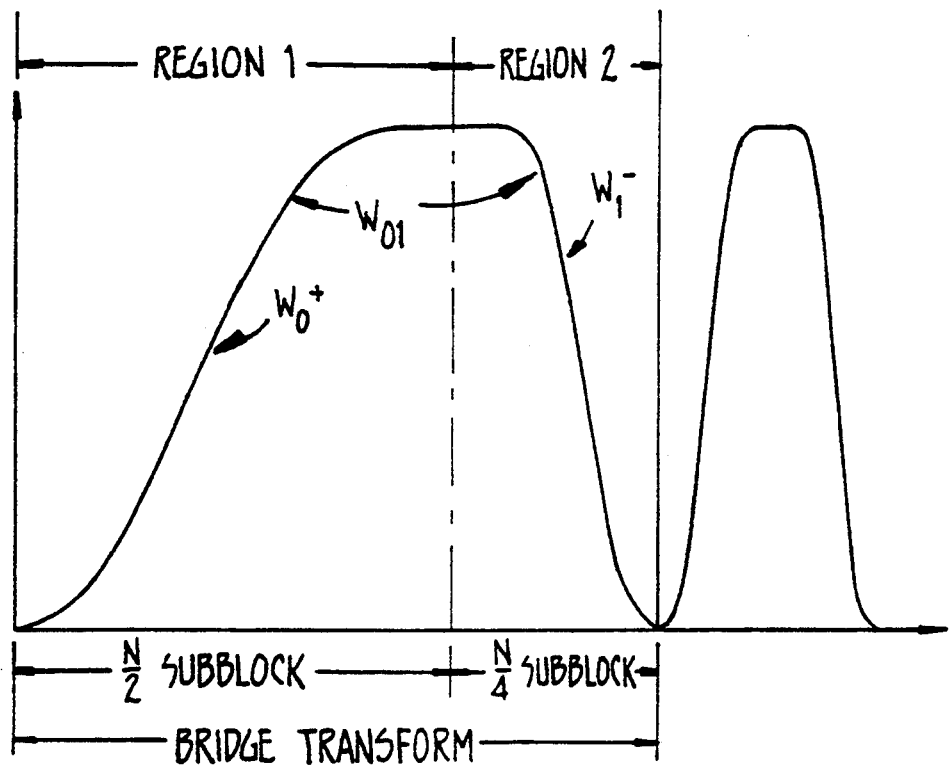
FIG._24.

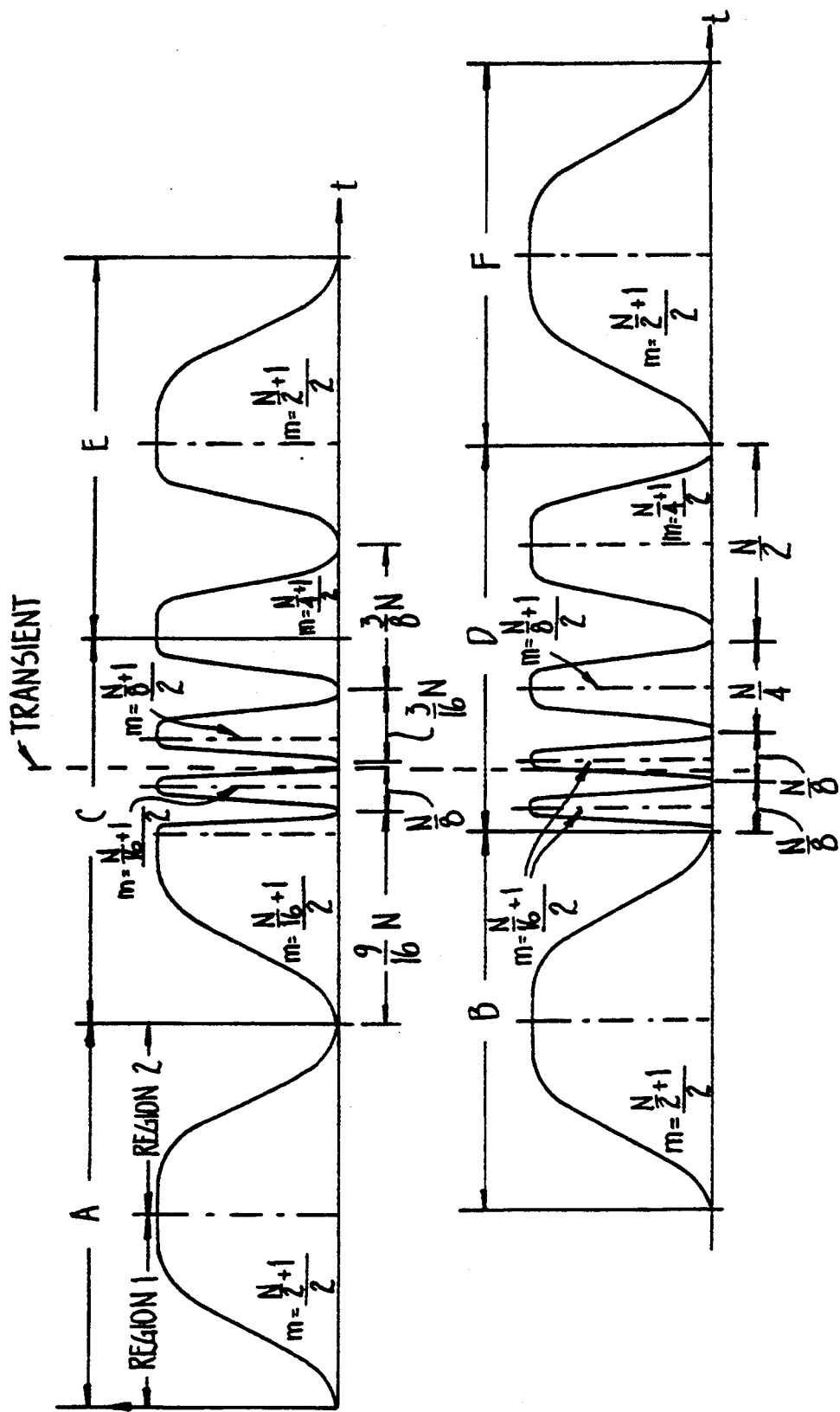
FIG._25.

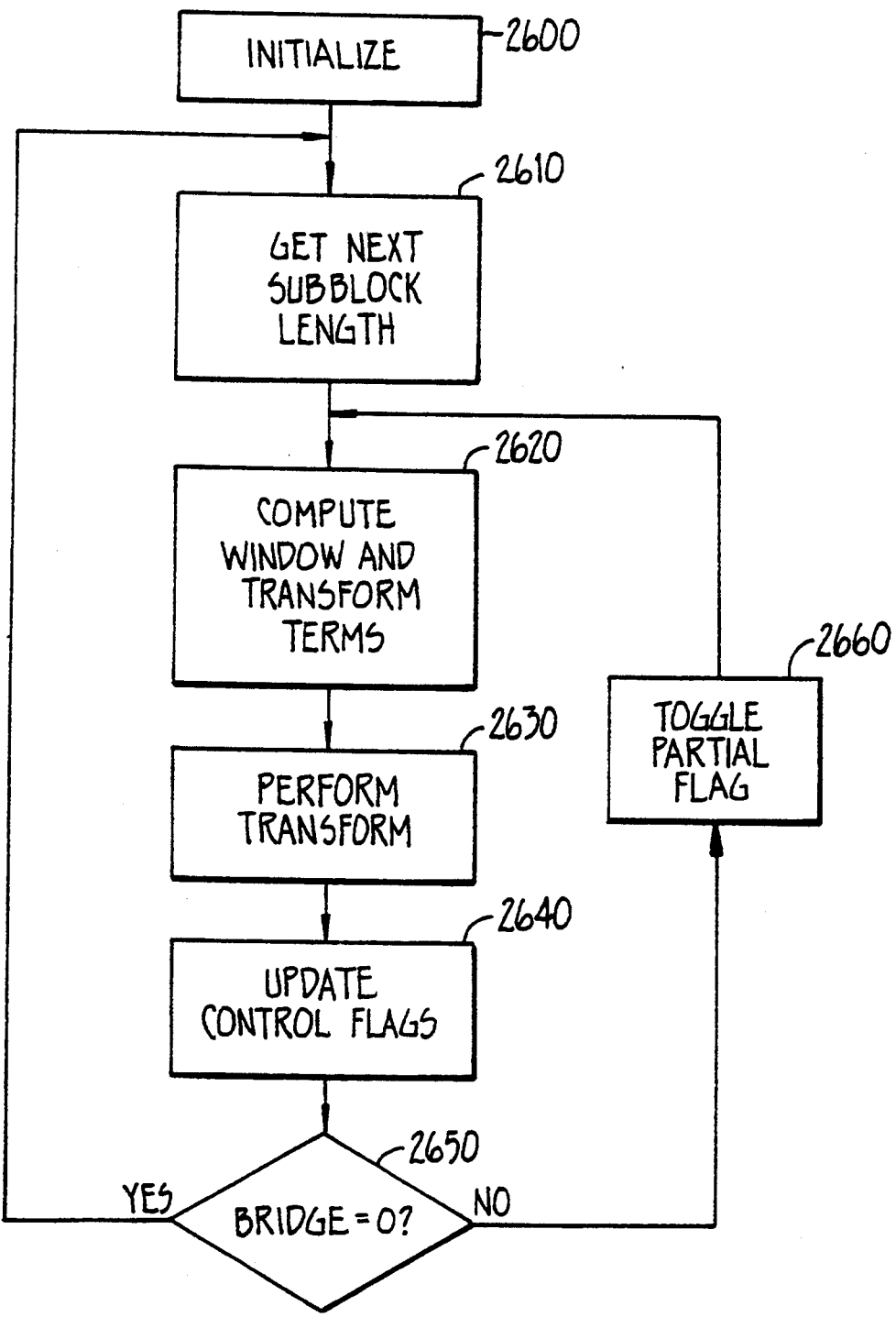
FIG._26a.

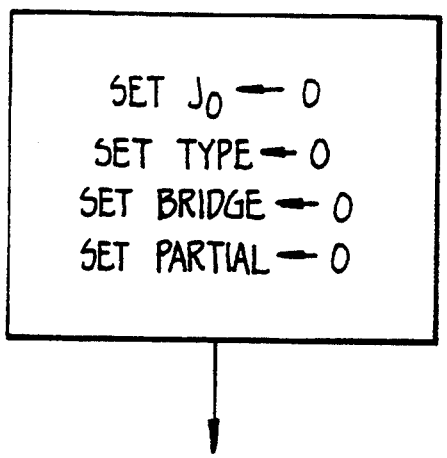
FIG._26b.
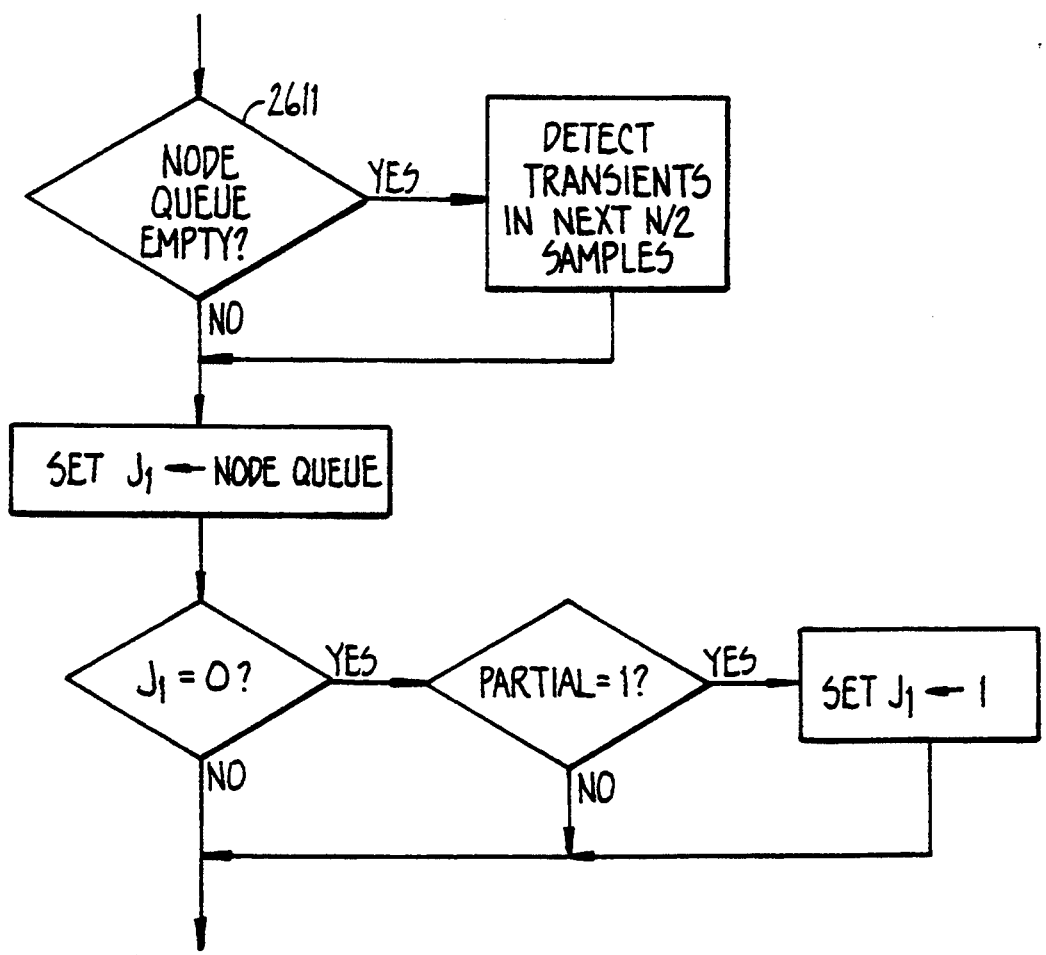
FIG._26c.

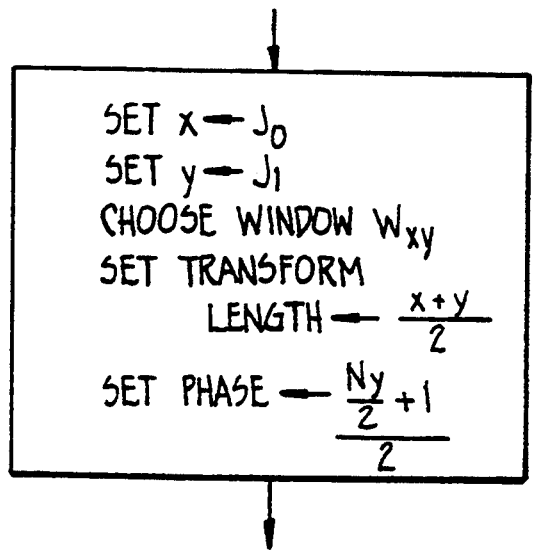
FIG._26d.
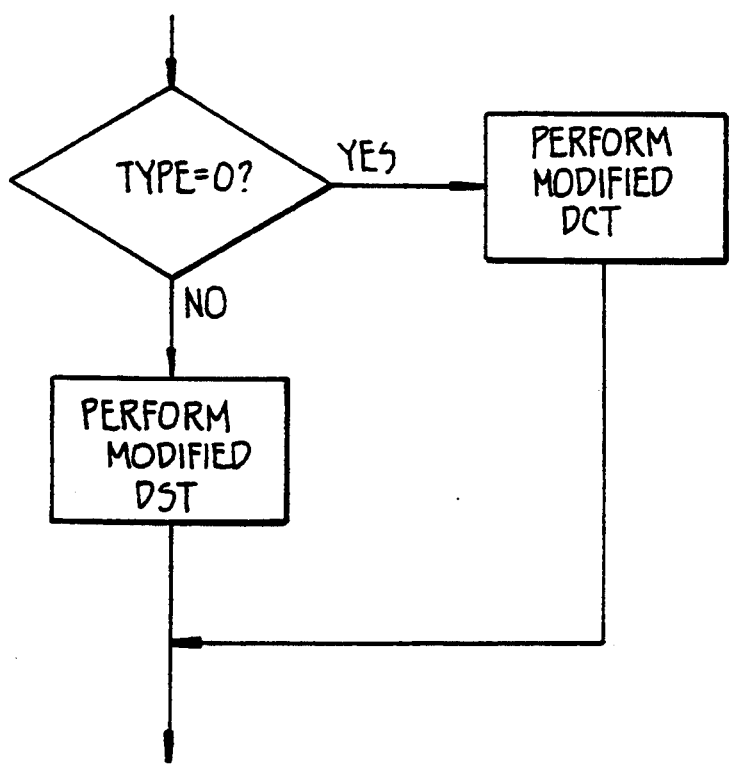
FIG._26e.

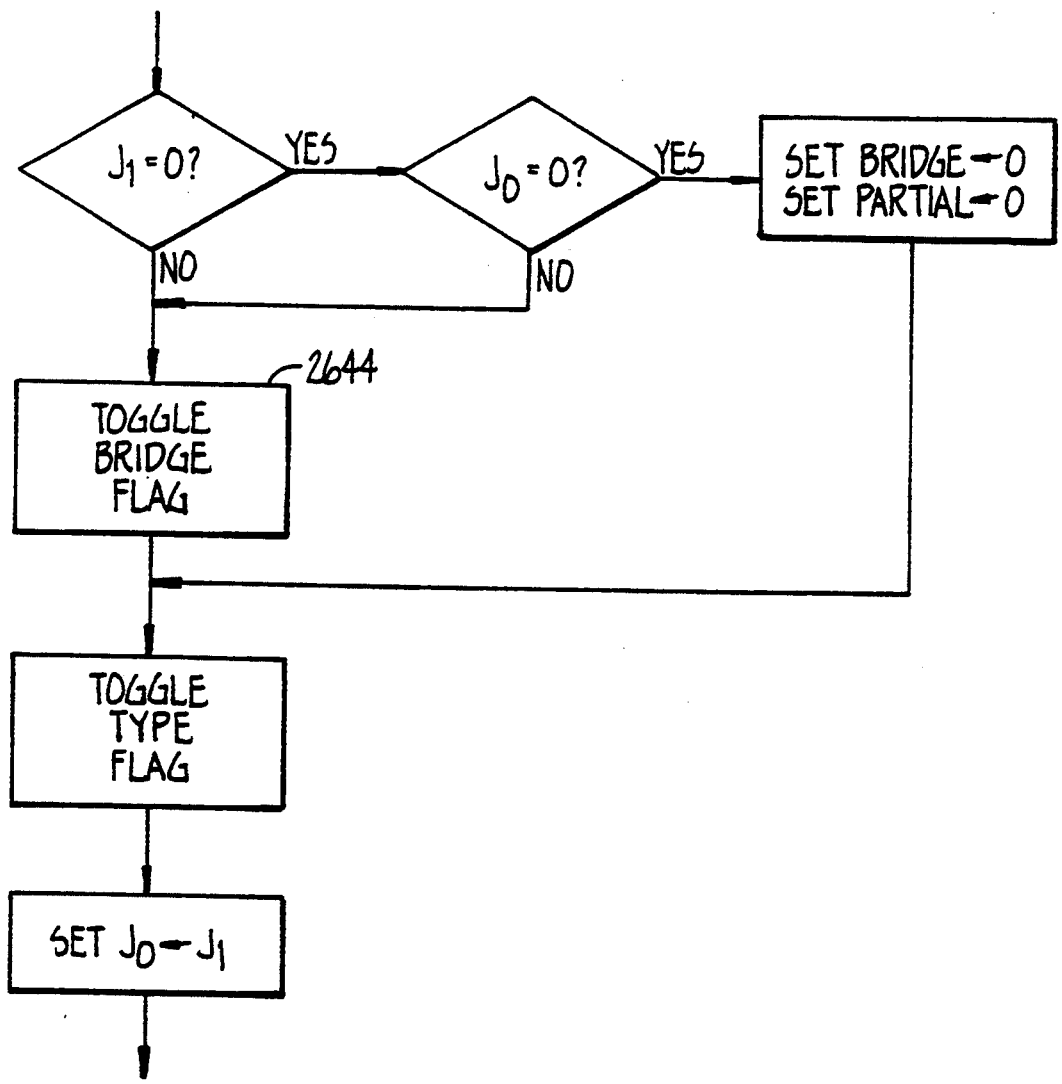
FIG._26f.

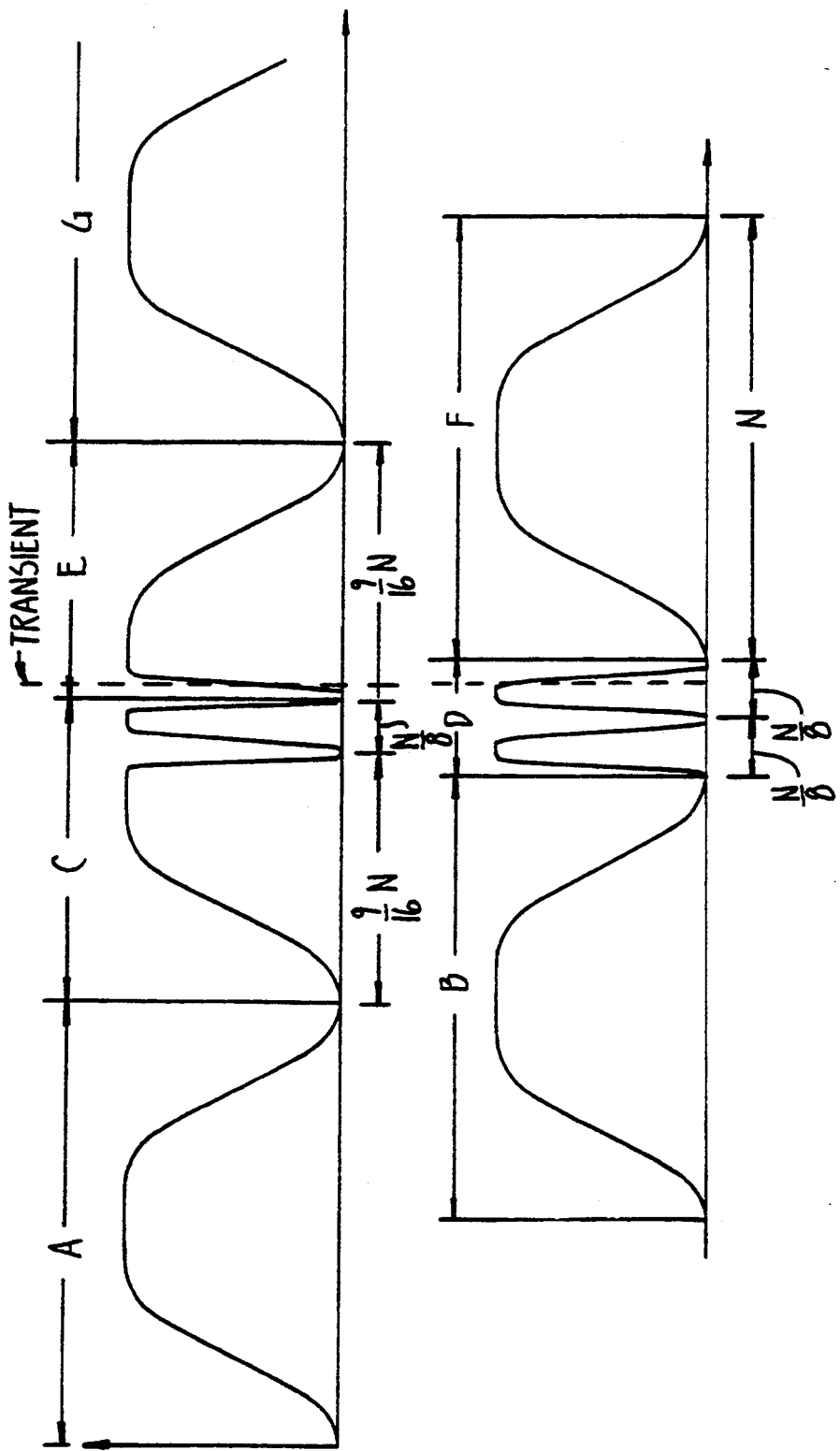
FIG._27.

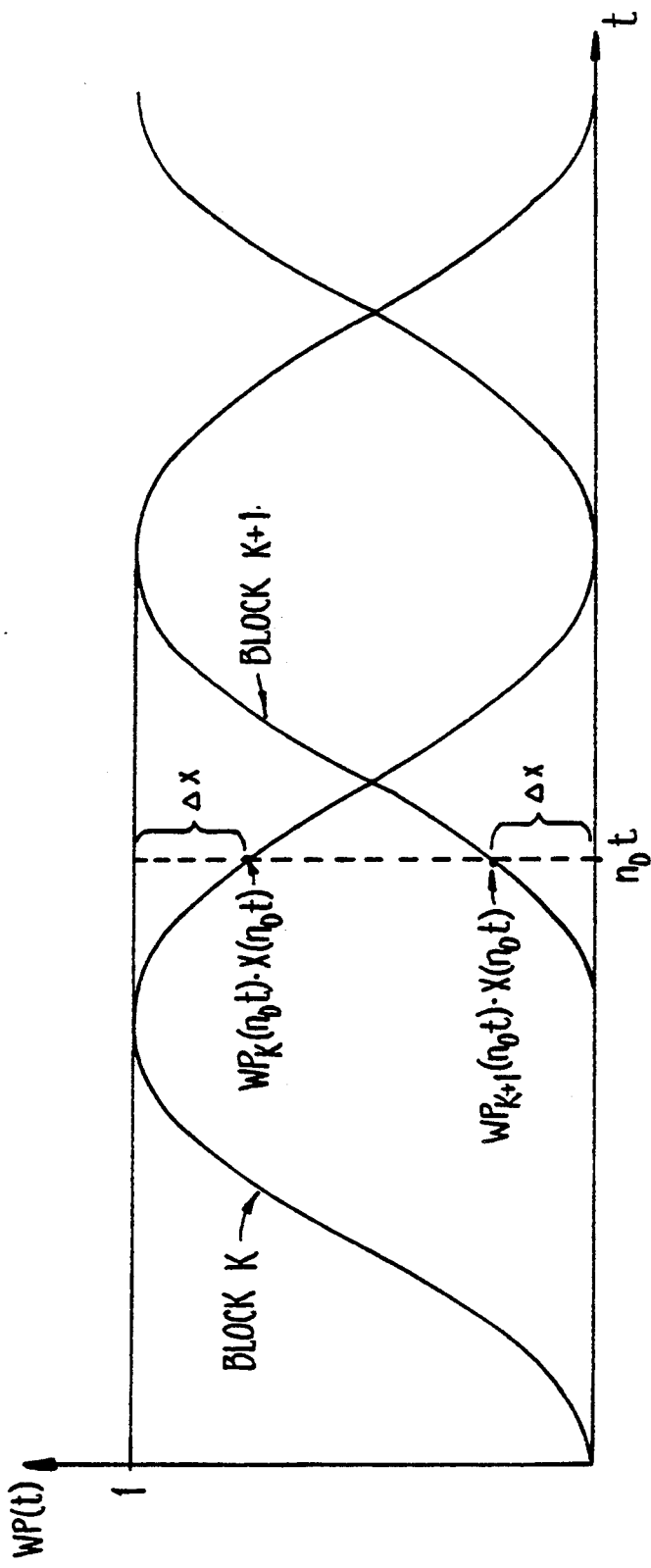
FIG._28.

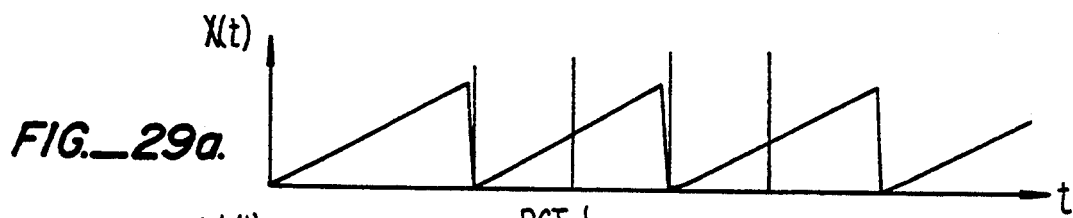
FIG._29a.
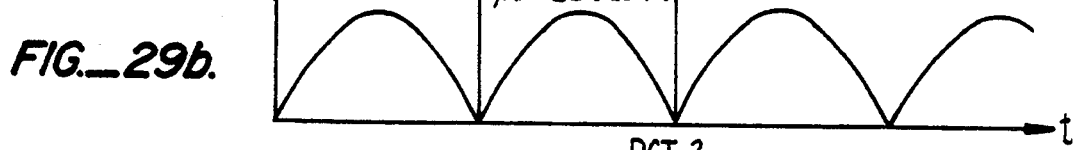
FIG._29b.
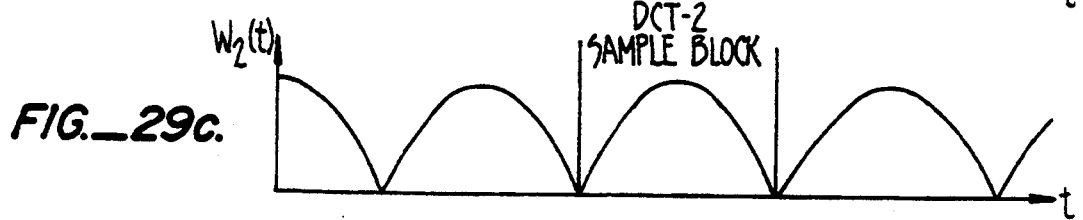
FIG._29c.
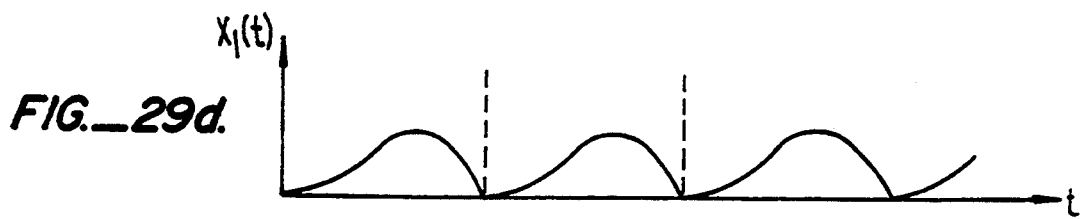
FIG._29d.
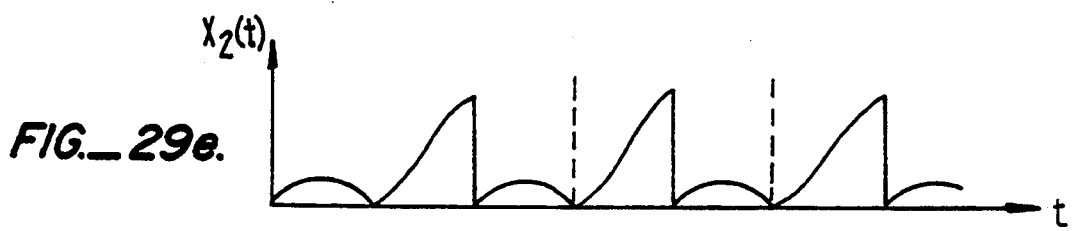
FIG._29e.

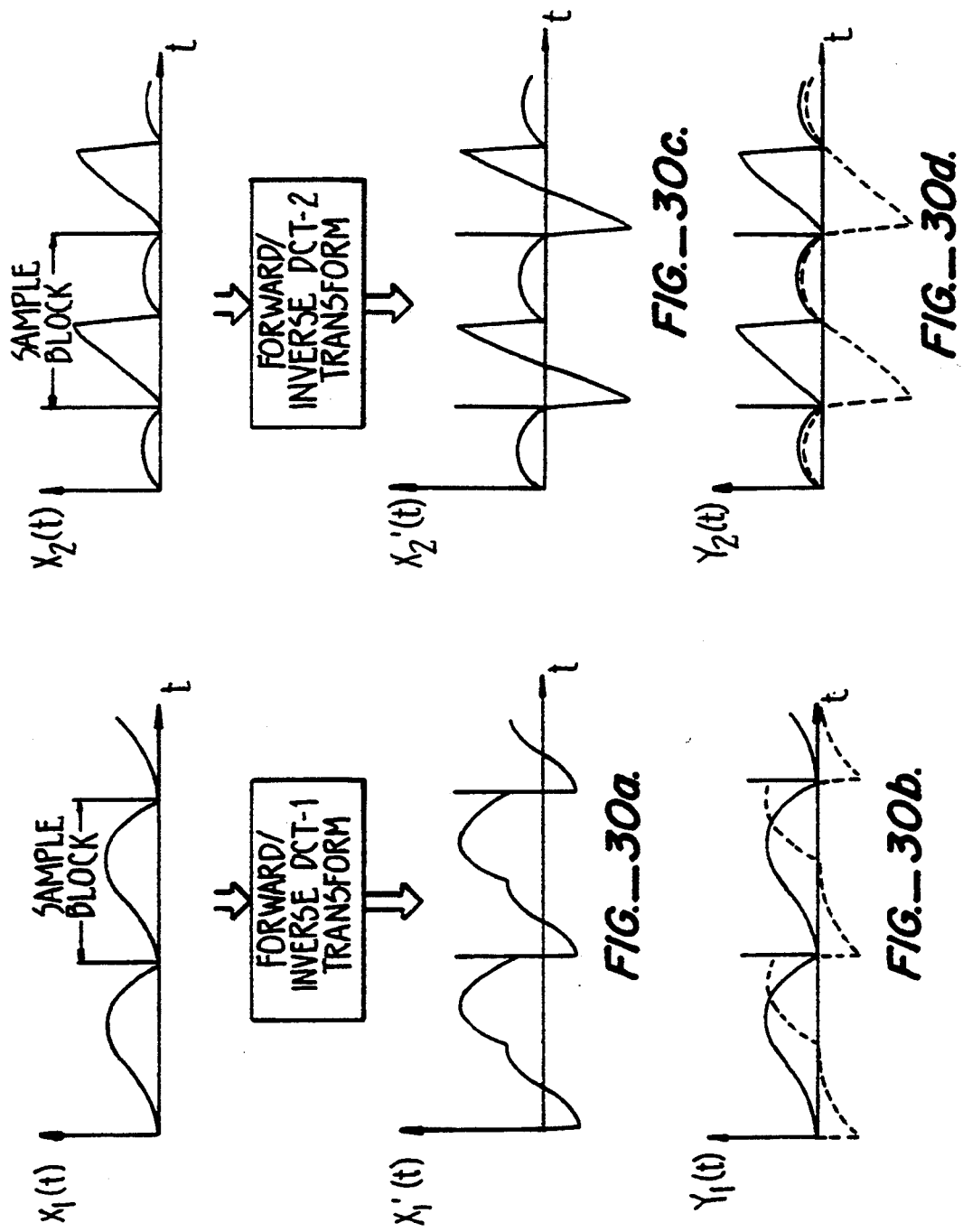

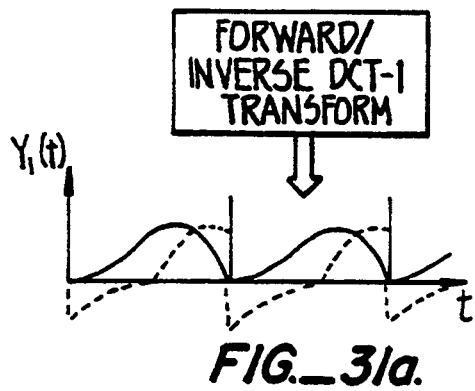
FIG._31a.
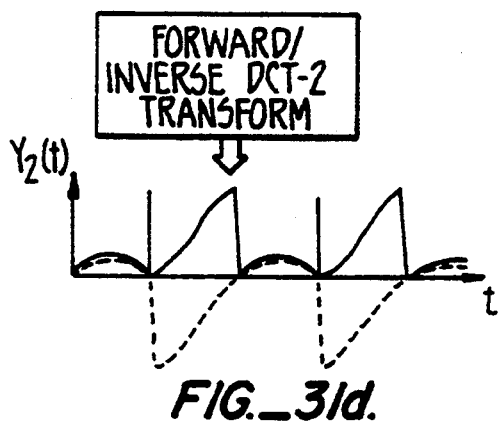
FIG._31d.
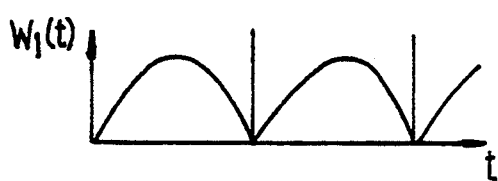
FIG._31b.
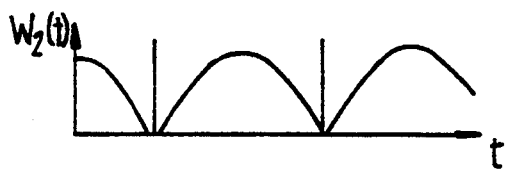
FIG._31e.
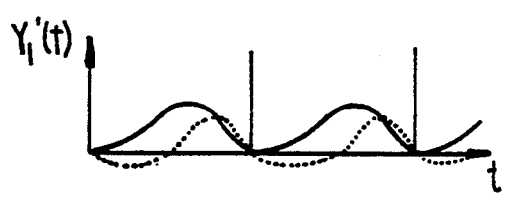
FIG._31c.
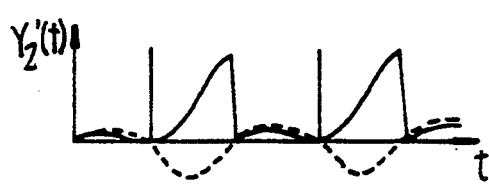
FIG._31f.
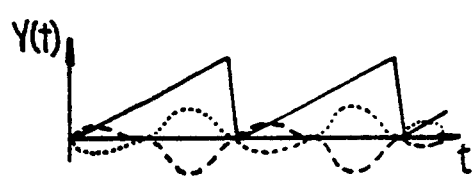
FIG._31g.

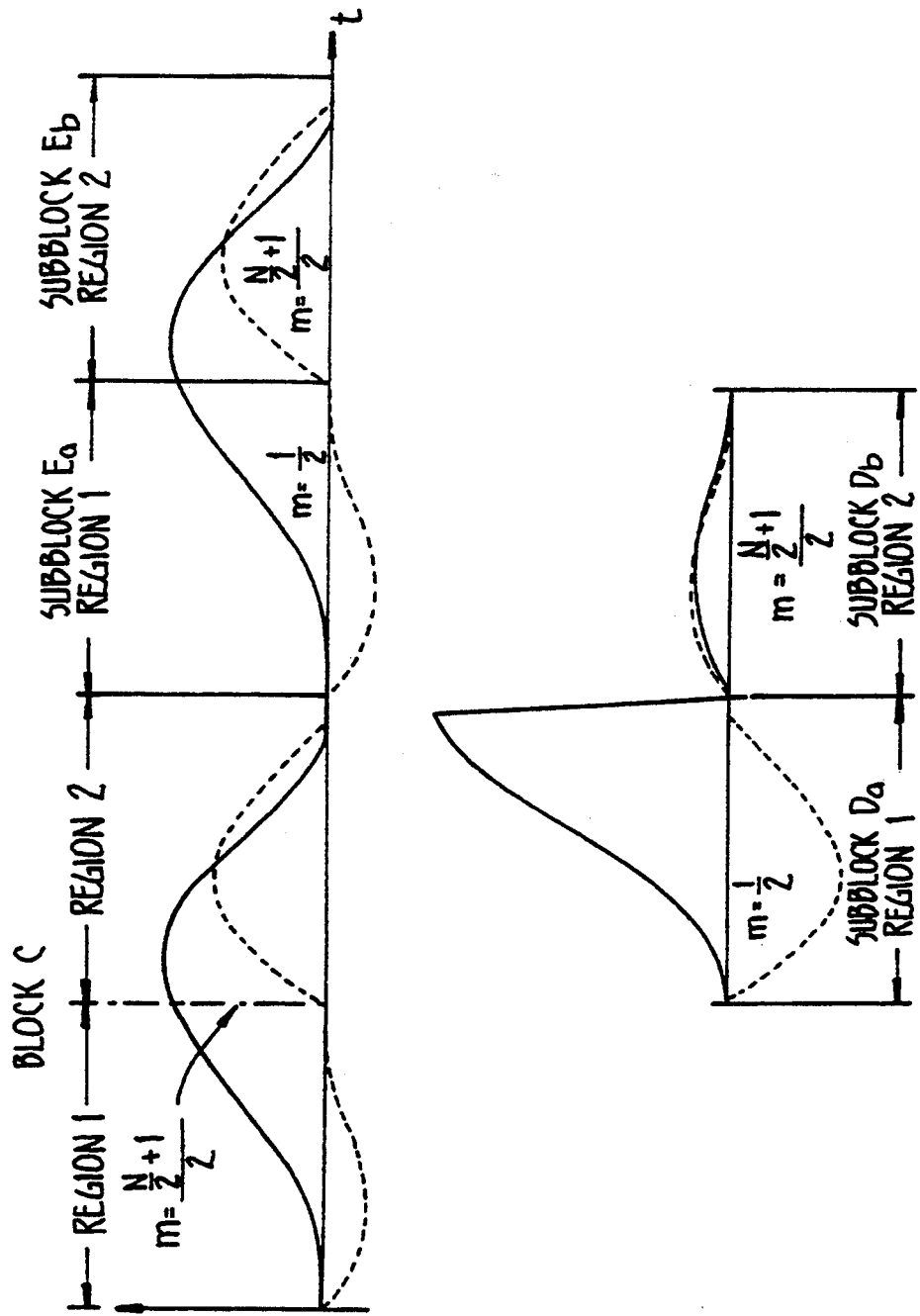
FIG._32.

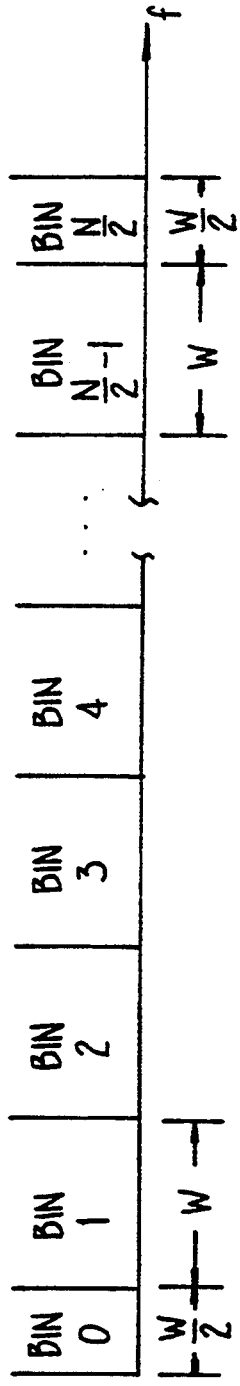
FIG._33a.
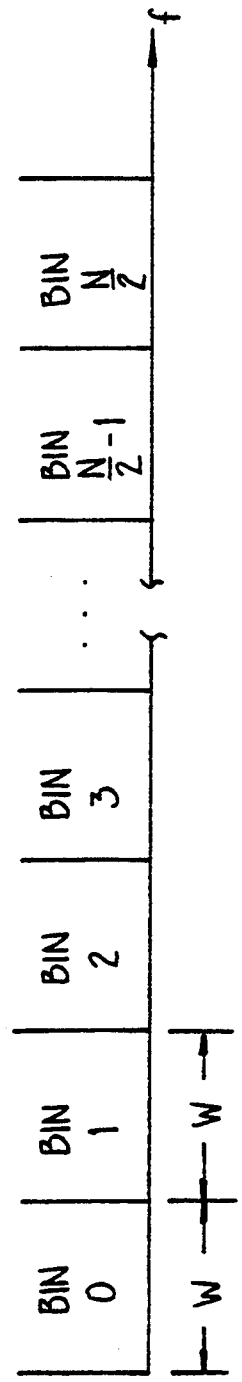
FIG._33b.

ADAPTIVE-BLOCK-LENGTH, ADAPTIVE-TRANSFORN, AND ADAPTIVE-WINDOW TRANSFORM CODER, DECODER, AND ENCODER/DECODER FOR HIGH-QUALITY AUDIO

This is a continuation-in-part of application Ser. No. 508,809, filed Apr. 12, 1990, now abandoned.

DESCRIPTION

1. Technical Field

The invention relates in general to high-quality low bit-rate digital transform coding and decoding of information corresponding to audio signals such as music or voice signals. More particularly, the invention relates to signal analysis/synthesis in coding and decoding. The invention can optimize the trade off in transform coders between time resolution and frequency resolution by adaptively selecting the transform block length for each sampled audio segment, and/or can optimize coding gain by adaptively selecting the transform and/or by adaptively selecting the analysis window or the analysis/synthesis window pair.

The invention applies to all discrete orthogonal transforms. Transform orthogonality assures that exact signal reconstruction can be achieved by the forward/inverse transform pair. Hence for orthogonal transforms, this invention permits adaptive selection of the block length and/or adaptive selection of the transform without loss of information, i.e., in the absence of quantization errors, the original signal can be exactly recovered by the decoder portion of the invention.

The preferred embodiment of the invention, however, uses nonorthogonal transforms. In this preferred embodiment of the invention, a transform coder adapts the transform, and/or the analysis/synthesis window pair, and/or the block-length while retaining transform properties of complete aliasing cancellation in the absence of coefficient quantization errors and critical sampling.

2. Background Art

There is considerable interest among those in the field of signal processing to minimize the amount of information required to represent a signal without perceptible loss in signal quality. By reducing information requirements, signals impose lower information capacity requirements upon communication channels and storage media. With respect to digital coding techniques, minimal informational requirements are synonymous with minimal binary bit requirements.

Bit requirements for digital signals coded by techniques such as pulse code modulation (PCM) are proportional to the number of digitized signal samples and to the number of bits used to represent each digitized signal sample. The number of samples for a given segment of signal is determined by the sampling rate.

The minimum sampling rate is dictated by the Nyquist theorem. The Nyquist theorem holds that a signal may be accurately recovered from discrete samples when the interval between samples is no larger than one-half the period of the signal's highest frequency component. When the sampling rate is below this Nyquist rate, higher-frequency components are misrepresented as lower-frequency components. The lower-frequency component is an "alias" for the true component.

The number of bits used to represent each digitized signal sample determines the accuracy of the signal representation by the encoded signal samples. Lower bit rates generally mean that fewer bits are available to represent each sample, therefore lower bit rates imply greater quantizing inaccuracies or quantizing errors. In many applications, quantizing errors are manifested as quantizing noise, and if the errors are of sufficient magnitude, the noise will degrade the subjective quality of the coded signal.

Critical Bands and Psychoacoustic Masking

Some prior art techniques for coding audio signals intended for human hearing attempt to reduce information requirements without producing any audible degradation by exploiting psychoacoustic effects. The human ear displays frequency-analysis properties resembling those of highly asymmetrical tuned filters having variable center frequencies. The ability of the human ear to detect distinct tones generally increases as the difference in frequency between the tones increases, however, the ear's resolving ability remains substantially constant for frequency differences less than the bandwidth of the above mentioned filters. Thus, the frequency-resolving ability of the human ear varies according to the bandwidth of these filters throughout the audio spectrum. The effective bandwidth of such an auditory filter is referred to as a critical band. A dominant signal within a critical band is more likely to mask the audibility of other signals anywhere within that critical band than other signals at frequencies outside that critical band. A dominant signal may mask other signals which occur not only at the same time as the masking signal, but also which occur before and after the masking signal. The duration of pre- and postmasking effects within a critical band depend upon the magnitude of the masking signal, but premasking effects are usually of much shorter duration than postmasking effects. See generally, the *Audio Engineering Handbook*, K. Blair Benson ed., McGraw-Hill, San Francisco, 1988, pages 1.40–1.42 and 4.8–4.10.

Signal recording and transmitting techniques which divide the useful signal bandwidth into frequency bands with bandwidths approximating the ear's critical bands can better exploit psychoacoustic effects than wider band techniques. Techniques which exploit psychoacoustic masking effects can encode and reproduce a signal that is indistinguishable from the original input signal using a bit rate below that required by PCM coding.

Critical band techniques comprise dividing the signal bandwidth into frequency bands, processing the signal in each frequency band, and reconstructing a replica of the original signal from the processed signal in each frequency band. Two such techniques are subband coding and transform coding. Subband and transform coders can reduce transmitted informational requirements in particular frequency bands where the resulting coding inaccuracy (noise) is psychoacoustically masked by neighboring spectral components without degrading the subjective quality of the encoded signal.

Subband coding may be implemented by a bank of digital bandpass filters. Transform coding may be implemented by any of several time-domain to frequency-domain discrete transforms which implement a bank of digital bandpass filters. The remaining discussion relates more particularly to transform coders, therefore the term "subband" is used here to refer to selected portions of the total signal bandwidth, whether implemented by a subband coder or a transform coder. A subband as implemented by a transform coder is defined by a set of one or more adjacent transform coefficients, hence, the subband bandwidth is a multiple of the transform coefficient bandwidth. The bandwidth of a transform coefficient is proportional to the input signal sampling rate and inversely proportional to the number of coefficients generated by the transform to represent the input signal.

Psychoacoustic masking may be more easily accomplished by transform coders if the subband bandwidth throughout the audible spectrum is about half the critical bandwidth of the human ear in the same portions of the spectrum. This is because the critical bands of the human ear have variable center frequencies that adapt to auditory stimuli, whereas subband and transform coders typically have fixed subband center frequencies. To optimize the utilization of psychoacoustic-masking effects, any distortion artifacts resulting from the presence of a dominant signal should be limited to the subband containing the dominant signal. If the subband bandwidth is about half or less than half of the critical band and if filter selectivity is sufficiently high, effective masking of the undesired distortion products is likely to occur even for signals whose frequency is near the edge of the subband passband bandwidth. If the subband bandwidth is more than half a critical band, there is the possibility that the dominant signal will cause the ear's critical band to be offset from the coder's subband such that some of the undesired distortion products outside the ear's critical bandwidth are not masked. This effect is most objectionable at low frequencies where the ear's critical band is narrower.

The probability that a dominant signal will cause the ear's critical band to offset from a coder subband and thereby "uncover" other signals in the same coder subband is generally greater at low frequencies where the ear's critical band is narrower. In transform coders, the narrowest possible subband is one transform coefficient, therefore psychoacoustic masking may be more easily accomplished if the transform coefficient bandwidth does not exceed one half the bandwidth of the ear's narrowest critical band. The transform coefficient bandwidth may be decreased by increasing the length of the transform. One disadvantage of increasing the length of the transform is an increase in the processing complexity to compute the transform and to encode larger numbers of narrower subbands. Other disadvantages are discussed below.

Of course, psychoacoustic masking may be achieved using wider subbands if the center frequency of these subbands can be shifted to follow dominant signal components in much the same way the ear's critical band center frequency shifts.

The ability of a transform coder to exploit psychoacoustic masking effects also depends upon the selectivity of the filter bank implemented by the transform. Filter "selectivity," as that term is used here, refers to two characteristics of subband bandpass filters. The first is the bandwidth of the regions between the filter passband and stopbands (the width of the transition bands). The second is the attenuation level in the stopbands. Thus, filter selectivity refers to the steepness of the filter response curve within the transition bands (steepness of transition band rolloff), and the level of attenuation in the stopbands (depth of stopband rejection).

Filter selectivity is directly affected by numerous factors including the three factors discussed below: block length, window weighting functions, and transforms. In a very general sense, block length affects coder temporal and frequency resolution, and windows and transforms affect coding gain.

Block Length

The input signal to be encoded is sampled and segmented into "signal sample blocks" prior to subband filtering. The number of samples in the signal sample block is the signal sample block length.

It is common for the number of coefficients generated by a transform filter bank (the transform length) to be equal to the signal sample block length, but this is not necessary. For example, the overlapping-block transform used in a preferred embodiment of the present invention (discussed more fully below) is sometimes described in the art as a transform of length N that transforms signal sample blocks with 2N samples. But this transform can also be described as a transform of length 2N which generates only N unique coefficients. Because all the transforms discussed here can be thought to have lengths equal to the signal sample block length, the two lengths are generally used here as synonyms for one another.

The signal sample block length affects the temporal and frequency resolution of a transform coder. Transform coders using shorter block lengths have poorer frequency resolution because the discrete transform coefficient bandwidth is wider and filter selectivity is lower (decreased rate of transition band rolloff and a reduced level of stopband rejection). This degradation in filter performance causes the energy of a single spectral component to spread into neighboring transform coefficients. This undesirable spreading of spectral energy is the result of degraded filter performance called "sidelobe leakage."

Transform coders using longer block lengths have poorer temporal resolution because quantization errors will cause a transform encoder/decoder system to "smear" the frequency components of a sampled signal across the full length of the signal sample block. Distortion artifacts in the signal recovered from the inverse transform is most audible for large changes in signal amplitude which occur during a time interval much shorter than the signal sample block length. Such amplitude changes are referred to here as "transients." Such distortion will manifest itself as pre- and post-transient ringing.

Thus, fixed block length transform coders must use a compromise block length which trades off a priori temporal resolution against frequency resolution. A short block length will degrade subband filter selectivity which may result in a nominal passband filter bandwidth which exceeds the ear's critical bandwidth at lower or at all frequencies. Even if the nominal subband bandwidth is narrower than the ear's critical bandwidth, degraded filter characteristics manifested as a broad transition band and/or poor stopband rejection may result in significant signal artifacts outside the ear's critical bandwidth. On the other hand, a long block length may improve filter selectivity but will reduce temporal resolution, which may result in audible signal distortion occurring outside the ear's temporal psychoacoustic masking interval.

The problems encountered in trading off frequency resolution and temporal resolution are illustrated by the evolution in coder design by Krahé. Krahé, in "New Source Coding Method for High Quality Digital Audio Signals," Lecture, NTG Meeting on Sound Broadcasting, Mannheim, November, 1985, discloses an adaptive transform coder which requires a block length of 1024 samples for sufficient filter selectivity to successfully exploit psychoacoustic masking effects. Pre-transient distortion in the sample blocks, which are approximately 20 msec. long, may not be masked by the transient. To improve pre-transient masking, Krahé subsequently teaches in patent EP 0 251 028 an encoding method which high-pass filters the input signal to improve transient detection, and boosts signal samples in a signal sample block prior to a transient. The use of transient preprocessing is passed as side information to the receiver/decoder which attenuates recovered signal samples in a signal sample block prior to a transient by a corresponding amount.

This method has several problems. First, the pre-transient boost distorts the spectral shape of the sample block and thereby distorts coding decisions based on this spectral shape. This adversely affects the ability to exploit psychoacoustic masking. Furthermore, in coders using adaptive bit allocation, the boost of pre-transient signal samples tends to increase quantizing errors of the transient. This increase in quantizing error results from the boost amplifying spectral components other than those of the transient. Adaptive bit allocation based upon psychoacoustic principles will allocate more bits to these amplified spectral components than will otherwise be allocated to these spectral components without boost. This reduces the number of bits available to encode the transient's spectral components, therefore transient quantizing noise may increase.

Second, the pre-transient boost/attenuation process does not provide for the psychoacoustic masking of any quantizing errors caused by the transient. A transient is likely to increase quantizing errors in coders using adaptive bit allocation because bits that are otherwise available to quantize other spectral components are allocated instead to the transient's spectral components. The increased quantizing noise may be audible outside the ear's pre-transient masking interval because the boost/attenuation process does not shorten the block length prior to the transient.

Third, large-amplitude signal samples that are amplified by the pre-transient boost may exceed the encoder's capacity to represent them (exceed the encoder's dynamic range). If the encoder's dynamic range is increased to handle the amplified components, the number of bits required to encode the signal also increases. This condition is particularly likely where the large-amplitude signals are low-frequency spectral components. Because they are low in frequency, these large-amplitude signals will be blocked by the high-pass filter and will not inform the transient detection process. Patent EP 0 251 028 suggests applying a frequency selective boost, boosting only those spectral components which make up the transient, however, this requires more processing to perform an additional filtering step over that needed to perform the transform because the pre-transient boost occurs in the time-domain prior to transform filtering.

Finally, patent EP 0 251 028 makes no provision for post-transient processing, hence, post-transient distortion may not be masked unless the signal sample block is shorter than the ear's post-masking interval. Although this is not usually a problem in many coding systems, it does impose an unnecessary limit upon a coder's maximum block length.

Another method in Edler, "Coding of Audio Signals with Overlapping Block Transform and Adaptive Window Functions," *Frequenz*, vol 43, no. 9, 1989, pp. 252–56, discloses a method which can adaptively select the transform length for an overlapping-block transform. Edler also discloses adaptive selection of window weighting functions.

This method has several problems. First, the design of the analysis/synthesis window pair is highly constrained, requiring windows which seriously degrade filter selectivity. This problem is discussed in more detail below.

Second, real-time systems using this method require much faster signal processors because analysis and synthesis filtering impose bursts of very high signal processing requirements. During analysis filtering, certain signal samples must be transformed three times, 50% more than the average two transformations per signal sample.

Third, the method does not establish the time of transient occurrence in a block, only whether a transient has occurred. Therefore, this method is unable to delay shifting down to a short block length until just prior to the transient, and is unable to shift back to a full-length block immediately after the transient has subsided. This method may degrade filter selectivity sooner than the signal requires, or it may degrade filter selectivity longer than the signal requires, or both.

Fourth, Edler's method may shift unnecessarily to a shorter block length because it may falsely detect transient conditions. During silent and low-level passages, changes in music signal energy or low-level noise may frequently meet Edler's criteria, but such passages rarely if ever require shorter block lengths to mask pre-transient temporal distortion.

Fifth, the method makes no distinction between pre- and post-transient masking requirements. It is well known that the ear's post-masking interval is much longer than its pre-masking interval, hence, the criteria used to trigger a shift to a shorter block length, and the length of that shorter block can be varied depending upon whether the affected signal samples precede or follow the transient which triggered the shift. The single set of criteria used by the Edler method must be a compromise, potentially calling for an unnecessary shift to a shorter block following transient, or potentially failing to call for a needed shift prior to a transient, or both. Similarly, the single short-block length must be a compromise. It may be too short, causing unnecessary degradation of filter selectivity, or it may be too long, failing to insure transient temporal distortion is masked.

Sixth, Edler teaches how to select only from two block lengths, either from full-length or short-length blocks (a quarter length block is disclosed). If the short-block length is designed to insure all transient temporal distortion is masked, then it will degrade filter selectivity more than necessary for moderate level transients. Otherwise, the short-block length will not be short enough to insure the most demanding transient temporal distortion is masked.

Window Weighting Function

Discrete transforms do not produce a perfectly accurate set of frequency coefficients because they work with only a finite-length segment of the signal, the signal sample block. Strictly speaking, discrete transforms produce a time-frequency representation of the input time-domain signal rather than a true frequency-domain representation which would require infinite signal sample block lengths. For convenience of discussion here, however, the output of discrete transforms will be referred to as a frequency-domain representation. In effect, the discrete transform assumes the sampled signal only has frequency components whose periods are a submultiple of the signal sample block length. This is equivalent to an assumption that the finite-length signal is periodic. The assumption in general, of course, is not true. The assumed periodicity creates discontinuities at the edges of the signal sample block which cause the transform to create phantom spectral components.

One technique which minimizes this effect is to reduce the discontinuity prior to the transformation by weighting the signal samples such that samples near the edges of the signal sample block are zero or close to zero. Samples at the center of the signal sample block are generally passed unchanged, i.e., weighted by a factor of one. This weighting function is called an "analysis window." The shape of the window directly affects filter selectivity.

As used here, the term "analysis window" refers only to the windowing function performed prior to application of the forward transform. As will be discussed below, the design of analysis windows used in a preferred embodiment of the invention may be constrained by synthesis window design considerations. Therefore, design and performance properties of an "analysis window" as that term is commonly used in the art may differ from such analysis windows as implemented in this invention.

The analysis window is a time-domain function. If no compensation for the window's effects is provided, the recovered or "synthesized" signal will be distorted according to the shape of the analysis window. One compensation method known as overlap-add is well known in the art. This method requires the coder to transform overlapped blocks of input signal samples. By carefully designing the analysis window such that two adjacent windows add to unity across the overlap, the effects of the window will be exactly compensated.

Window shape affects filter selectivity significantly. See generally, Harris, "On the Use of Windows for Harmonic Analysis with the Discrete Fourier Transform," *Proc. IEEE*, vol. 66, January, 1978, pp. 51-83. As a general rule, "smoother" shaped windows and larger overlap intervals provide better selectivity. For example, a Kaiser-Bessel window generally provides for greater filter selectivity than a sine-tapered rectangular window.

When used with certain types of transforms such as the Discrete Fourier Transform (DFT), overlap-add increases the number of bits required to represent the signal because the portion of the signal in the overlap interval must be transformed and transmitted twice, once for each of the two overlapped signal sample blocks. Signal analysis/synthesis for systems using such a transform with overlap-add is not critically sampled. The term "critically sampled" refers to a signal analysis/synthesis which over a period of time generates the same number of frequency coefficients as the number of input signal samples it receives. Hence, for noncritically sampled systems, it is desirable to design the window with an overlap interval as small as possible in order to minimize the coded signal information requirements.

Some transforms, including one disccussed below which was disclosed by Johnson and Bradley, also require that the synthesized output from the inverse transform be windowed. The synthesis window is used to shape each synthesized signal block. Therefore, the synthesized signal will have been weighted by both an analysis and a synthesis window. This two-step weighting is mathematically similar to weighting the original signal once by a window whose shape is equal to a sample-by-sample product of the analysis and synthesis windows. Therefore, in order to utilize overlap-add to compensate for windowing distortion, both windows must be designed such that the product of the two will sum to unity across the overlap-add interval.

While there is no single criterion which may be used to assess a window's optimality, a window is generally considered "good" if the selectivity of the filter used with the window is considered "good." Therefore, a well designed analysis window (for transforms which use only an analysis window) or analysis/synthesis window pair (for transforms which use both an analysis and a synthesis window) can reduce sidelobe leakage.

As mentioned briefly above, the Edler method imposes undesirable constraints upon window design and therefore fails to preserve optimum filter selectivity. Edler teaches the use of windows which are variations of the rectangular window, but does not teach the use of better windows with maximum overlap such as the Kaiser-Bessel window. Furthermore, the Edler method cannot adapt a window sufficiently to prevent pretransient distortion from propagating into a previous block if a transient occurs at certain places in a subsequent overlapped block.

Transform

Although transform coders may be implemented with any of several time-domain to frequency-domain transforms, some transforms perform better than others for high-quality low-bit rate coding of audio signals, particularly wideband music signals.

One measure of transform coding performance is the "coding gain" or the increase in signal-to-noise ratio (SNR) of transform coding over that achieved by PCM coding. Coding gain is equal to the ratio of the arithmetic mean to the geometric mean of transform coefficient variances. See Zelinski and Noll, "Adaptive Transform Coding of Speech Signal," *IEEE Trans. Acoust., Speech, and Signal Proc.*, ASSP-25, August, 1977, pp. 299-309. Although the coding gains of different transforms for a given signal sample block will vary, there is generally no one signal-independent transform which provides the maximum coding gain for all signal sample blocks. For example, the Discrete Cosine Transform (DCT) generally provides higher coding gains than the Discrete Fourier Transform (DFT) for steady-state signals, that is, signals with predominantly low-frequency spectral components. On the other hand, the DFT generally provides higher coding gains than the DCT for signals with transients or predominantly high-frequency spectral components. See Jayant and Noll, *Digital Coding of Waveforms*, Englewood Cliffs, N.J.: Prentice-Hall, Inc., 1984, pp. 554-56.

Another measure of transform performance is the avoidance of, or the cancellation of, frequency-domain aliasing and time-domain aliasing. Finite-length digital transforms are not perfect passband filters. The transition between the passband and stopband is not infinitely sharp, and the attenuation of signals in the stopband is not infinitely great. As a result, even if a passband-filtered input signal is sampled at the Nyquist rate suggested by the passband cut-off frequency, frequencies above the filter's nominal cutoff frequency which are able to pass the filter, although attenuated, will be aliased.

Even if the forward and inverse transforms provide frequency-domain aliasing cancellation in principle, quantizing errors will prevent the inverse transform from completely cancelling frequency-domain aliasing. The residual frequency-domain aliasing distortion may be audible unless the distortion is psychoacoustically masked. With short signal sample blocks, however, psychoacoustic masking may be more difficult to achieve. As discussed above, shorter signal sample blocks degrade filter selectivity, and some transform coefficients may have a wider bandwidth than the auditory critical bands, particularly at low frequencies where the ear's critical bands have the greatest resolution. Consequently, frequency-domain alias distortion may not be masked.

Longer windows as well as longer block lengths can improve filter selectivity, thereby reducing frequency-domain aliasing and improving psychoacoustic masking. As the window length increases beyond the coder system decimation factor, however, time-domain aliasing will occur.

An overlapping-block transform which can cancel frequency-domain and time-domain aliasing is disclosed in Johnson and Bradley, "Adaptive Transform Coding Incorporating Time Domain Aliasing Cancellation," *Speech Communications*, vol. 6, North Holland: Elsevier Science Publishers, 1987, pp. 299–308. An analysis/synthesis system using the Johnson and Bradley transform is critically sampled. Edler utilizes this transform in his adaptive technique discussed above. This transform is also used in a preferred embodiment of the present invention.

Johnson and Bradley do not disclose how a transform coder which uses this transform can adaptively select different block lengths or analysis/synthesis windows, and how such adaption can preserve the transform's properties of aliasing cancellation and critical sampling. They also do not teach how to adaptively select different transforms.

DISCLOSURE OF INVENTION

It is an object of this invention to provide an encoder/decoder for digital transform processing of audio information, particularly wideband music, by means of signal analysis/synthesis which adaptively optimizes the trade off between transform temporal resolution and frequency resolution without incurring the problems and limitations discussed above. This object is achieved with an encoder according to claim 1, and a decoder according to claims 2 and 3.

It is a further object of this invention to provide an encoder/decoder for digital transform processing of audio information, particularly wideband music, by means of signal analysis/synthesis which adaptively optimizes transform coder gain and which, for certain overlapping block transforms, retains frequency-domain and time-domain aliasing cancellation and critical sampling, without incurring the problems and limitations discussed above. This object is achieved with an encoder according to claim 1, and a decoder according to claims 2 and 3.

Additional objects are achieved by specific embodiments of the invention according to the remaining claims, such as:

to provide for the adaptive selection of an optimum analysis window function, or an optimum analysis/synthesis window pair function;

to provide for high-quality transmission or storage and reproduction of wideband audio signals, wherein the quality of reproduction is suitable, for example, for broadcast audio links;

to provide a quality of reproduction subjectively as good as that obtainable from Compact Discs;

to provide an encoder/decoder embodied in a digital processing system requiring a low capacity channel to transmit the encoded signal; and to provide an encoder/decoder embodied in a digital processing system requiring a small amount of space to store the encoded signal.

Further details of the above objects and still other objects of the invention are set forth throughout this document, particularly in the Modes for Carrying Out the Invention, below. It should be appreciated that the present invention relates to the high-quality encoding and decoding of audio signals such as music or voice, however, a preferred embodiment relates more particularly to the encoding and decoding of wideband music signals.

In accordance with the teachings of the present invention in a preferred embodiment, an encoder provides for the digital encoding of wideband audio information. The wideband audio signals are sampled, quantized, and grouped into time-domain signal sample blocks N samples in length. A signal analyzer evaluates the current signal sample block to determine an appropriate transform, block length, and analysis-window function to optimize coding performance. In this preferred embodiment the signal analyzer is a transient-signal detector that determines if any signal transient is present which requires the encoder to use shorter block lengths to avoid audible temporal distortion. Sample blocks with such transients are subdivided into sample subblocks of optimum length to preserve sufficient transform frequency selectivity yet insure psychoacoustic masking of coding distortion caused by the transient. Each sample block, whether of normal or of reduced length, is weighted by an analysis-window function chosen according to the output of the transient detector. Frequency-domain transform coefficients are then generated in response to the analysis-window weighted time-domain signal sample block by a discrete forward transform selected according to the output of the transient detector. Information needed to define the signal sample block length, analysis-window function, and forward transform used by the encoder is passed to the decoder.

In accordance with the teachings of the present invention in alternate embodiments, the signal analyzer may establish other input signal characteristics in addition to or instead of the presence of transients. In alternate embodiments, the signal analyzer determines at least one of the transform, the block length, and the analysis-window function in response to the results of the input signal analysis.

Also in accordance with the teachings of the present invention in a preferred embodiment, a decoder provides for the high-quality reproduction of digitally encoded wideband audio signals encoded by the encoder of the invention. The decoder extracts from the encoded signal the information defining the signal sample block length, the analysis-window function, and the forward transform used by the encoder. This information is used to set the length of the inverse transform, inform the choice of the synthesis-window function, and select the discrete inverse transform. Time-domain signal sample blocks are generated in response to frequency-domain transform coefficients by a discrete transform having characteristics inverse to those of the discrete transform used in the encoder which generated the frequency-domain transform coefficients. The time-domain signal sample blocks are weighted by a synthesis window. The encoder analysis window and the decoder synthesis window are shaped such that the composite window function sums to unity for two adjacent overlapped sample blocks. Adjacent sample blocks are overlapped and added to cancel the weighting effects of window weighting and to recover a digitized representation of the time-domain signal which is then converted into a high-quality analog output.

In accordance with the teachings of the present invention in alternate embodiments, the decoder extracts from the encoded signal the information defining at least one of the signal sample block length, the analysis-window function, and the forward transform used by the encoder. The extracted information is used to set the length of the inverse transform, inform the choice of the synthesis-window function, and select the inverse transform, respectively. In embodiments of the invention using discrete transforms which require it, the time-domain signal sample blocks are weighted by a synthesis window. The encoder analysis window and, if used, the decoder synthesis window, are shaped such that the composite window function sums to unity for two adjacent overlapped sample blocks.

In accordance with the teachings of the present invention, in a specific embodiment a transient detector adaptively selects signal sample block lengths shorter than the maximum block length normally used by the invention when shorter block lengths are needed to insure psychoacoustic masking of distortion artifacts created by transient signals. The digitized signal samples are passed through a high-pass filter and grouped into subblocks. The peak amplitude within each subblock is compared with the peak amplitude of the previous subblock. If the change between peak amplitudes of adjacent subblocks does not exceed specific thresholds, the coder utilizes the maximum signal sample block length. If the change in amplitude between adjacent subblocks does exceed the specific thresholds, a shorter block length is selected.

In a specific embodiment, an analysis window function is chosen for each signal sample block which is appropriate for the signal sample block signal content and block length selected by the transient detector. As discussed above, this analysis window function weights the samples within the signal sample block in order to improve the overall performance of the discrete transform. In one embodiment of the encoder of the present invention, the analysis window is chosen from a multiplicity of window functions from the same class or type of windows which differ in length.

The present invention may also adaptively select a window function type, or may adaptively vary parameters of a window function in accordance with the block length or input signal characteristics.

For example, an embodiment of the invention may adaptively select for each signal sample block the "alpha" parameter of a Kaiser-Bessel window function, offering higher stopband rejection at the expense of shallower transition band rolloff for signal sample blocks with transients. The Kaiser-Bessel window function is discussed below in more detail. An embodiment of the invention may also adaptively select the window type, adaptively selecting a function such as the Kaiser-Bessel or Dolph-Chebychev window. The choice of window function may not violate any constraints, however, such as overlap-add characteristics.

In a specific embodiment of the encoder of the present invention, the length of the discrete transform is set equal to the signal sample block length selected by the transient signal detector.

The present invention may use any orthogonal time-domain to frequency-domain transform. But a preferred embodiment of the invention uses a nonorthogonal discrete transform which is equivalent to the alternate application of a modified Discrete Cosine Transform (DCT) and a modified Discrete Sine Transform (DST). In another embodiment, a nonorthogonal discrete transform is implemented by a single modified Discrete Cosine Transform (DCT).

The present invention may also adaptively select a transform in accordance with the block length or input signal characteristics.

For example, an embodiment of the invention may adaptively select for each signal sample block from among the set of orthogonal transforms the transform which yields the largest coding gain. An embodiment of the invention could normally use a conventional DCT and select a Discrete Fourier Transform (DFT) for use with signal sample blocks with transients. It is known in the art that the coding accuracy of lower-frequency components is very significant to achieving a given subjective quality for most music signals. The conventional DCT possesses superior coding gain for lower-frequency signals. On the other hand, coding accuracy of higher-frequency components is very important to achieving a given level of subjective quality for transient signals. The DFT possesses superior coding gain for higher-frequency signals. Therefore, an embodiment of the present invention may adaptively select the transform best suited for the coding of each signal sample block.

In a preferred embodiment of the encoder and decoder, the sampling rate is 44.1 kHz. While the sampling rate is not critical, 44.1 kHz is a suitable sampling rate and it is convenient because it is also the sampling rate used for Compact Discs. An alternative embodiment employs a 48 kHz sampling rate. In a preferred embodiment employing the 44.1 kHz sampling rate, the nominal frequency response of the invention extends to 20 kHz and the time-domain sample blocks have a maximum length of 1024 samples. Shorter lengths of 512, 256, or 128 samples may be adaptively selected. In a preferred embodiment of the invention using encoding techniques such as those described in the document WO 90/09022 (published Aug. 9, 1990), music coding at subjective quality levels suitable for professional broadcasting applications may be achieved using serial bit rates of no more than 96 kbs (including overhead information such as error correction codes). Other bit rates yielding varying levels of signal quality may be used without departing from the basic spirit of the invention.

The various features of the invention and its preferred embodiments are set forth in greater detail in the following Modes for Carrying Out the Invention and in the accompanying drawings.

BRIEF DESCRIPTION OF DRAWINGS

FIGS. 1a and 1b are functional block diagrams illustrating the basic functional structure of a preferred embodiment of the invention.

FIGS. 2a through 2e are block diagrams showing the hardware architecture for one embodiment of the invention.

FIGS. 3a and 3b are block diagrams showing in greater detail the serial-communications interface of the processor for a two-channel embodiment of the invention.

FIGS. 4a through 4e are hypothetical graphical representations illustrating a time-domain signal grouped into a series of overlapped and windowed time-domain signal sample blocks.

FIGS. 5a through 5d are hypothetical graphical representations illustrating the time-domain aliasing distortion created by the E-TDAC transform.

FIGS. 6a through 6g are hypothetical graphical representations illustrating the cancellation of time-domain aliasing by overlap-add during E-TDAC transform signal synthesis.

FIG. 7a is a hypothetical graphical representation illustrating a pair of signal sample blocks which constitute a frame in a single-channel system.

FIG. 7b is a hypothetical graphical representation illustrating a pair of signal sample blocks which constitute a frame in a two-channel system.

FIG. 8a is a graphical representation of an analog music signal segment with a transient.

FIG. 8b is a graphical representation of the synthesized music signal segment recovered from one signal sample block through an encoder/decoder system using a fixed signal sample block length of 512 samples.

FIG. 8c is a graphical representation of the synthesized music signal segment recovered by an embodiment of the present invention using the Fixed-Frame Alignment technique with a maximum signal sample block length of 512 samples.

FIG. 9 is a schematic representation of a recursive filter which implements the high-pass filter used within a transient detector of one embodiment of the invention.

FIG. 10 is a hypothetical graphical representation of the way in which one embodiment of a transient detector segments one-half of a signal sample block into a hierarchy of shorter length subblocks.

FIG. 11 is a hypothetical graphical representation of the way in which one embodiment of a transient detector identifies peak amplitude values in each of the subblocks within a hierarchical subframe.

FIG. 12 is a hypothetical graphical representation of a binary tree illustrating the nodes constructed by the comparator section of one embodiment of a transient detector.

FIG. 13 is a flow chart showing the logic for part of the comparator section of a transient detector utilized in one embodiment of the invention.

FIG. 14 is a hypothetical graphical representation of the modification process of a binary tree by the comparator section of a transient detector utilized in one embodiment of the invention.

FIG. 15 is a hypothetical graphical representation of the subblock lengths selected by a transient detector in accordance with the illustrated binary tree.

FIG. 16 is a graphical representation of a music waveform superimposed with subblock length intervals selected by a transient detector utilized in one embodiment of the invention.

FIG. 17 is a hypothetical graphical representation showing a time-domain signal sample block.

FIG. 18 is a further hypothetical graphical representation of a time-domain signal sample block showing discontinuities at the edges of the sample block caused by a discrete transform assuming the signal within the block is periodic.

FIG. 19a is a functional block diagram showing the weighting of a function X(t) by a function W(t) to provide the resulting function Y(t).

FIGS. 19b through 19d are further hypothetical graphical representations showing the weighting of a time-domain signal sample block by an analysis window.

FIG. 20 is a graphical representation of a family of analysis-synthesis windows suitable for use with a preferred embodiment of the invention.

FIGS. 21a through 21c are hypothetical graphical representations of a sequence of signal sample blocks illustrating the Fixed-Frame Alignment technique.

FIG. 22a is a graphical representation of transition band rolloff and stopband rejection of a filter bank using a complete symmetrical analysis-only window compared with that of a filter bank using only the first half of such a window.

FIG. 22b is a graphical representation of transition band rolloff and stopband rejection of a filter bank using a complete symmetrical analysis-only window compared with that of a filter bank using an asymmetric analysis-only window.

FIG. 23a is a hypothetical graphical representation illustrating the time-reversal regions of the time-domain aliasing component signal created by the E-TDAC transform using the conventional phase term.

FIG. 23b is a hypothetical graphical representation illustrating the time-reversal regions of the time-domain aliasing component signal created by the E-TDAC transform using the phase term required by the Fixed-Frame Alignment technique.

FIG. 23c is a hypothetical graphical representation illustrating the time-reversal regions of the time-domain aliasing component signal created by the E-TDAC transform using the phase term required to cancel time-domain aliasing in a signal sample subblock.

FIG. 24 is a hypothetical graphical representation of a bridge transform, illustrating the time-reversal regions of the time-domain aliasing component signal.

FIG. 25 is a hypothetical graphical representation of a sequence of signal sample blocks illustrating the Enhanced Fixed-Frame Alignment technique.

FIGS. 26a through 26f are flowcharts showing logic for frame control as required by the Enhanced Fixed-Frame Alignment embodiment of the invention.

FIG. 27 is a hypothetical graphical representation of a sequence of signal sample blocks of varying length illustrating the Dynamic-Frame Alignment technique.

FIG. 28 is a hypothetical graphical representation showing the overlap-add property of adjacent windowed blocks.

FIGS. 29a through 29e are hypothetical graphical representations illustrating a time-domain signal grouped into a series of overlapped and windowed time-domain signal sample blocks, particularly as implemented for the O-TDAC transform.

FIGS. 30a through 30d are hypothetical graphical representations illustrating time-domain aliasing distortion created by the O-TDAC transform.

FIGS. 31a through 31g are hypothetical graphical representations illustrating the cancellation of time-domain aliasing by overlap-add during O-TDAC transform signal synthesis.

FIG. 32 is a hypothetical graphical representation illustrating the O-TDAC transform phase term required by Fixed-Frame Alignment to cancel time-domain aliasing.

FIGS. 33a and 33b are hypothetical graphical representations of the transform coefficient bandwidths for the E-TDAC and O-TDAC transforms.

Table I shows the coefficients of a 2 kHz high-pass filter used in the first section of one embodiment of the transient detector.

Table II shows the coefficients of a 4 kHz high-pass filter used in the first section of one embodiment of the transient detector.

Table III shows a preferred set of single attack/decay thresholds used in the fourth section of one embodiment of the transient detector to define the amount of signal amplitude change necessary to constitute both a rising and falling transient condition.

Table IV shows a preferred set of distinct attack and decay thresholds used in the fourth section of one embodiment of the transient detector to define different thresholds for the amount of signal amplitude change necessary to constitute a rising and a falling transient condition.

MODES FOR CARRYING OUT THE INVENTION

I. Hardware Implementation of Invention

FIGS. 1a and 1b show the basic functional structure of a preferred embodiment of the invention. A preferred embodiment of an encoder shown in FIG. 1a comprises time-domain signal input 102, low-pass filter 104 which low-pass filters the input signal, signal sampler and quantizer 106 which samples the low-pass filtered input signal, signal sample buffer 108 which buffers the input signal samples, transient detector 110 which selects the number of input signal samples that constitute a signal sample block thereby selecting the signal sample block length, analysis window 112 which weights each digitized time-domain signal block by an analysis-window function, digital filter bank 116 which transforms the sampled and quantized signal into frequency coefficients, frame controller 114 which controls the analysis window and filter bank in accordance with the selected signal sample block length, quantizer 118 which encodes the transform coefficients in accordance with the desired level of subjective signal quality and psychoacoustic effects, and formatter 120 which assembles the encoded frequency coefficients and selected signal sample block length into a bit stream for transmission or storage. FIG. 1a depicts a transmission path 122, however, it should be understood that the encoded signal may be stored for later use.

A preferred embodiment of a decoder shown in FIG. 1b comprises encoded bit-stream signal input 132, deformatter 134 which extracts each encoded frequency coefficient and signal sample block length from the assembled bit stream, linearizer 136 which converts each encoded coefficient into a linear-valued transform coefficient, frame controller 140 which selects the inverse filter bank and synthesis-window in accordance with the extracted signal sample block length, inverse digital filter bank 138 which transforms the transform coefficients into a time-domain signal block, synthesis-window 142 which weights each synthesized time-domain signal block by the selected synthesis-window function, signal block overlap-adder 144 which recovers a digitized representation of the time-domain signal, analog signal generator 146, low-pass filter 148, and analog signal output 150.

A. Processing Hardware

The basic hardware architecture of a preferred embodiment of the invention is illustrated in FIGS. 2a–2e and 3a–3b. A practical implementation of a preferred embodiment of a single-channel version of the invention, employing either a 44.1 kHz or a 48 kHz sample rate, utilizes a 16-bit analog-to-digital converter (ADC) to quantize the input time-domain signal. Each 16-bit digitized sample is used to form the 16 most-significant bits of a 24-bit word which is used in subsequent computations. A Motorola DSP56001 24-bit digital-signal processor (DSP) is used to perform the required computations and to control the encode and decode processes. Static random access memory (RAM) provides program and data memory for the DSP. A 16-bit digital-to-analog converter (DAC) is used to generate an analog signal from the decoded digital signal.

The encoder hardware architecture, shown in FIG. 2a, is comprised of analog signal input 200, low-pass filter (LPF) 200A, ADC 201, DSP 202, static RAM 203, erasable programmable read-only memory (EPROM) 204, and encoded serial-signal output 206. LPF 200A insures the input signal is bandwidth limited. ADC 201 samples and quantizes the incoming signal into a serial stream of 16-bit words. DSP 202 receives and buffers the serial stream of digitized samples, analyzes the input signal, selects the signal sample block length, groups the samples into blocks, weights the blocks with an analysis-window function, performs the calculations required to transform the blocks into the frequency domain, encodes the transform coefficients, formats the encoded coefficients and any other side information into a data stream, and transmits the encoded signal through serial data path 206. The programming and data work areas for DSP are stored in static RAM 203. The DSP requires fast-access-time program memory which can be implemented more cheaply in RAM than it can be in programmable ROM. Consequently, EPROM 204 stores programming and static data in a compressed format which the DSP unpacks into a usable form into RAM 203 when the encoder is first powered on.

FIGS. 2b and 2c provide more detail on two DSP interfaces. FIG. 2b shows the serial-communication interface for DSP 202, ADC 201, and serial data path 206. Timing generator 202A generates the receive clock, word-synchronization, and transmit clock signals for the encoder. Line SC0 clocks a serial-bit stream of digitized input signal samples along line SRD from ADC 201 into DSP 202. Line SC1 provides the word-synchronization signal to the ADC and the DSP which marks the beginning of each 16-bit word. Line SCK clocks a serial-bit stream of the encoded signal along line STD from the DSP to serial data path 206.

FIG. 2c shows the memory addressing interface. Memory for the Motorola DSP56001 is divided into four segments: program ROM, program RAM, X data, and Y data. Only program RAM 203 or EPROM 204 are selected when line PS is low, but they are mapped into separate address spaces. Invertor 205C allows DSP 202 to select either RAM or EPROM according the state of address line A15. When DSP 202 sets A15 high, invertor 205C sets the chip-select (CS) lines of RAM 203 and EPROM 204 low. EPROM 204 is selected when lines CS and PS are low. When DSP 202 sets A15 low, invertor 205C sets the CS lines of RAM 203 and EPROM 204 high. Program RAM 203 is selected when lines CS is high and line PS is low.

The X data bank of RAM 203 is selected whenever the DSP brings line DS low and line XY high. The Y data bank of RAM 203 is selected whenever the DSP brings line XY low and line CS high.

The decoder hardware architecture, shown in FIG. 2d, is comprised of encoded serial-signal input path 207, DSP 208, static RAM 209, EPROM 210, DAC 212, LPF 213A, and analog signal output 213. DSP 208 receives and buffers the encoded signal, deformats the signal into the encoded transform coefficients and any side information, recovers unencoded transform coefficients, performs the calculations required to transform the coefficients into the time domain, groups the coefficients into time-domain blocks, weights the blocks with a synthesis-window function (synthesis windowing need not be performed if the discrete transform used in the encoder/decoder does not require the use of a synthesis window), overlap-adds the blocks into a time-domain sequence of digital samples, and transmits the digital samples in a serial-bit stream to DAC 212. The programming and data work areas for the DSP are stored in static RAM 209. EPROM 210 stores in a compressed format programming and static data which the DSP unpacks into usable form into RAM 209 when the decoder is first powered on. DAC 212 generates an analog signal corresponding to the serial-data stream received from the DSP. LPF 213A insures signal output 213 is free of any spurious high-frequency components created by the encode/decode process.

FIG. 2e shows the serial-communication interface for DSP 208, serial-signal input path 207, and DAC 212. Timing generator 208A, using a phase-locked loop circuit to extract a timing reference from the encoded serial-bit input signal, generates the receive clock, word-synchronization, and transmit clock signals for the decoder. Line SC0 clocks the encoded serial-bit signal along line SRD into DSP 208. Line SCK clocks a serial-bit stream of the decoded digitized signal samples along line STD from DSP 208 to DAC 212. Line SC2 provides a word-synchronization signal to the DAC and to the DSP which marks the beginning of each 16-bit word. The interface between DSP 208 and the memory-address bus is implemented in the same manner as that described above for the encoder. See FIG. 2c.

A two-channel embodiment of the encoder requires LPF 200A and 200B, and ADC 201A and 201B, connected as shown in FIG. 3a. The interface between the DSP and ADC components operates in a manner similar to that described above for a one-channel encoder. Timing generator 202A provides an additional signal to line SC2 of the DSP at one-half the rate of the word-synchronization signal to control multiplexer 202B and indicate to the DSP which of the two ADC is currently sending digitized data.

A two-channel embodiment of the decoder requires DAC 212A and 212B, and LPF 213A and 213B, connected as shown in FIG. 3b. The interface between the DSP and DAC components operates in a manner similar to that described above for a one-channel decoder. Timing generator 208A provides an additional signal to line SC1 of the DSP at one-half the rate of the word-synchronization signal to control demultiplexer 208B and indicate to the DSP which of the two DAC is currently receiving digital data.

Specialized hardware may be used to perform certain functions such as windowing or the Fast Fourier Transform (FFT). The entire encoder/decoder may be implemented in a custom-designed integrated circuit. Many other possible implementations will be obvious to one skilled in the art.

B. Input Signal Sampling and Buffering

In a preferred embodiment of the invention, signal sampler and quantizer 106, shown in FIG. 1a, is an analog-to-digital converter which quantizes the input signal into 16 bits which are subsequently padded on the right with 8 zero bits to form a 24-bit integer representation. All subsequent transform calculations are performed in 24-bit integer arithmetic. The analog input signal is limited in bandwidth by a LPF illustrated by box 104 in FIG. 1a. In a preferred embodiment of the invention, the nominal cutoff frequency of this filter is 20 kHz.

A music signal with at least Compact Disc (CD) quality has, in addition to other qualities, a bandwidth of 20 kHz. From the Nyquist theorem, it is known that a 20 kHz bandwidth signal must be sampled at no less than 40 Khz. A sample rate of 44.1 Khz is chosen for one embodiment of the invention because this rate is used in CD applications and such a choice simplifies the means necessary to use this invention in such applications.

Other sampling rates, such as 48 kHz which is a rate common to many professional audio applications, may be utilized. If an alternate rate is chosen, the frequency separation between adjacent transform coefficients will be altered and the number of coefficients required to represent the desired signal bandwidth will change. The full effect that a change in sampling rate will have upon the implementation of the invention will be apparent to one skilled in the art.

II. PREFERRED IMPLEMENTATION OF INVENTION

A. Analysis Filter Bank-Forward Transform

The details of implementation are influenced by the choice of the discrete transform used to perform the digital filter bank function represented by box 116 in FIG. 1a. Any one of several transform techniques may be used to implement the filter bank. The transform technique used in a preferred embodiment of the invention was first described in Princen and Bradley, "Analysis/Synthesis Filter Bank Design Based on Time Domain Aliasing Cancellation," *IEEE Trans. on Acoust., Speech, Signal Proc.*, vol. ASSP-34, 1986, pp. 1153–1161. This technique is the time-domain equivalent of an evenly-stacked critically sampled single-sideband analysis-synthesis system. This transform is referred to herein as Evenly-Stacked Time-Domain Aliasing Cancellation (E-TDAC). An alternative form of the TDAC transform may be used in another embodiment of the invention. The technique is described in Princen, Johnson, and Bradley, "Subband/Transform Coding Using Filter Bank Designs Based on Time Domain Aliasing Cancellation," *ICASSP 1987 Conf. Proc.*, May 1987, pp. 2161–64. This alternate transform is the time-domain equivalent of an oddly-stacked critically sampled single-sideband analysis-synthesis system. It is referred to herein as Oddly-Stacked Time-Domain Aliasing Cancellation (O-TDAC).

Embodiments of the invention using other transforms such as the O-TDAC transform and the Discrete Fourier Transform (DFT) as implemented by the Fast Fourier Transform (FFT) are discussed after the E-TDAC embodiment has been fully described.

E-TDAC utilizes a transform function which is equivalent to the alternate application of a modified Discrete Cosine Transform (DCT) with a modified Discrete Sine Transform (DST). The DCT, shown in equation 1, and the DST, shown in equation 2, are $$C(k) = \sum_{n=0}^{N-1} x(n)\cos\left(2\pi k \frac{n+m}{N}\right) \quad (1)$$

for $0 \leq k < N$ $$S(k) = \sum_{n=0}^{N-1} x(n)\sin\left(2\pi k \frac{n+m}{N}\right) \quad (2)$$

for $0 \leq k < N$ where
k = frequency coefficient number,
n = input signal sample number,
N = signal sample block length,
m = phase term for E-TDAC,
x(n) = quantized value of input signal x(t) at sample n,
C(k) = DCT coefficient k, and
S(k) = DST coefficient k.

The E-TDAC transform alternately produces one of two sets of spectral coefficients or transform blocks for each signal sample block. These transform blocks are of the form $$\{C(k)\}_i = \begin{bmatrix} C(k) & \text{for } 0 \leq k < \frac{N}{2} \\ 0 & \text{for } k = \frac{N}{2} \end{bmatrix} \quad (3)$$

$$\{S(k)\}_i = \begin{bmatrix} S(k) & \text{for } 0 < k \leq \frac{N}{2} \\ 0 & \text{for } k = 0 \end{bmatrix} \quad (4)$$

where
i = signal sample block number,
C(k) = DCT coefficient (see equation 1), and
S(k) = DST coefficient (see equation 2).

Princen and Bradley showed that with the proper phase component m (see equation 6) and a carefully designed pair of analysis-synthesis windows, the E-TDAC technique can accurately recover an input signal from an alternating sequence of fixed-length cosine and sine transform blocks of the form $$\{C(k)\}_0, \{S(k)\}_1, \{C(k)\}_2, \{S(k)\}_3, \quad (5)$$

where each transform block represents one time-domain signal sample block. This process is shown in FIGS. 4a–4e, 5a–5d, and 6a–6g.

Referring to FIG. 4a, it may be seen that quantized input signal x(t) is grouped into blocks. One set of blocks, weighted by the window function $W_c$ shown in FIG. 4b, produces signal $x_c(t)$ shown in FIG. 4d. Signal $x_c(t)$ is input to the DCT. Another set of blocks of sampled input signal x(t), which overlap the first set by one-half block length, are windowed by window function $W_s$ shown in FIG. 4c (which window function is identical to $W_c$ but shifted in time by one-half block length) producing signal $x_s(t)$ shown in FIG. 4e and subsequently input to the DST.

Using only the alternate DCT and DST transform blocks results in a loss of the information contained in the discarded half of the transform blocks. This loss produces a time-domain aliasing component, but the distortion may be cancelled by choosing the appropriate phase term m for equations 1 and 2, applying the forward transform to overlapped time-domain signal sample blocks, and by overlapping and adding adjacent time-domain signal sample blocks recovered by the inverse transform.

The phase term m in equations 1 and 2 controls the phase shift of the time-domain aliasing distortion. FIGS. 5a–5d and 6a–6g illustrate this distortion. Signal $y_c(t)$, recovered from the inverse DCT, is shown in FIG. 5a. FIG. 5b illustrates that the recovered signal is composed of two components: the windowed original signal (solid line), and time-domain aliasing distortion (dotted line). FIGS. 5c and 5d illustrate similar information for signal $y_s(t)$ recovered from the inverse DST. To cancel this alias distortion and accurately recover the original time-domain signal, E-TDAC requires the aliasing to be as follows. For the DCT, the time-domain alias component consists of the first half of the sampled signal reversed in time about the one-quarter point of the sample block, and the second half of the sampled signal reversed in time about the three-quarter point of the sample block. For the DST, the alias component is similar to that for the DCT except its amplitude is inverted in sign. See FIGS. 5b and 5d. The phase term required for alias cancellation $$m = \frac{\frac{N}{2} + 1}{2} \quad (6)$$

where N = signal sample block length.

E-TDAC also requires application of a pair of carefully designed analysis-synthesis windows to overlapped signal sample blocks. The signal sample blocks must have a 100% overlap, i.e., 50% of a given block is overlapped by the previous block, and 50% of the same block is overlapped by the following block. FIGS. 6a–6g illustrate the overlapping of signal sample blocks and the resulting cancellation of alias distortion. Signals $y_c(t)$ and $y_s(t)$ shown in FIG. 6a and 6d, recovered from the inverse DCT and DST, are weighted by window functions $W_c(t)$ and $W_s(t)$ respectively, shown in FIGS. 6b and 6e, to produce signals $\hat{y}_c(t)$ and $\hat{y}_s(t)$ shown in FIGS. 6c and 6f. When the overlapped blocks of these windowed signals are added, the alias components are cancelled and the resulting signal y(t) shown in FIG. 6g is an accurate reconstruction of the original input signal x(t).

Window design and overlap-add used during the synthesis process is discussed below in more detail. It is sufficient at this point to notice that omitting half the transform blocks halves the required bit rate, but the 100% window overlap required for E-TDAC during signal synthesis doubles the required bit rate. Consequently, E-TDAC is critically sampled and has a neutral effect upon the required bit rate.

The computation algorithm used for E-TDAC is the Fast Fourier Transform (FFT). See Cooley and Tukey, "An Algorithm for the Machine Calculation of Complex Fourier Series," *Math. Comput.*, vol. 19, 1965, pp. 297–301. A single FFT can be used to perform concurrently the modified DCT and modified DST of equal length signal sample blocks by defining each block respectively as the real and imaginary components of a single complex transform. This technique exploits the fact the FFT is a complex transform, yet both input signal sample blocks consist only of real-valued samples. By factoring these transforms into the product of one FFT and an array of complex constants, the DCT coefficients emerge from the FFT as the set of real values and the DST coefficients are represented by the set of imaginary values. Therefore the DCT of one signal sample block can be concurrently calculated with the DST of another signal sample block of equal length by only one FFT followed by complex array multiplication and additions.

The basic technique of using one FFT to concurrently calculate two transforms is well known in the art and is described in Brigham, *The Fast Fourier Transform*, Englewood Cliffs, N.J.: Prentice-Hall, Inc., 1974. Additional information regarding the concurrent calculation of the modified DCT and modified DST for the E-TDAC transform may be found in Lookabaugh, "Variable Rate and Adaptive Frequency Domain Vector Quantization of Speech," Standford, Calif.: Stanford University, PhD Thesis, June, 1988.

In one embodiment of a one-channel version of the invention, two adjacent overlapped maximum length signal sample blocks are stored in buffers and transformed together into a DCT/DST block pair. As shown in FIG. 7a, this block pair constitutes a frame. Both blocks within the frame are subsequently quantized and formatted for transmission or storage.

In two-channel systems, concurrent block transforms may be calculated by processing a maximum length signal sample block from each of the two channels: a DCT block is generated for one channel, and a DST block is generated for the second channel. This block pair constitutes a frame. See FIG. 7b. The coded blocks for a given channel alternate between the DCT and DST (see expression 5), and are always of the opposite type from that of the other channel's blocks. Both blocks in the frame are transformed and formatted together.

For a preferred embodiment of the invention, however, concurrent processing of the forward transform is more complex because the present invention may adaptively select the signal sample block length, the analysis window or analysis-synthesis window pair, and the transform. As will be discussed below, adaptive changes in the block length may also require changes in the forward transform phase term (see equation 6) and the transform length. The basic methods which may be used to switch between block lengths are described below.

B. Signal Analysis: Transient Detection

The transient detector depicted by box 110 in FIG. 1a for a preferred embodiment of the invention represents a specific implementation of input signal analysis. An embodiment using only transient detection will be described before other forms of signal analysis are discussed as alternative embodiments.

The transient detector monitors the input signal for rapid changes in amplitude and selects short signal sample blocks when sufficiently large changes in amplitude are detected. As discussed above, quantization errors will cause a discrete transform coder to smear spectral components of transient signals throughout the signal sample block interval. For example, compare FIGS. 8a, 8b, and 8c. The signal graph in these figures is scaled to clearly show the low-level signal preceding the transient. The extreme amplitude of the transient signal exceeds the range of the graph and is not shown. FIG. 8a shows the original signal before transform coding. FIG. 8b illustrates the recovered signal from a nonadaptive block length transform coder using a 512 sample block length. The transient's high-frequency component modulates the music signal throughout the sample block, but it is most apparent prior to the transient.

This distortion is not objectionable in coders using short signal sample blocks because the distortion is contained within the shorter block and is psychoacoustically masked by the transient. The transient detector may select higher temporal resolution in exchange for poorer transform filter bank selectivity by adaptively selecting a shorter block length when it determines that a shorter block is required to insure temporal psychoacoustic masking of transient signal distortion artifacts. A comparison of FIGS. 8b and 8c illustrates this effect. As shown in FIG. 8c, the high-frequency distortion component preceding the transient extends over a shorter period of time for a signal recovered from an embodiment of the invention which has shifted to a 256 sample block than is the case shown in FIG. 8b for a coder using a 512 sample block.

Decreased filter bank selectivity is generally not objectionable within the signal sample subblock which contains the transient because the poorer filter bank performance will be masked by the transient signal. Degraded coder performance may be audible, however, in shorter subblocks which precede or follow the block containing the transient. It is important, therefore, to minimize the interval during which the coder utilizes a shorter block length.

A preferred embodiment of the transient detector is comprised of four sections. The first section is a high-pass filter (HPF) which excludes lower frequency components from the transient detection process. The HPF is implemented as a fourth-order recursive digital filter. The filter, shown schematically in FIG. 9, may be expressed as a pair of difference equations as shown in equations 7 and 8 below. The equivalent transfer function is shown in equation 9.

$$w_n = b_{01}x_n + b_{11}x_{n-1} + b_{21}x_{n-2} - a_{11}w_{n-1} - a_{21}w_{n-2} \quad (7)$$

$$y_n = b_{02}w_n + b_{12}w_{n-1} + b_{22}w_{n-2} - a_{12}y_{n-1} - a_{22}y_{n-2} \quad (8)$$

$$H(z) = \left( \frac{b_{01} + b_{11}z^{-1} + b_{21}z^{-2}}{1 + a_{11}z^{-1} + a_{21}z^{-2}} \right) \left( \frac{b_{02} + b_{12}z^{-1} + b_{22}z^{-2}}{1 + a_{12}z^{-1} + a_{22}z^{-2}} \right) \quad (9)$$

The HPF cutoff frequency is 2 kHz for a preferred embodiment of the invention with a 1024 sample maximum block length. This cutoff frequency was established empirically with listening tests. The values of the coefficients for the difference equations and the transfer function are shown in Table I. A preferred embodiment of the invention with a maximum block length of 512 samples uses an HPF with a cutoff frequency of 4 kHz. The coefficients for this filter cutoff frequency are shown in Table II.

The second section of the transient detector segments the high-pass filtered signal samples into a hierarchical subframe of subblocks. In a preferred embodiment of the invention, a three-level hierarchy is used. See FIG. 10. Half of a 1024 sample maximum length block is placed on level 1. On level 2, half of the signal sample block is segmented into two subblocks of 256 samples each. On level 3, half of the signal sample block is segmented into four subblocks of 128 samples each. In general, the subblock length may be expressed as $$N_j = \frac{N}{2^j} \quad (10)$$

$$\text{for } j = 1, 2, \ldots M$$

where
$N_j$ = length of subblock on level j,
$N$ = length of maximum length signal sample block, and
$M$ = number of levels in the segmentation hierarchy.
Although level 0 is not used by the transient detector, it conceptually represents the maximum length signal sample block. Hence, $N_0 = N$.

The third section of the transient detector is a peak amplitude detector. The time-domain signal sample with the largest magnitude is identified for each subblock in all hierarchical levels within the current subframe. The subblock peak amplitudes are represented as $$P_{jk} = \max_n |x_n| \quad (11)$$

$$\text{for } n = \frac{N(k-1)}{2^j}, \frac{N(k-1)}{2^j} + 1, \ldots \frac{Nk}{2^j} - 1$$

$$\text{and } k = 1, \ldots 2^{j-1}$$

where
$X_n$ = the $n^{th}$ signal sample of a subblock N/2 samples long
j = the subframe hierarchical level number,
k = the subblock number within level j, and
N = length of maximum length sample block.

The notation $P_{j0}$ is used to represent the peak amplitude of the last subblock on level j in the prior subframe immediately preceding the first subblock on level j in the current subframe. See FIG. 11. For example, $P_{34}$ in the preceding subframe is represented as $P_{30}$ for the current subframe.

The fourth section of the transient detector is a threshold comparator. The first stage of this section prevents the transient detector from changing block lengths during signal passages with only low amplitude signals. This is accomplished by setting the block length to its maximum value for all signal sample blocks whose peak value $P_{11}$ does not exceed a "silence threshold" $T_s$. This threshold is expressed as $$T_s = 0.003 \, X_s \quad (12)$$

where $X_s$ = saturation value for signal samples $x_n$. This value is the largest value a signal sample can attain before it exceeds the representation range of the coder. For example, the saturation value is 8,388,607 for a 24-bit binary integer two's complement representation.

The remainder of the transient detector is bypassed if the peak value $P_{11}$ does not exceed the silence threshold. Otherwise, if a transient is present, the comparator selects a smaller signal sample block length appropriate for the transient present in the sampled signal. The process performed in stages two and three of the comparator is better understood if a conceptual description is given first. Conceptually, stage two computes a set of ratios between peak amplitudes of adjacent subblocks on each level of the hierarchical subframe. These ratios are expressed as $$R_{jk} = \frac{P_{jk}}{P_{j(k-1)}} \quad (13)$$

$$\text{for } k = 1 \text{ to } 2^{j-1}$$

where
j = the subframe hierarchical level number,
k = the subblock number within level j, and
$P_{jk}$ = the subblock peak amplitude (see equation 11).
Each ratio $R_{jk}$ is compared to two thresholds, $T_{Aj}$ and $T_{Dj}$. $T_{Aj}$ represents the attack threshold for level j and is always greater than one. $T_{Dj}$ represents the decay threshold for level j and is always less than one. Two sets of values for these thresholds are shown in Tables III and IV. If the ratio of peak amplitudes crosses either threshold, the transient detector will select a shorter signal sample block length. This adaptive process is performed by stage three and is described in the following paragraphs.

Before discussing the third stage, it may be helpful to explain the differences between the sets of thresholds shown in Tables III and IV. The thresholds in Table III implement a transient detector which treats rising and falling transients identically, that is, a specific increase in amplitude will result in selecting the same block length as the same decrease in amplitude. The thresholds shown in Table IV, however, require larger decreases in amplitude for a given choice of shorter block length that is required for increases in amplitude. This is because, as discussed above, the ear's post-transient masking interval is generally much longer than its pre-transient masking interval.

The third stage of the comparator constructs a tree of binary-valued nodes as shown in FIG. 12. Each node in the tree represents a potential subblock length that may be selected within the current subframe. The value for each node of this tree is determined from the expression $$t_{jk} = \begin{bmatrix} 1 & \text{if } R_{jk} > T_{Aj} \text{ or } R_{jk} < T_{Dj}, \\ 0 & \text{otherwise,} \end{bmatrix} \quad (14)$$

where:
j = the subframe hierarchical level number,
k = the subblock number within level j, and
$R_{jk}$ = the subblock peak amplitude ratio (see equation 13). The nodes of the tree are then modified. Starting with the "leaf" nodes of the tree (at least 3 in a preferred emobidment of the invention), for each node whose value is equal to one, its parent node and all sibling nodes are also set to one.

An actual implementation of stages two and three of the comparator differs from the conceptual description given above only in the form of the mathematical expressions. It should be appreciated that the value of the ratio expressed in equation 13 is undefined when $P_{j(k-1)}$ is zero. This problem is resolved by avoiding division, redefining expression 14 to be $$t_{jk} = \begin{bmatrix} 1 & \text{if } P_{jk} > T_{Aj}P_{j(k-1)} \text{ or } P_{jk} < T_{Dj}P_{j(k-1)}, \\ 0 & \text{otherwise,} \end{bmatrix} \quad (15)$$

where:
- j = the subframe hierarchical level number,
- k = the subblock number within level j, and
- $P_{jk}$ = the subblock peak amplitude (see equation 11).

The logic which constructs and modifies the tree is illustrated by the flowchart in FIG. 13. An example of a tree before and after modification is shown in FIG. 14.

The fourth stage of the comparator prunes all zero nodes from the tree. If the tree is comprised only of zero nodes, the transient detector will indicate that the frame controller, represented by box 114 shown in FIG. 1a, is allowed to use a maximum length sample block if possible. Otherwise, the remaining leaf nodes determine the subblock lengths. The subblock length for leaf nodes on level j is $N_j$ as defined in equation 10. Referring to FIG. 14 for example, the leaf nodes remaining after the pruning process are $t_{31}$, $t_{32}$, and $t_{22}$. In a preferred embodiment of the invention, the length for each of these subblocks will be as shown in FIG. 15. FIG. 16 provides an example of the subblock lengths selected for a signal segment containing a transient waveform.

Note that for a preferred embodiment of the invention using the E-TDAC transforms, the sum of the subblock lengths represented by the leaf nodes of the tree constructed by the transient detector is always equal to N/2 samples. This total equals the number of signal samples advanced during each pass through the transient detector. Consequently, the transient detector has to process a particular signal sample only once.

It should be realized by one skilled in the art that other transient detection and subblock length selection schemes may be utilized without departing from the scope or spirit of the invention.

Furthermore, in a preferred embodiment of the present invention which is described below, window functions and transforms are selected according to the signal sample block length specified by the transient detector portion of the invention. The windowing function or the transform may be selected directly from transient characteristics without departing from the scope or purpose of the present invention.

C. Windowing

Unless the signal sample block is modified, a discrete transform will erroneously create nonexistent spectral components because the transform assumes the signal in the block is periodic. See FIG. 17. These transform errors are caused by discontinuities at the edges of the block as shown in FIG. 18. These discontinuities may be smoothed to minimize this effect. FIGS. 19a through 19d illustrate how a block is modified or weighted such that the samples near the block edges are close to zero. The multiplier circuit shown in FIG. 19a weights the sampled input signal x(t) shown in FIG. 19b by the weighting function shown in FIG. 19c. The resultant signal is shown in FIG. 19d. This process is represented by box 112 in FIG. 1a. This weighting function, called an analysis window, is a sample-by-sample multiplication of the signal sample block. As discussed above, analysis windows have been the subject of considerable study because its shape has significant effects upon digital filter performance. Briefly, a good window permits steeper transition band rolloff for a given level of depth of stopband rejection, and permits correction of its weighting effects. Window design is discussed below in more detail.

The choice of window is also affected by the signal sample block length selected by the transient detector. Because the coder adapts the signal sample block length according to transient signal conditions, the coder must also chose an analysis window with the appropriate shape and length. This process of choosing an analysis window in response to the signal sample block length selected by the transient detector is performed by the frame controller represented by box 114 in FIG. 1a. The frame controller is discussed in more detail below.

It should be noted at this point that when the transient detector calls for a reduced block length, the window selected for subblocks may degrade filter selectivity below that achievable with a window for a full-length block because it may be symmetric or go to zero at both of its edges. As discussed above, use of a suboptimal window will degrade filter selectivity in the forward and inverse transforms. Nevertheless, suboptimal windows must be chosen for two reasons as will be shown below: (1) the discrete forward and inverse transforms used in the preferred embodiment of the invention impose requirements upon the window shape in order that time-domain aliasing distortion may be cancelled, and (2) the composite analysis/synthesis window shape must be such that adjacent overlapped windows sum to unity across the overlap interval.

For a given window function W (a preferred window function will be discussed in more detail below), the notation $W_{ab}$ will be used to represent a complete window which starts at or near zero, rises to a value at or near one after $N_a/2$ samples, and falls to a value at or near zero after $N_b/2$ samples. The total length of a window $W_{ab}$ may be expressed as $$len[W_{ab}] = \frac{N_a + N_b}{2}$$

where notation $N_x$ = subblock length on level x (see equation 10). Window $W_{ab}$ is symmetric if a equals b. Consistent with this notation, the full-length window used to weight a maximum length signal sample block will be denoted by $W_{00}$.

A partial window which starts at or near a value of zero and rises to an ending value at or near one after $N_a/2$ samples is represented by the notation $W_a^+$. A partial window which starts at or near a value of one and falls to an ending value at or near zero after $N_a/2$ samples is represented by the notation $W_a^-$.

A family of windows is shown in FIG. 20. For example, window $W_{00}$ is represented by the curve formed by the union of windows $W_0^+$ and $W_0^-$. Window $W_{32}$ is represented by the union of windows $W_3^+$ and $W_2^-$.

D. Frame Control

Box 114 in FIG. 1a represents the processes which control the choice of an analysis window and the selection of transform in accordance with the output of the transient detector. These processes control the activities needed to process a signal frame and are described below. Considerations for performing concurrent transforms with a single FFT are discussed briefly.

1. Fixed-Frame Alignment

In one embodiment of the invention using the E-TDAC transform, Fixed-Frame Alignment (FFA) permits concurrent processing of transforms for not only pairs of full-length signal sample blocks, but also for pairs of subblocks. FFA produces constant length frames, therefore the alignment of frame boundaries is fixed or synchronous. FFA is limited, however, to choosing subblock lengths which are one-half the maximum signal sample block length. The transient detector for FFA, therefore, is simpler than that described above in that the hierarchical subframe has only one level.

FIGS. 21a through 21c each illustrate a sequence of windowed signal sample blocks in a single-channel system. Block A and block B represent two blocks that have been transformed concurrently by a single FFT. Blocks C and D would have been transformed concurrently were it not for the selection of a shorter block length due to the occurrence of a transient.

In FIG. 21a, a transient occurs in the second half of block C (in subblock $C_b$) and the first half of block D (in subblock $D_a$). The coder need only shift to a N/2 point transform for the four subblocks within blocks C and D. The window that is used for subblocks $C_a$ and $D_a$ is $W_0^+$, and the window that is used for subblocks $C_b$ and $D_b$ is $W_0^-$. Windows $W_0^+$ and $W_0^-$ are suboptimal because they do not go to zero at both edges. As shown in FIG. 22a, use of a suboptimal window causes significant degradation in filter bank selectivity. Although poorer coder performance in the subblock containing the transient will generally be masked by the transient, degraded performance may be audible in the shorter length subblocks preceding and following the subblock containing the transient. It is desirable, therefore, to resume use of the maximum length signal sample blocks as quickly as possible after the transient condition subsides.

Two different E-TDAC transform phase terms are required by FFA for aliasing cancellation. FIG. 23a shows two adjacent overlapped full-length signal sample blocks recovered from the inverse modified DCT and inverse modified DST before overlap-add of the adjacent blocks has cancelled time-domain aliasing. The recovered signal is composed of two components: the windowed original signal (solid line), and time-domain aliasing distortion (dotted line). The aliasing component is a time-reversed replica of the windowed original signal, but time reversal occurs in two separate regions. The phase term m for the E-TDAC transform (see equations 1 and 2) controls the location of the boundary between these two regions. For normal E-TDAC, the boundary is located at the mid-point of the signal sample block. The required phase term is shown in equation 6.

FIG. 23b shows two adjacent overlapped transform blocks recovered from an embodiment of the present invention using FFA as it shifts to a shorter subblock length. A full-length block has been recovered from the inverse modified DCT. A half-length block has been recovered from the inverse modified DST. The aliasing component in the DCT block is the same as before. But if overlap-add of adjacent blocks is to cancel aliasing, the aliasing component in the first DST subblock must be completely time-reversed end-for-end. Hence, a different phase term m is required for the subblock. End-for-end reversal of the aliasing component is required for all subblocks. The appropriate phase term is $$m = \tfrac{1}{2}. \qquad (16)$$

It can be shown that the phase term may be written in the more general form $$m = \frac{\phi + 1}{2} \qquad (17)$$

where $\phi$ = location of boundary between time-reversal regions, expressed as a number of samples from the right-hand or trailing edge of the sample block. This equation represents an expression for a case more general than is required for FFA, but it is necessary for other frame control techniques discussed below.

For example, FIG. 23c illustrates a signal sample block divided into two subblocks and weighted by two windows. The right-hand subblock and window are N/4 samples in length. Within this subblock, the boundary between regions is at a point N/8 samples from the right-hand or trailing edge of the subblock. The phase term required to cause time-reversal of the aliasing component within each region of the N/4 sample subblock is $$m = \frac{\frac{N}{8} + 1}{2} \qquad (18)$$

where N = maximum signal sample block length.

For the example shown in FIG. 21a, a single FFT can be used to concurrently process a DCT for subblock $C_a$ and a DST for subblock $D_a$. Likewise, a single FFT can concurrently process a DCT for subblock $C_b$ and a DST for subblock $D_b$. Concurrent processing of maximum length blocks can resume with blocks E and F.

The example shown in FIG. 21b is only slightly different from that shown in FIG. 21a. The transient shown in FIG. 21b occurs in the second half of block D (in subblock $D_b$). In this case, the concurrent processing of transforms by a single FFT requires that the shorter subblock length be used over a longer interval than the case shown in FIG. 21a. Hence, poorer coder performance caused by degraded filter bank selectivity is impaired over a longer interval. DCT/DST block pairs can be concurrently processed for subblock pairs $C_a/D_a$, $C_b/D_b$, $E_a/F_a$, and $E_b/F_b$. Concurrent processing of maximum length blocks can resume with blocks G and H (blocks G and H not shown). The phase term for the subblocks required by E-TDAC for alias cancellation is the same as that shown above in equation 16.

The position of the transient shown in FIG. 21c is the same as that shown in FIG. 21b, but the processing sequence is slightly different. For the example shown in FIG. 21c, the full-length block C is transformed alone. Subblock pairs $D_a/E_a$ and $D_b/E_b$ are transformed concurrently. Concurrent processing of maximum length blocks can resume with blocks F and G, however, the earlier block of the block pair is now transformed by a DST. This sequence permits an embodiment of the invention to resume maximum block-length coding more quickly, however, a faster processor is required because the number of calculations required to transform blocks C through F is about 20% greater than that required for coding the sequence using concurrent transforms for fixed length blocks.

2. Enhanced Fixed-Frame Alignment

A preferred embodiment of the present invention uses a technique called Enhanced Fixed-Frame Alignment (EFA) which produces a fixed or synchronous frame alignment, but allows use of subblock lengths which are power-of-two submultiple of the maximum signal sample block length. In one embodiment of the invention, the EFA technique may use signal sample block lengths of 1024, 512, 256, and 128 samples. (As will be shown below, a 64 sample subblock length will also be used in certain cases.) This limitation in length to power-of-two submultiples is not very restrictive in actual practice, however, because FFT implementations of discrete transforms perform more efficiently for block lengths which are a power of two.

Before EFA can be fully described, it is necessary to introduce the concept of a "bridge transform." A bridge transform is one which bridges the shift from one signal sample block length to another. For example, as shown in FIG. 24, suppose the present invention is called upon to process one subblock of N/2 samples followed by another subblock of N/4 samples. It would be possible to perform a separate transform for each subblock. Note, however, that the N/2 subblock would be windowed by $W_0^+$, and the N/4 subblock would be windowed by $W_1^-$. Both windows are clearly suboptimal, causing significant degradation in filter selectivity. See FIG. 22a for example.

A bridge transform minimizes filter selectivity degradation by avoiding the use of $W_j^+$ and $W_j^-$ type windows. For the example shown in FIG. 24, a bridge transform allows a single transform to use one $W_{01}$ window rather than requiring two transforms using separate $W_0^+$ and $W_1^-$ windows, respectively. The bridge transform, in effect, transforms a single subblock of 3N/4 samples. As may be seen by comparing FIGS. 22a and 22b, the filter response curve for a $W_{01}$ window function is superior to that for window function $W_0^+$ or other partial window.

FIG. 24 also shows the time-reversal regions required by the bridge transform for time-domain aliasing cancellation. The boundary between time-reversal regions is at the mutual edges of the two subblocks containing the signal samples to be transformed by the bridge transform. This boundary is located N/4 samples from the right-hand edge of the two bridged subblocks. Hence, from equation 17 the required phase term for a N/2 to N/4 bridge transform is seen to be $$m = \frac{\frac{N}{4}+1}{2}$$

where N=maximum signal sample block length.

The single bridge transform shown in FIG. 24 may be calculated by using an FFT to compute the transform for three N/4 subblocks followed by a recombination operation. This technique is well known in the art. See Oppenheim and Schafer, *Digital Signal Processing*, Englewood Cliffs, N.J.: Prentice-Hall, Inc., 1975, pp. 307–314. The FFT with this recombination operation can also be used to concurrently process two E-TDAC bridge transforms. The pre- and postprocessing required for concurrent processing is the same for bridge transforms as that described by Brigham and Lookabaugh for normal full-length E-TDAC transforms. It is important to note, however, that concurrent processing in E-TDAC is possible only for modified DCT and modified DST which have the same length and the same phase terms.

Concurrent processing is often used to permit an embodiment of the invention to use slower processors. There is little advantage gained, however, by concurrent processing for a single-channel version of the invention using EFA. The processor chosen for an embodiment using concurrent processing should be capable of handling a worst-case single-transient event. The separate transformation of all full-length blocks imposes only a slightly greater work load upon the processor than does the worst-case single-transient event. Therefore, only a slightly faster processor is needed to implement a single-channel version of the current invention using EFA without concurrent processing than would be required to implement the invention using EFA with concurrent processing.

Concurrent processing can be advantageous in two-channel systems if both channels are always coded using the same block lengths. This may be accomplished by selecting subblock lengths for both channels from one binary tree. This tree is constructed from a Boolean "or" combination of corresponding nodes in two separate trees, each separate tree built by processing each channel through its own transient detector.

The following explanation of EFA pertains to a single-channel embodiment of the invention, and it assumes that concurrent processing is not performed.

The flowcharts shown in FIGS. 26a through 26f illustrate a logic flow which can be used to control the frame control process for EFA. An overview of the process is shown in FIG. 26a. The initialization step represented by box 2600 is shown in FIG. 26b. The body of the process is comprised of four main sections.

The first section of frame control, shown in FIG. 26c, sets the subblock length. A queue is examined to determine if any transient detector binary tree nodes remain unprocessed. If not, the transient detector processes the next N/2 signal samples, constructs the binary tree as described above, and places into the queue the level of each leaf node. The first entry is removed from the queue and assigned to $J_1$. This value defines the desired length for the "current" subblock. Symbol $J_0$ represents the tree node level for the "previous" subblock. If no transients were detected and the transient detector has indicated a block length of N samples may be used, i.e., $J_1=0$, then flag PARTIAL must be tested to determine if the encoder is permitted to resume full-length block processing. If not, $J_1$ is forced to a value of one setting the subblock length to N/2 samples.

Section two of frame control, shown in FIG. 26d, determines the required analysis window, transform length, and E-TDAC phase term. The chosen window is $W_{xy}$, where x is established by the value of $J_0$ and y is established by the value of $J_1$. The transform length and phase term are determined in a similar fashion as shown in FIG. 26d.

Section three is illustrated in FIG. 26e. This section selects the type of transform required by examining flag TYPE. This binary flag indicates whether the modified DCT or modified DST should be performed.

The fourth section of frame control is shown in FIG. 26f. If $J_0$ and $J_1$ are both zero, then it is known that a full-length transform was just performed. Both flags PARTIAL and BRIDGE are cleared. Otherwise, flag BRIDGE is toggled. Immediately prior to the clearing-/toggling step, this flag indicates whether a normal or bridge transform was used for the current transform. The flag TYPE is toggled, and the current subblock length $J_1$ is assigned to $J_0$.

As shown in FIG. 26a, if flag BRIDGE is clear, processing continues with section one by getting the next subblock length. Otherwise, the PARTIAL flag is toggled and processing continues with section two.

FIG. 25 illustrates a sequence of windowed signal sample blocks in a single-channel system. A transient occurs in the second half of block C and the first half of block D. The binary tree constructed by the transient detector for this subframe is shown in FIG. 14. The corresponding lengths specified for each subblock are shown in FIG. 15. The coder processes block C by first using a bridge transform of length 9N/16 samples with a $W_{03}$ window. Next, one transform of length N/8 samples is used with a $W_{33}$ window. Next, a bridge transform of length 3N/16 samples is used with a $W_{32}$ window. The remaining N/8 samples in block C are held for processing in a bridge transform in the following subframe with the start of block E.

The coder transforms the first half of block D with two transforms of length N/8 samples and one transform of length N/4 samples. A $W_{33}$ window is used for both N/8 sample subblocks and a $W_{22}$ window is used for the N/4 sample subblock. The second half of block D is transformed by one N/2 length tranform using a $W_{11}$ window. All windows used in the D subblock are optimal.

The use of bridge transforms and asymmetric windows permits E-TDAC to cancel time-domain aliasing by using a phase term as calculated by equation 17. The time-reversal regions and corresponding phase terms required for this sequence of blocks are shown in FIG. 25.

3. Dynamic-Frame Alignment

Dynamic-Frame Alignment (DFA) with the E-TDAC transform is able to select any subblock length L provided L is even and greater than or equal to four, however, a practical embodiment of the invention implemented by a FFT uses only subblock lengths which are a power-of-two submultiple of the maximum signal sample block length. This is because the FFT performs most efficiently for transform lengths which are powers of two. DFA does not permit concurrent processing of transforms for pairs of subblocks in most cases, but DFA does improve coder performance over that possible with FFA or EFA by allowing the coder to return to maximum length signal sample blocks immediately after the transient condition has passed. Therefore, DFA will generally produce transform block frames of varying length.

DFA is very similar to EFA. The major difference between the two techniques is that unlike EFA, DFA is not constrained to maintain a fixed or synchronous frame alignment. DFA is free to truncate the current block frame and immediately shift back to a full-length signal sample block. EFA, on the other hand, must insure that appropriate subblock lengths are used to finish the current frame before resuming full-length block processing.

The DFA frame control process differs from EFA frame control in only a few respects. These differences are explained with reference to the flowcharts shown in FIGS. 26a, 26c, and 26f. First, flat PARTIAL is not toggled as shown in box 2660 of FIG. 26a, but is always set to zero. Second, no test is required to determine if the tree-node queue is empty as shown in box 2611 of FIG. 26c because the queue will always be empty. Third, flag BRIDGE is not toggled as shown in box 2644 of FIG. 26f, but rather is always set to zero.

The DFA detector does not always advance through N/2 new samples for each iteration. Assuming the transient detector selected a shift to a subblock length of N/8 samples for the current subblock, the transient detector advances by only N/8 signal samples before processing the next subframe. Thus, unlike for EFA, the DFA transient detector may examine a given signal sample more than once.

FIG. 27 illustrates a sequence of windowed signal sample blocks in a single-channel system. Blocks A and B are full-length blocks. A transient occurs in the second half of block C. The following discussion assumes that the transient detector selected a shift to two subblocks of length N/8 samples.

The coder begins processing block C with a bridge transform of length 9N/16 samples using a $W_{03}$ window. Block C, which is a truncated block, is finished by a transform of length N/8 samples using a $W_{33}$ window. A bridge transform of length 9N/16 samples is used with a $W_{30}$ window in block E to shift back to full-length block processing.

The coder transforms truncated block D with two transforms of length N/8 samples. Block F, a full-length block, begins immediately after the truncated block D. Note that the block frame boundary has shifted by ⅜ of a full-block length.

F. Coefficient Quantization and Formatting

Frequency coefficients as generated by the forward transform are generally not suitable for low bit-rate transmission or efficient storage. Various quantization techniques may be used to reduce bit requirements by taking advantage of a signal's redundancy and irrelevancy. For example, see Jayant and Noll, *Digital Coding of Waveforms*, Englewood Cliffs, N.J.: Prentice-Hall, Inc., 1984, pp. 563-576. This process is represented by box 118 in FIG. 1a.

The formatting process assembles the quantized transform coefficients and signal sample block length for transmission or storage. This process is represented by box 120 in FIG. 1a. In a preferred embodiment of the invention, a specific sequence of subblock lengths are represented by an index into a table of all possible sequences of subblock lengths. For example, one table entry would represent the sequence of subblock lengths N/2, N/8, N/8, and N/4 samples. Another entry would represent the sequence of eight N/8 sample subblocks.

Frame synchronization bits and error detection/correction codes may be used as needed for data formatted for transmission. Database pointers or keys may be added as needed for data formatted for storage. The formatted frame is now ready for transmission or for storage along path 122 shown in FIG. 1a.

The DFA technique imposes greater complexity upon signal formatting. A preferred implementation of DFA formatting utilizes a circular buffer. When the appropriate number of data b bits representing transform coefficients and side information have been buffered, that data may be formatted, appended to frame synchronization bits, and transmitted or stored. This permits the formatted frame to have a constant length. Consequently, with DFA the formatted frame is no longer equivalent to a transform-block frame. A DFA formatted frame is not guaranteed to contain the same number of transform blocks. Hence, accuracy of transform block length information as received by the decoder is very critical and should be protected by some method such as redundancy or error correction codes. Corruption of the transform block length will prevent the decoder from properly decoding that transform block and all subsequent blocks until transform block synchronization is reestablished.

G. Deformatting and Coefficient Linearization

A deformatting process takes place when the digitized and coded signal is received from signal channel 132, either by receipt of a transmitted signal or retrieved from storage. The deformatting process is represented by box 134 in FIG. 1b. Deformatting extracts the quantized transform coefficients and any side information passed by the encoder. The transform coefficients are converted into a linear form of representation by using a process which is the inverse of that used to quantize the coefficients in the encoder. This process is represented by box 136 in FIG. 1b. The signal sample block length is used to choose the appropriate synthesis window function and set the length of the inverse transform.

H. Synthesis Filter Bank-Inverse Transform

Box 138 in FIG. 1b represents a bank of synthesis filters which transform each set of frequency-domain transform coefficients recovered from the deformatting and linearization procedures into a block of time-domain signal samples. An inverse transform from that used in analysis filter bank 116 in FIG. 1a implements synthesis filter bank 138. The inverse discrete transforms for E-TDAC used in an embodiment of the invention are alterating applications of a modified inverse DCT and a modified inverse DST. The length of each transform is set equal to each signal sample block length extracted from the formatted signal. The required phase term is calculated in the same manner as that done in the encoder portion of the invention, described above.

Because half of the transform coefficients are omitted from transmission or storage (see expressions 3 and 4), those coefficients must be recreated for the inverse transforms. The missing DCT coefficients may be recreated from the available DCT coefficients as shown in equation 19. The missing DST coefficients may be recreated as shown in equation 20. The inverse modified DCT is expressed in equation 21, and the inverse modified DST is expressed in equation 22.

$$\hat{C}(k) = -\hat{C}(N - k) \tag{19}$$

for $N/2 \leq k < N$ $$\hat{S}(k) = -\hat{S}(N - k) \tag{20}$$

for $N/2 < k \leq N$ $$\hat{x}(n) = \frac{1}{K} \sum_{k=0}^{K-1} \hat{C}(k)\cos\left(2\pi k \frac{n+m}{N}\right) \tag{21}$$

for $0 \leq k < N$

-continued $$\hat{x}(n) = \frac{1}{K} \sum_{k=0}^{K-1} \hat{S}(k)\sin\left(2\pi k \frac{n+m}{N}\right) \tag{22}$$

for $0 \leq k < N$ where
k = transform coefficient number,
n = signal sample number,
K = number of transform coefficients,
N = sample block length,
m = phase term for E-TDAC (see equation 6),
$\hat{C}(k)$ = quantized DCT coefficient k,
$\hat{S}(k)$ = quantized DST coefficient k, and
$\hat{x}(n)$ = recovered quantized signal x(n).

FIGS. 4a–4e and 6a–6g illustrate the transform process of the analysis-synthesis filter banks. The analysis filter bank transforms the time-domain signal into an alternating sequence of DCT and DST blocks. The inverse transform applies the inverse DCT to every other block, and applies the inverse DST to the other half of the blocks. As shown in FIGS. 5a–5d, the recovered signal contains aliasing distortion. This distortion is cancelled during a subsequent time-domain block overlap-add process represented by box 144 in FIG. 1b. The overlap-add process is discussed below.

Calculations for the inverse transform are performed using an FFT algorithm. The same techniques as those employed in the forward transform may be used for the inverse transform to permit concurrent calculation of both the inverse modified DCT and the inverse modified DST using a single FFT.

The frame control process represented by box 140 in FIG. 1b controls the alignment of subblock pairs and the choice of the phase term required by the inverse E-TDAC transform to cancel time-domain aliasing. This process is substantially the same as the frame control process used in the encoder portion of the invention.

I. Synthesis Window

FIGS. 6a–6g illustrate cancellation of time-domain aliasing by the overlap-add of adjacent time-domain signal sample blocks. As derived by Princen and Bradley, to cancel time-domain aliasing distortion, the E-TDAC transform requires the application of a synthesis window identical to the analysis window and an overlap-add of adjacent blocks. Each block is overlapped 100%; 50% by the previous block and 50% by the following block. Synthesis-window weighting is represented by box 142 in FIG. 1b.

The analysis and synthesis windows must be designed such that the analysis-synthesis product-window always sums to unity when two adjacent product-windows are overlapped. The overlap-add process is represented by box 144 in FIG. 1b, and illustrated in FIGS. 6a–6g. Signals $y_c(t)$ and $y_s(t)$, recovered from the inverse DCT and DST respectively, are shown in FIGS. 6a and 6d. Each signal is grouped into a series of blocks. Each signal block is weighted by the synthesis-window functions shown in FIGS. 6b and 6e. The resulting blocks of signals $y_c(t)$ and $y_s(t)$ are shown in FIGS. 6c and 6f. The two signals, overlapped by one-half block length, are added to produce signal y(t), shown in FIG. 6g. Signal y(t) is an accurate reconstruction of the original input signal.

As shown in FIG. 28, a signal sample at some time $n_0 t$ within the overlap interval between block k and block k+1 is represented by a sample in each of the two blocks. Following an overlap-add of the two windowed blocks, the recovered signal sample at time $n_0 t$ is seen to be the sum of the samples from windowed blocks k and k+1, which may be expressed as $$x(n_0 t) = WP_k(n_0 t) \cdot x(n_0 t) + WP_{k+1}(n_0 t) \cdot x(n_0 t) \quad (23)$$

where $WP_k(n_0 t) = WA_k(n_0 t) \cdot WS_k(n_0 t) = \{WA_k(n_0 t)\}^2$,
$WA_k(n_0 t)$ = analysis window in block k at time $n_0 t$,
$WS_k(n_0 t)$ = synthesis window in block k at time $n_0 t$, and
$WA_k(n_0 t) = WS_k(n_0 t)$ as required by the E-TDAC transform.

The product-window weighting effects are cancelled if the sum of the two adjacent product-windows across the window overlap interval equals unity. Therefore, signal x(nt) may be accurately recovered if $$WP_k(nt) + WP_{k+1}(nt) = 1 \quad (24)$$

for all time samples nt within the overlap interval between block k and block k+1.

Although any window with the appropriate overlap-add properties may be used as a basis for deriving an analysis-synthesis window pair, the window used in a preferred embodiment of the invention is derived from a Kaiser-Bessel window with an alpha value in the range of from 4 to 7. See equation 25.

$$W(n) = \frac{I_0\left[\pi\alpha\sqrt{1 - \left(\frac{n}{N/2}\right)^2}\right]}{I_0[\pi\alpha]} \quad (25)$$

for $0 \leq n < N$ where
$\alpha$ = Kaiser-Bessel alpha factor,
n = window sample number,
N = window length in number of samples, and $$I_0 = \sum_{k=0}^{\infty} \frac{(x/2)^k}{k!}.$$

The derivation convolves a Kaiser-Bessel window with a rectangular window of length equal to the block length minus the overlap interval. See equation 26. This equation may be simplified to that shown in equation 27.

$$WP(n) = \frac{\sum_{k=0}^{N-1} s(k) W(n - k)}{\sum_{k=0}^{v} W(k)} \quad (26)$$

for $0 \leq n < N$ $$WP(n) = \frac{\sum_{k=0}^{N-v-1} W(n - k)}{\sum_{k=0}^{v} W(k)} \quad (27)$$

for $0 \leq n < N$ where
n = product-window sample number,
v = number of samples within window overlap interval,
N = desired length of the product-window,
W(n) = beginning window function of length v+1,
WP(n) = derived product-window of length N, and $$s(k) = \begin{bmatrix} 1 & \text{for } 0 \leq k < N - v \\ 0 & \text{otherwise.} \end{bmatrix}$$

For a preferred embodiment of the invention using the E-TDAC transform, the analysis and synthesis windows are obtained by taking the square root of the derived product-window WP(n). The analysis and synthesis windows have adaptive lengths of 1024, 512, 256, and 128 samples with a 100% window overlap (N/2 samples). The analysis window function is shown in equation 28.

$$WA(n) = \sqrt{\frac{\sum_{k=0}^{N/2-1} W(n - k)}{\sum_{k=0}^{N/2} W(k)}} \quad (28)$$

for $0 \leq n < N$ where
$N \in \{128, 256, 512, 1024\}$, and
W(n) = Kaiser-Bessel function of length N=1; the alpha factor is in the range 4 to 7.

J. Signal Output

Box 146 in FIG. 1b represents a conventional digital-to-analog converter which generates a varying analog signal in response to a digital input. The digital input is obtained from the 16 most significant bits of the 24-bit integer words produced by the overlap-add process. The analog output should be filtered by a low-pass filter, shown in box 148 of FIG. 1b, to remove spurious high-frequency components. In a preferred embodiment of this invention, the nominal cutoff frequency for this filter is 20 kHz. The recovered audio signal, suitable for amplification, is available at output terminal 150 shown in FIG. 1b.

III. Alternative O-TDAC Implementation of Invention

An alternative embodiment of the invention employs a transform referred to as Oddly-Stacked Time-Domain Aliasing Cancellation (O-TDAC). The following description discusses the differences between the E-TDAC and O-TDAC implementations of the invention.

A. Forward Transform

O-TDAC utilizes a transform function which is a modified Discrete Cosine Transform (DCT), shown in equation 29.

$$C(k) = \sum_{n=0}^{N-1} x(n) \cos\left[2\pi\left(k + \frac{1}{2}\right)\frac{n + m}{N}\right] \quad (29)$$

for $0 \leq k < N$ where k = frequency coefficient number,
n = input signal sample number,
N = sample block length,
m = phase term for O-TDAC (see equation 6),
x(n) = quantized value of input signal x(t) at sample n,
C(k) = DCT coefficient k.

The O-TDAC transform produces a set of spectral coefficients or transform blocks of the form $$\{C(k)\}_i = \begin{bmatrix} C(k) & \text{for } 0 \leq k < \frac{N}{2} \\ 0 & \text{for } k = \frac{N}{2} \end{bmatrix} \quad (30)$$

where
i = signal sample block number, and
C(k) = DCT coefficient (see equation 29).

The computation algorithm used is the Fast Fourier Transform (FFT). Unlike the E-TDAC version, the O-TDAC implementation cannot use a single FFT to concurrently transform two signal sample blocks. The $N^2$ computational complexity of the transform can be reduced to $N \cdot \log_2 N$, however, by employing a technique similar to the premultiply-transform-postmultiply process used in the E-TDAC version. The premultiply step converts the real valued sequence of signal samples x(n) into a complex valued sequence by multiplying the signal samples by the complex function $$e^{-j\pi \frac{n}{N}} \quad (31)$$

where
$j = \sqrt{-1}$,
n = input signal sample number, and
N = sample block length.

A Discrete Fourier Transform implemented by a FFT converts the modified signal samples into a set of transform coefficients. Because the FFT is a complex transform, the real and imaginary parts of the modified signal sample set can be transformed concurrently. Finally, a postmultiply step obtains the DCT coefficients. This process is represented below in equations 32 and 33.

$$X^*(k) = FFT\{x(n)e^{-j\pi \frac{n}{N}}\} \quad (32)$$

$$C(k) = \quad (33)$$

$$R(k)\cos\left[2\pi\left(k + \frac{1}{2}\right)\frac{m}{N}\right] + Q(k)\sin\left[2\pi\left(k + \frac{1}{2}\right)\frac{m}{N}\right]$$

where
$j = \sqrt{-1}$,
n = input signal sample number,
N = sample block length,
k = frequency coefficient number,
m = phase term for O-TDAC (see equation 6),
R(k) = real part of coefficient $X^*(k)$,
Q(k) = imaginary part of coefficient $X^*(k)$, and
C(k) = DCT coefficient k.

In a preferred embodiment for a one-channel version of the invention, each signal sample block is transformed separately using an FFT. One block constitutes a frame. In two-channel systems, signal sample blocks from each of the two channels are transformed by two FFT processes into a $DCT_1/DCT_2$ block pair. This block pair constitutes a frame.

Princen, Johnson, and Bradley showed that with the proper phase component m (see equation 6) and a carefully designed pair of analysis-synthesis windows, the O-TDAC technique can accurately recover an input signal from a sequence of cosine transform blocks of the form $$\{C(k)\}_0, \{C(k)\}_1, \{C(k)\}_2, \{C(k)\}_3, \quad (34)$$

The O-TDAC transformation and alias cancellation process is very similar to that for the E-TDAC transform, and is illustrated in FIGS. 29a–29e, 30a–30d, and 31a–31g. The principal difference is the form of the alias component. For the first half of the sampled signal block, the alias component is a time reversed image of the input signal about the one-quarter point of the sample block, but the sign of its amplitude is inverted from that of the input signal. For the second half of the sampled signal block, the aliasing is time reversed about the three-quarter point of the sample block with no change in sign. See FIGS. 30b and 30d.

The design and use of analysis and synthesis windows is identical to that for E-TDAC. See FIGS. 31a–31g. The frame alignment techniques discussed above for E-TDAC apply equally well here.

No additional considerations to those needed for E-TDAC are required to use adaptive signal sample block lengths with O-TDAC except the choice of transform phase term used for the FFA technique. The phase term required for aliasing cancellation is illustrated in FIG. 32 which shows signal sample blocks C through E, a sequence of three overlapped full-length transform blocks recovered from the inverse O-TDAC transform. Blocks D and E are segmented into subblocks according to the FFA technique.

To accomplish aliasing cancellation by overlap-add, the aliasing component in subblocks $D_a$ and $E_a$ must be reversed in time and inverted in amplitude from that of the windowed original signal. Note in FIG. 31a that this reversal/inversion property is manifested by the aliasing component in the left-hand region for O-TDAC. Therefore, the boundary between reversal regions must be placed at the right-hand edge of the subblock. From equation 17, we know that the phase term required for subblocks $D_a$ and $E_a$ is $$m = \tfrac{1}{2}. \quad (35)$$

The aliasing component in subblocks $D_b$ and $E_b$ is reversed in time only. This property is manifested in the right-hand region for O-TDAC. Therefore, the boundary between reversal regions must be placed at the left-hand edge of the subblock. From equation 17, the required phase term is seen to be $$m = \frac{\frac{N}{2} + 1}{2} \quad (36)$$

where N = maximum signal sample block length.

The general rule for determining the phase term for O-TDAC using FFA is as follows. The transform for the first subblock within each full-length block uses the phase term shown in equation 35. The transform for all full-length blocks and for the second subblock within each full-length block uses the phase term shown in equation 36.

B. Inverse Transform

Half of the DCT coefficients are omitted from transmission or storage, and are recreated from the available DCT blocks using the relationship shown in equation 37. The inverse modified DCT is shown in equation 38.

$$\hat{C}(k) = -\hat{C}(N - k) \tag{37}$$

for $N/2 \leq k < N$ $$\hat{x}(n) = \frac{1}{K} \sum_{k=0}^{K-1} \hat{C}(k)\cos\left[2\pi\left(k + \frac{1}{2}\right)\frac{n+m}{N}\right] \tag{38}$$

for $0 \leq n < N$ where
k = transform coefficient number,
n = signal sample number,
K = number of transform coefficients,
N = sample block length,
m = phase term for E-TDAC (see equation 6),
$\hat{C}(k)$ = quantized DCT coefficient k, and
$\hat{x}(n)$ = recovered quantized signal x(n).

The O-TDAC implementation of the inverse transform may reduce computational complexity from $N^2$ to $N \cdot \log_2 N$ by employing a similar premultiply-transform-post multiply process as that described above for the forward O-TDAC transform. This process converts the real-valued DCT coefficients into a set of modified complex valued coefficients, concurrently transforms the real and imaginary parts of the modified coefficients using a single inverse FFT (IFFT), and obtains the time-domain signal from postmultiplication, as shown in the following equations.

$$x^*(n) = IFFT\{\hat{C}(k)e^{-j2\pi\frac{m}{N}}\} \tag{39}$$

for $0 \leq n < N$ $$\hat{x}(n) = r(n)\cos\left[\pi\frac{n+m}{N}\right] - q(n)\sin\left[\pi\frac{n+m}{N}\right] \tag{40}$$

for $0 \leq n < N$ where
j = $\sqrt{-1}$,
m = phase term for O-TDAC (see equation 6),
N = sample block length,
k = frequency coefficient number,
n = input signal sample number,
r(n) = real part of sample x*(n),
q(n) = imaginary part of sample x*(n), and
$\hat{x}(n)$ = recovered quantized signal x(n).

Subsequent windowing, overlap-adding, and signal output processing is identical to that described above for the E-TDAC implementation of the invention.

C. Adaptive Use of the E-TDAC and O-TDAC Transforms

From the foregoing discussion, it should be appreciated by one skilled in the art that it is also possible to adaptively select between the E-TDAC and the O-TDAC transforms. The process of choosing analysis and synthesis windows is the same as that described above. The calculation of the phase terms required for time-domain aliasing cancellation conforms to the same principles discussed above. In order to insure aliasing cancellation, however, the form of the time-domain alias component restricts the manner in which the present invention can shift between the two TDAC transforms.

Generally stated, a shift to the E-TDAC modified DCT following the O-TDAC modified DCT, or to the O-TDAC modified DST following the E-TDAC modified DCT may be made at any time. A shift to the E-TDAC modified DCT following the O-TDAC modified DST, or to the O-TDAC modified DCT following the E-TDAC modified DCT may not be made unless it is accompanied by a shift to a half-block length with appropriate adjustments to the transform phase term as discussed above.

Transform selection may be used to improve coder performance for transients or for any other signal characteristic of interest. For example, by switching between these two TDAC transforms, a coder/decoder system can improve the coding of single-tone signals by adaptively shifting the nominal frequency of the transform coefficients. As discussed above, the ear's critical bands have variable center frequencies that adapt to auditory stimuli. A coder that can shift the center frequency of its subbands may be able to improve psychoacoustic masking effects for single-tone signals or signals dominated by a single frequency.

An encoder or decoder that shifts between O-TDAC and E-TDAC will shift the center frequency of its subbands because of the difference in transform coefficient bandwidths for the two transforms. As shown in FIG. 33a, E-TDAC transform coefficient zero (the DC component) and coefficient N/2 have bandwidths equal to one-half the bandwidth of all other transform coefficients. For the O-TDAC transform, however, each transform coefficient is of equal bandwidth. See FIG. 33b. In a preferred embodiment of the invention using a 1024 sample block sampled at 44.1 kHz, it is possible to move the nominal frequency of transform coefficient one, for example, from 21.5 Hz to 43 Hz by merely shifting from the E-TDAC transform to the O-TDAC transform.

A signal analyzer, represented by box 110 in FIG. 1a, that may be used in an embodiment of the invention which selects between the E-TDAC and O-TDAC transforms may be implemented by another transform with a length twice that of the transforms used in the analysis filter bank. Using the spectral information from the signal analyzer transform, frame controller 114 can establish which if any spectral components are dominant, and what the frequency of that component is within one-half the bandwidth of a filter bank transform coefficient. The frame controller can then select the TDAC transform whose subband center frequency is closest to that of the dominant component.

IV. Alternative Implementations of Invention

The E-TDAC transform is preferred for most applications, however, the signal processing resources required for a E-TDAC coder are greater than that required for coders using other transforms such as the Discrete Fourier Transform (DFT). Using a DFT, a coder may be implemented which requires less memory and processing speed. The basic structure of the DFT embodiment of the invention is identical to that shown in FIGS. 1a and 1b except that synthesis window 142 is not used.

The following description discusses the differences between the DFT and E-TDAC transform embodiments of the invention.

A. Transient Detector and Frame Control

The logic of the transient detector described above for the E-TDAC embodiment is identical in concept to that for the DFT embodiment except that the detector analyzes the samples for an entire block rather than only for one-half of a block. Hence, the frame control process, while similar in concept to that of E-TDAC, selects the subblock lengths for one full block length at a time rather than just for the half-block subframe length.

B. Windowing

This analysis window is different from that used by the E-TDAC coder because of differences between the E-TDAC transform and the DFT. It is important to choose a window design which reduces the amount of input signal sample block overlap because an analysis system implemented by a DFT is not critically sampled, i.e., the transmission rate or data storage requirements is doubled for the signal samples in the overlap interval.

Thus, a preferred window for a full-length 1024 sample block as used in a DFT embodiment of the invention exhibits a gain of unity over a large interval, thereby reducing the block overlap length from N/2 (512) samples to 16 samples. This reduction degrades the digital filter stopband rejection, but it incurs only a modest increase in data rate over that for non-overlapping windows.

A window in a family of DFT windows is derived similarly to that used to derive the product window $WP(n)$ for the E-TDAC embodiment. For the DFT embodiment, the kernel Kaiser-Bessel function is 17 samples in length and has an alpha factor within the range of 1.5 to 3. See equation 25. The DFT analysis window is obtained from the convolution product of the Kaiser-Bessel window and a rectangular window. For window $W_{00}$, the length of the rectangular window is 1008 samples (the block length of 1024 samples minus the overlap interval of 16 samples). Similarly for window $W_{33}$, the length of the rectangular window is 112 samples (or 128−16). Substituting these values into equation 27, the two window functions are seen to be $$W_{00}(n) = \frac{\sum_{k=0}^{1007} W(n-k)}{\sum_{k=0}^{16} W(k)} \tag{41}$$

$$W_{33}(n) = \frac{\sum_{k=0}^{111} W(n-k)}{\sum_{k=0}^{16} W(k)} \tag{42}$$

where $W(n)$=Kaiser-Bessel function of length 17, and the alpha factor is in the range 1.5 to 3.

C. Analysis Filter Bank-Forward Transform

The DFT implements the filter bank and is expressed as $$X(k) = \sum_{n=0}^{N-1} x(n) e^{-j2\pi k \frac{n}{N}} \tag{43}$$

for $0 \leq n < N$ where
$j = \sqrt{-1}$,
k = frequency coefficient number,
n = input signal sample number,
N = maximum signal sample block length,
x(n) = quantized value of input signal x(t) at sample n, and
X(k) = transform frequency coefficient k.

D. Synthesis filter Bank-Inverse Transform

The DFT implements the inverse filter bank and is expressed as $$x(n) = \frac{1}{N} \sum_{k=0}^{N-1} X(k) e^{j2\pi k \frac{n}{N}} \tag{44}$$

for $0 \leq k < N$ where
$j = \sqrt{-1}$,
k = frequency coefficient number,
n = input signal sample number,
N = maximum signal sample block length,
x(n) = recovered quantized signal x(t) at sample n, and
X(k) = transform frequency coefficient k.

E. Synthesis Window

As mentioned above, the DFT does not require the use of a synthesis window.

F. Other Transforms

Any orthogonal transform may be used without departing from the spirit or purpose of the invention. Applying the considerations discussed above for the DFT, it is also possible to adaptively select any orthogonal transform according to the presence of signal transients or any other signal characteristic. For example, an embodiment of the present invention may normally employ the conventional DCT shown in equation 45, but select the conventional DST shown in equation 46, or the DFT discussed above, to encode subblocks with transient signals. The inverse DCT and inverse DST are shown in equations 47 and 48, respectively.

$$X(k) = \sqrt{\frac{2}{N}} \alpha(k) \sum_{n=0}^{N-1} x(n) \cos\left(\frac{(2n+1)k\pi}{2N}\right) \tag{45}$$

$$X(k) = \sqrt{\frac{2}{N}} \alpha(k) \sum_{n=0}^{N-1} x(n) \sin\left(\frac{(2n+1)k\pi}{2N}\right) \tag{46}$$

$$x(n) = \sqrt{\frac{2}{N}} \sum_{k=0}^{N-1} \alpha(k) X(k) \cos\left(\frac{(2n+1)k\pi}{2N}\right) \tag{47}$$

$$x(n) = \sqrt{\frac{2}{N}} \sum_{k=0}^{N-1} \alpha(k) X(k) \sin\left(\frac{(2n+1)k\pi}{2N}\right) \tag{48}$$

where
k = frequency coefficient number,
n = input signal sample number,
N = maximum signal sample block length, x(n) = quantized value of input signal x(t) at sample n,
X(k) = transform frequency coefficient K, and $$a(k) = \begin{cases} \frac{1}{\sqrt{2}} & \text{for } k \neq 0 \\ 1 & \text{otherwise.} \end{cases}$$

As discussed earlier, the DCT generally provides superior coder gain for signals characterized by low-frequency components, but the DFT generally performs better for signals characterized by high-frequency components. More particularly, as discussed by Jayant and Noll, a DCT provides superior coding gain for a signal whose first normalized autocorrelation coefficient is 0.95 or higher, but a DFT provides superior coding gain for a signal whose first normalized autocorrelation coefficient is −0.95 or lower. The first normalized autocorrelation coefficient is defined as $$\rho_1 = \frac{R_{xx}(1)}{R_{xx}(0)} \tag{49}$$

where $R_{xx}(1)$ and $R_{xx}(0)$ are the first and zeroth autocorrelation coefficient, respectively, the $i^{th}$ autocorrelation coefficient is defined as $$R_{xx}(i) = \sum_{n=0}^{N-1-i} x(n)x(n-i). \tag{50}$$

An embodiment of the present invention which adaptively selects the DCT and DFT may be implemented using a signal analyzer, represented by box 110 in FIG. 1a, which calculates the first normalized autocorrelation coefficient for each signal sample block, and a frame controller, represented by box 114 in FIG. 1a, which selects the DCT for a block whenever $\rho_1$ for that block exceeds a threshold such as 0.8, but otherwise selects the DFT.

G. Enhanced Filter Selectivity

The preceding discussion of preferred and alternate embodiments of the invention have discussed encoders and decoders which adaptively shift to shorter block lengths when higher than normal temporal resolution is required. Yet another alternative embodiment of the invention shifts to longer block lengths when higher than normal frequency resolution is required.

One measure of signal characteristics which indicates that higher frequency resolution is required is the inverse of the "Spectral Flatness Measure" (SFM) as described by Jayant and Noll, *Digital Coding of Waveforms*, Englewood Cliffs, N.J.: Prentice-Hall, Inc., 1984, pp. 56–58. The SFM describes the shape of a signal's power spectral density by a single number which ranges in value from 0 to 1. The SFM is inversely proportional to waveform predictability. A value of 1 describes an unpredictable signal with the properties of white noise. A value of zero describes a signal which is perfectly predictable.

An embodiment of the present invention which adaptively selects longer block lengths may be implemented using a signal analyzer which calculates the SFM, and a frame controller which selects a longer block length whenever the inverse of SFM exceeds a threshold in the range of 10 to 15.

It should be appreciated by one skilled in the art that it is possible to detect and analyze many input signal characteristics, and for adapting the block length, analysis window or analysis-synthesis window pair, and the transform in response thereto.

TABLE I

| | Coefficients for 2 kHz High-Pass Filter | |
|---|---|---|
| | $a_{1j}$ | $a_{2j}$ |
| $a_{i1}$ | −1.641731 | 0.678759 |
| $a_{i2}$ | −1.809110 | 0.853238 |

| | $b_{0j}$ | $b_{1j}$ | $b_{2j}$ |
|---|---|---|---|
| $b_{i1}$ | 0.830277 | −1.659936 | 0.830277 |
| $b_{i2}$ | 0.941365 | −1.878653 | 0.941365 |

TABLE II

| | Coefficients for 4 kHz High-Pass Filter | |
|---|---|---|
| | $a_{1j}$ | $a_{2j}$ |
| $a_{i1}$ | −1.266438 | 0.416893 |
| $a_{i2}$ | −1.517035 | 0.709569 |

| | $b_{0j}$ | $b_{1j}$ | $b_{2j}$ |
|---|---|---|---|
| $b_{i1}$ | 0.671333 | −1.340665 | 0.671333 |
| $b_{i2}$ | 0.852569 | −1.690390 | 0.852569 |

TABLE III

| Transient Detector Attack-Decay Thresholds | | | |
|---|---|---|---|
| Subframe Level No. | Subblock Length | Threshold Ratios $T_{Aj}$ | $T_{Dj}$ |
| 1 | 512 | 5.0 | 0.2000 |
| 2 | 256 | 10.0 | 0.1000 |
| 3 | 128 | 13.3 | 0.0752 |

TABLE IV

| Transient Detector Attack-Decay Thresholds | | | |
|---|---|---|---|
| Subframe Level No. | Subblock Length | Threshold Ratios $T_{Aj}$ | $T_{Dj}$ |
| 1 | 512 | 10.0 | 0.1000 |
| 2 | 256 | 13.3 | 0.0752 |
| 3 | 128 | 15.8 | 0.0625 |

I claim:

1. An encoder for the encoding of samples representing a discrete time signal and particularly a music signal, comprising
control means responsive to one or more characteristics of said discrete time signal for adapting at least one of a sample block length, one or more analysis-window functions, and one or more discrete transforms, and for grouping said samples into sample blocks having a length equal to said sample block length, wherein said control means adapts said sample block length for any sample block such that it is different from the length of a previous sample block.
analysis-window means responsive to said control means for generating analysis-window weighted blocks by weighting said sample blocks with said one or more analysis-window functions, and
transform means responsive to said analysis-window means and optionally responsive to said control means for generating spectral information by applying said one or more discrete transforms to said analysis-window weighted blocks.

2. An encoder for the encoding of samples representing a discrete time signal and particularly a music signal; comprising control means responsive to one or more characteristics of said discrete time signal for adapting a sample block length, for adapting one or more analysis-window functions and/or one or more discrete transforms, and for grouping said samples into sample blocks having a length equal to said sample block length, analysis-window means responsive to said control means for generating analysis-window weighted blocks by weighting said sample blocks with said one or more analysis-window functions, and transform means responsive to said analysis-window means and optionally responsive to said control means for generating spectral information by applying said one or more discrete transforms to said analysis-window weighted blocks.

3. An encoder according to claim 1 or 2 wherein said control means comprises means for segmenting each of said sample blocks into one or more levels of subblocks having different subblock lengths, and means for detecting the occurrence of a transient whenever an amount of increase in amplitude or decrease in amplitude between a high-pass filtered representation of said discrete time signal in adjacent subblocks in each of said one or more levels of subblocks exceeds one or more trigger thresholds, and wherein said analysis-window means weights subblocks with one or more analysis-window functions.

4. An encoder according to claim 3 wherein said one or more trigger thresholds comprise a hierarchy of thresholds, each level of said hierarchy of thresholds corresponding to a respective one of said one or more levels of subblocks.

5. An encoder according to claim 3 wherein said control means is responsive to the occurrence of said one or more characteristics only for portions of said discrete time signal having an amplitude which equals or exceeds a silence threshold.

6. An encoder according to claim 3 wherein said transform means effectively applies a single discrete transform to pairs of said analysis-window weighted blocks.

7. An encoder according to claim 6 wherein said control means adapts a Time-Domain Aliasing Cancellation phase parameter for at least one of said one or more discrete transforms.

8. An encoder according to claim 1 or 2 wherein said control means comprises a means for detecting the occurrence of a transient whenever an amount of increase in amplitude of a high-pass filtered representation of said discrete time signal over an interval substantially the same as or less than said sample block length exceeds one or more attack thresholds, or an amount of decrease in amplitude of said high-pass filtered representation of said discrete time signal over an interval substantially the same as or less than said sample block length exceeds one or more decay thresholds.

9. An encoder according to claim 8 wherein said control means comprises a means for segmenting each of said sample blocks into one or more levels of subblocks having different subblock lengths, wherein said increase in amplitude and said decrease in amplitude are established from changes in amplitude between adjacent subblocks in each of said one or more levels of subblocks, and wherein said analysis-window means weights subblocks with one or more analysis-window functions.

10. An encoder according to claim 9 wherein said one or more attack thresholds and said one or more decay thresholds are a hierarchy of thresholds, each level of said hierarchy of thresholds corresponding to a respective one of said one or more levels of subblocks.

11. An encoder according to claim 9 wherein said control means is responsive to the occurrence of said one or more characteristics only for portions of said discrete time signal having an amplitude which equals or exceeds a silence threshold.

12. An encoder according to claim 9 wherein said transform means effectively applies a single discrete transform to pairs of said analysis-window weighted blocks.

13. An encoder according to claim 12 wherein said control means adapts a Time-Domain Aliasing Cancellation phase parameter for at least one of said one or more discrete transforms.

14. An encoder according to claim 1 or 2 wherein said control means comprises means for segmenting each of said sample blocks into subblocks, and means for detecting in which of said subblocks an event having said one or more characteristics occurs.

15. An encoder according to claim 1 or 2 wherein said control means is responsive to the occurrence of said one or more characteristics only for portions of said discrete time signal having an amplitude which equals or exceeds a silence threshold.

16. An encoder according to claim 1 or 2 wherein said control means comprises means for detecting the occurrence of one or more events within said discrete time signal, said detecting in accordance with psycho-acoustic principles.

17. An encoder according to claim 16 wherein said one or more events are abrupt amplitude changes in said discrete time signal.

18. An encoder according to claim 17 wherein said detecting is in accordance with pre- and post-event masking intervals of human hearing.

19. An encoder according to claim 1 or 2 wherein each of said one or more analysis-window functions has a respective shape, and wherein said control means adapts said one or more analysis-window functions by adapting one or more parameters affecting the respective shape of said one or more analysis-window functions and/or selecting said one or more analysis-window functions from a plurality of functions.

20. An encoder according to claim 1 or 2 wherein each of said discrete transforms has a respective kernel function, and wherein said control means adapts said one or more discrete transforms by adapting one or more parameters affecting the respective kernel function of said one or more discrete transforms and/or selecting said one or more discrete transforms from a plurality of transforms.

21. An encoder according to claim 1 or 2 wherein said control means comprises means for establishing a frequency of a dominant spectral component of said discrete time signal, means for determining a difference frequency between the frequency of said dominant spectral component and a center frequency of a subband for each transform in a set of transforms comprising a plurality of discrete transforms, and means for selecting said one or more discrete transforms from said set of transforms such that said difference frequency is substantially minimized.

22. An encoder according to claim 1 or 2 wherein said analysis-window weighted blocks comprise real valued samples and the application of said one or more discrete transforms substantially corresponds to Evenly-Stacked Time-Domain Aliasing Cancellation, said transform means comprising means for multiplying real valued samples in pairs of said analysis-window weighted blocks by a first complex function to obtain complex-valued modified sample sets, means for applying a Fast Fourier Transform against said complex-valued modified sample sets, and means for multiplying the results of the transformation by a second complex function to obtain said spectral information.

23. An encoder according to claim 1 or 2 wherein said analysis-window weighted blocks comprise real valued samples and the application of said one or more discrete transforms substantially corresponds to Oddly-Stacked Time-Domain Aliasing Cancellation, said transform means comprising means for multiplying real valued samples in said analysis-window weighted blocks by a first complex function to obtain complex-valued modified sample sets, means for applying a Fast Fourier Transform against said complex-valued modified sample sets, and means for multiplying the results of the transformation by a second complex function to obtain said spectral information.

24. An encoder according to claim 1 or 2 wherein said transform means effectively applies a single discrete transform to pairs of said analysis-window weighted blocks.

25. An encoder according to claim 24 wherein said control means adapts a Time-Domain Aliasing Cancellation phase parameter for at least one of said one or more discrete transforms.

26. An encoder according to claim 1 or 2 wherein said control means adapts a Time-Domain Aliasing Cancellation phase parameter for at least one of said one or more discrete transforms.

27. A decoder for the decoding of a coded signal comprising representations of spectral components of a discrete time signal and particularly a music signal, wherein said decoder comprises inverse control means responsive to said coded signal for adapting a spectral block length and one or more inverse discrete transforms, and for grouping said representations of spectral components into spectral blocks having a length equal to said spectral block length, and transform means responsive to said inverse control means for generating sample blocks by applying said one or more inverse discrete transforms to said spectral blocks.

28. A decoder according to claim 27 wherein said inverse control means segments said spectral blocks into subblocks and said transform means applies one or more transforms to each of said subblocks.

29. A decoder according to claim 28 wherein said transform means effectively applies a single inverse discrete transform to pairs of said subblocks.

30. A decoder for the decoding of a coded signal comprising representations of spectral components of a discrete time signal and particularly a music signal, wherein said decoder comprises inverse control means responsive to said coded signal for adapting at least one of a spectral block length, one or more inverse discrete transforms, and one or more synthesis-window functions, and for grouping said representations of spectral components into spectral blocks having a length equal to said spectral block length, wherein said inverse control means adapts said spectral block length for any spectral block such that it is different from the length of a previous spectral block, transform means responsive to said inverse control means for generating sample blocks comprising recovered signal samples by applying said one or more inverse discrete transforms to said spectral blocks, and synthesis-window means responsive to said transform means and optionally responsive to said inverse control means for generating output samples by weighting said sample blocks with said one or more synthesis-window functions.

31. A decoder according to claim 30 wherein said inverse control means segments said spectral blocks into subblocks and said transform means applies one or more transforms to each of said subblocks.

32. A decoder according to claim 31 wherein said transform means effectively applies a single inverse discrete transform to pairs of said subblocks.

33. A decoder according to claim 30, 31, or 32 wherein said inverse control means adapts a Time-Domain Aliasing Cancellation phase parameter for at least one of said one or more inverse discrete transforms.

34. A decoder according to claim 30 wherein said representations of spectral components are real valued and the application of said one or more inverse discrete transforms substantially corresponds to Evenly-Stacked Time-Domin Aliasing Cancellation, said transform means comprising means for multiplying said representations of spectral components in pairs of said spectral blocks by a first complex function to obtain complex-valued modified spectral sets, means for applying an Inverse Fast Fourier Transform against said complex-valued modified spectral sets, and means for multiplying the results of the transformation by a second complex function to obtain pairs of said sample blocks.

35. A decoder according to claim 30 wherein said representations of spectral components are real valued and the application of said one or more inverse discrete transforms substantially corresponds to Oddly-Stacked Time-Domain Aliasing Cancellation, said transform means comprising means for multiplying said representations of spectral components by a first complex function to obtain complex-valued modified spectral sets, means for applying an Inverse Fast Fourier Transform against said complex-valued modified spectral sets, and means for multiplying the results of the transformation by a second complex function to obtain said sample blocks.

36. A decoder according to claim 27 or 30 wherein said transform means effectively applies a single inverse discrete transform to pairs of said spectral blocks.

37. An encoding method for the encoding of samples representing a discrete time signal and particularly a music signal, comprising adapting at least one of a sample block length, one or more analysis-window functions, and one or more discrete transforms in response to one or more characteristics of said discrete time signal, and grouping said samples into sample blocks having a length equal to said sample block length, wherein said adapting adapts said sample block length for any sample block such that it is different from the length of a previous sample block, generating analysis-window weighted blocks by weighting said sample blocks with said one or more analysis-window functions, and generating spectral information by applying said one or more discrete transforms to said analysis-window weighted blocks.

38. An encoding method for the encoding of samples representing a discrete time signal and particularly a music signal, comprising adapting a sample block length, adapting one or more analysis-window functions and/or one or more discrete transforms in response to one or more characteristics of said discrete time signal, and grouping said samples into sample blocks having a length equal to said sample block length, generating analysis-window weighted blocks by weighting said sample blocks with said one or more analysis-window functions, and generating spectral information by applying said one or more discrete transforms to said analysis-window weighted blocks.

39. An encoding method according to claim 37 wherein said adapting and grouping further comprises segmenting each of said sample blocks into one or more levels of subblocks having different subblock lengths, and detecting the occurrence of a transient whenever an amount of increase in amplitude or decrease in amplitude between a high-pass filtered representation of said discrete time signal in adjacent subblocks in each of said one or more levels of subblocks exceeds one or more trigger thresholds, and wherein said generating analysis-window weighted blocks weights each subblock with one or more analysis-window functions.

40. An encoding method according to claim 38 wherein said segmenting comprises segmenting each of said sample blocks into one or more levels of subblocks having different subblock lengths, and detecting the occurrence of a transient whenever an amount of increase in amplitude or decrease in amplitude between a high-pass filtered representation of said discrete time signal in adjacent subblocks in each of said one or more levels of subblocks exceeds one or more trigger thresholds, and wherein said generating analysis-window weighted blocks weights subblocks with one or more analysis-window functions.

41. An encoding method according to claim 39 or 40 wherein said adapting adapts a Time-Domain Aliasing Cancellation phase parameter for at least one of said one or more discrete transforms, and wherein said generating spectral information effectively applies a single discrete transform to pairs of said analysis-window weighted blocks.

42. An encoding method according to claim 37 wherein said adapting and grouping further comprises segmenting each of said sample blocks into one or more levels of subblocks having different subblock lengths, wherein said adapting is in response to detecting the occurrence of a transient whenever an amount of increase in amplitude of a high-pass filtered representation of said discrete time signal between adjacent subblocks in each of said one or more levels of subblocks exceeds one or more attack thresholds, or an amount of decrease in amplitude of said high-pass filtered representation of said discrete time signal between adjacent subblocks in each of said one or more levels of subblocks exceeds one or more decay thresholds, and wherein said generating analysis-window weighted blocks weights subblocks with one or more analysis-window functions.

43. An encoding method according to claim 38 wherein said segmenting segments each of said sample blocks into one or more levels of subblocks having different subblock lengths, wherein said adapting is in response to detecting the occurrence of a transient whenever an amount of increase in amplitude of a high-pass filtered representation of said discrete time signal between adjacent subblocks in each of said one or more levels of subblocks exceeds one or more attack thresholds, or an amount of decrease in amplitude of said high-pass filtered representation of said discrete time signal between adjacent subblocks in each of said one or more levels of subblocks exceeds one or more decay thresholds, and wherein said generating analysis-window weighted blocks weights subblocks with one or more analysis-window functions.

44. An encoding method according to claim 37 or 38 wherein said control means comprises detecting the occurrence of one or more abrupt amplitude changes in said discrete time signal, said detecting in accordance with psychoacoustic principles.

45. An encoding method according to claim 44 wherein said detecting is in accordance with pre- and post-event masking intervals of human hearing.

46. An encoding method according to claim 37 or 38 wherein said adapting comprises establishing a frequency of a dominant spectral component of said discrete time signal, determining a difference frequency between the frequency of said dominant spectral component and a center frequency of a subband for each transform in a set of transforms comprising a plurality of discrete transforms, and selecting said one or more discrete transforms from said set of transforms such that said difference frequency is substantially minimized.

47. An encoding method according to claim 37 or 38 wherein said generating spectral information effectively applies a single discrete transform to pairs of said analysis-window weighted blocks.

48. An encoding method according to claim 37 or 38 wherein said adapting adapts a Time-Domain Aliasing Cancellation phase parameter for at least one of said one or more discrete transforms.

49. A decoding method for the decoding of a coded signal comprising representations of spectral components of a discrete time signal and particularly a music signal, wherein said decoding method comprises adapting a spectral block length and one or more inverse discrete transforms in response to said coded signal, and grouping said representations of spectral components into spectral blocks having a length equal to said spectral block length, and generating sample blocks by applying said one or more inverse discrete transforms to said spectral blocks.

50. A decoding method for the decoding of a coded signal comprising representations of spectral components of a discrete time signal and particularly a music signal, wherein said decoding method comprises adapting in response to said coded signal at least one of a spectral block length, one or more inverse discrete transforms, and one or more synthesis-window functions in response to said coded signal, and grouping said representations of spectral components into spectral blocks having a length equal to said spectral block length, wherein said adapting adapts said spectral block length for any spectral block such that it is different from the length of a previous spectral block, generating sample blocks comprising recovered signal samples by applying said one or more inverse discrete transforms to said spectral blocks, and generating output samples by weighting said sample blocks with said one or more synthesis-window functions.

51. A decoding method according to claim 49 wherein said adapting and grouping also segments said spectral blocks into subblocks, and wherein said generating sample blocks effectively applies a single inverse discrete transform to pairs of said subblocks.

52. A decoding method according to claim 50 wherein said adapting and grouping also segments said spectral blocks into subblocks, and wherein said generating sample blocks effectively applies a single inverse discrete transform to pairs of said subblocks.

53. A decoding method according to claim 50 or 52 wherein said adapting adapts a Time-Domain Aliasing Cancellation phase parameter for at least one of said one or more inverse discrete transforms.

54. A decoding method according to claim 49 or 50 wherein said generating sample blocks effectively applies a single inverse discrete transform to pairs of said spectral blocks.

55. An encoder for the encoding of samples representing a discrete time signal and particularly a music signal, comprising a signal characteristic detector responsive to said discrete time signal, a frame control responsive to said signal characteristic detector comprising at least one of an analysis window function control and a discrete transform control, a buffer responsive to said samples, an analysis window responsive to said buffer and optionally responsive to said frame control, said analysis window comprising one or more analysis-window functions, and a filter bank responsive to said analysis window and optionally responsive to said frame control, said filter bank comprising one or more discrete transforms, wherein at least one of said analysis window and said filter bank is responsive to said frame control.

56. An encoder according to claim 55 wherein said signal characteristic detector comprises a high-pass filter, a hierarchical sample subblock segmenter responsive to said high-pass filter, a peak-amplitude detector responsive to said hierarchical sample subblock segmenter, and a threshold comparator responsive to said peak-amplitude detector.

57. An encoder according to claim 56 wherein said threshold comparator comprises a silence-threshold comparator, a peak-amplitude comparator responsive to said silence-threshold comparator, a constructor of a tree with binary-valued nodes responsive to said peak-amplitude comparator, and a pruner of tree nodes responsive to said constructor.

58. An encoder according to claim 55 wherein at least one of said one or more analysis-window functions comprises a first partial window which starts at or near a value of zero and rises to an ending value at or near one and a second partial window which starts at or near a value of one and falls to an ending value at or near zero.

59. An encoder according to claim 55 wherein said one or more discrete transforms correspond to either Evenly-Stacked Time Domain Aliasing Cancellation or Oddly-Stacked Time Domain Aliasing Cancellation, said one or more discrete transforms having a Time-Domain Aliasing Cancellation phase term responsive to said frame control.

60. A decoder for the decoding of a coded signal representing a discrete time signal and particularly a music signal, comprising a frame control responsive to said coded signal comprising a discrete transform control, and an inverse filter bank responsive to said coded signal and to said frame control, said inverse filter bank comprising one or more inverse discrete transforms.

61. A decoder for the decoding of a coded signal representing a discrete time signal and particularly a music signal, comprising a frame control responsive to said coded signal comprising at least one of a discrete transform control and a synthesis window control, an inverse filter bank responsive to said coded signal and optionally responsive to said frame control, said inverse filter bank comprising one or more inverse discrete transforms, and a synthesis window responsive to said inverse filter bank and optionally responsive to said frame control, said synthesis window comprising one or more synthesis-window functions, wherein at least one of said inverse filter bank and said synthesis window is responsive to said frame control.

62. A decoder according to claim 61 wherein at least one of said one or more synthesis-window functions comprises a first partial window which starts at or near a value of zero and rises to an ending value at or near one and a second partial window which starts at or near a value of one and falls to an ending value at or near zero.

63. A decoder according to claim 61 wherein said one or more inverse discrete transforms substantially correspond to either Evenly-Stacked Time Domain Aliasing Cancellation or Oddly-Stacked Time Domain Aliasing Cancellation, said one or more inverse discrete transforms having a Time-Domain Aliasing Cancellation phase term responsive to said frame control.

64. An encoder for the encoding of samples representing a discrete time signal and particularly a music signal, comprising control means for grouping said samples into sample blocks having a length equal to a sample block length, analysis-window means for generating analysis-window weighted blocks by weighting said sample blocks with one or more analysis-window functions, and transform means for generating spectral information by applying a discrete transform to said analysis-window weighted blocks, wherein said control means comprises a transform adapting means responsive to one or more characteristics of said discrete time signal for selecting said discrete transform from a plurality of discrete transforms and/or adapting said discrete transform which is a signal-independent transform.

65. A decoder for the decoding of a coded signal comprising representations of spectral components of a discrete time signal and particularly a music signal, wherein said decoder comprises inverse control means for grouping said representations of spectral components into spectral blocks having a length equal to a spectral block length, and transform means for generating sample blocks by applying an inverse discrete transform to said spectral blocks, wherein said inverse control means comprises a transform adapting means responsive to said coded signal for selecting said inverse discrete transform from a plurality of inverse discrete transforms and/or adapting said inverse discrete transform which is a signal-independent transform.

* * * * *

United States Patent and Trademark Office

CERTIFICATE OF CORRECTION

PATENT NO.: 5,394,473
DATED      : Feb. 28, 1995
INVENTORS : Grant A. Davidson

It is certified that error appears in the above-identified patent and that said Letters Patent is hereby corrected as shown below:

Column 6, line 49, change the period "." to read --,-- at the end of the line;

Column 7 line 65 of the patent, "disccussed" should be --discussed--;

Column 16 line 46 of the patent, insert --the-- after "for";

Column 24 line 68 of the patent, "emobidement" should be --embodiment--;

Column 25 line 37 of the patent, "transforms" should be --transform--;

Column 32 line 4 of the patent, "flat" should be --flag--;

Column 33 line 41 of the patent, "alterating" should be --alternating--;

Column 44 line 59 of the patent, "." should be --,--;

Column 45 line 2 of the patent, ";" should be --,--;

UNITED STATES PATENT AND TRADEMARK OFFICE
CERTIFICATE OF CORRECTION

PATENT NO. : 5,394,473
DATED : Feb. 28, 1995
INVENTOR(S) : Grant A. Davidson

It is certified that error appears in the above-indentified patent and that said Letters Patent is hereby corrected as shown below:

Column 48 line 45 of the patent, "Time-Domin" should be --Time-Domain--.

Signed and Sealed this

Seventeenth Day of June, 1997

Attest:

*Attesting Officer*

BRUCE LEHMAN

*Commissioner of Patents and Trademarks*